United States Patent
Maeda et al.

(10) Patent No.: US 6,571,153 B1
(45) Date of Patent: May 27, 2003

(54) ELECTRIC POWER SYSTEM PROTECTIVE CONTROL SYSTEM, METHOD OF CONTROLLING ELECTRIC POWER SYSTEM PROTECTIVE CONTROL SYSTEM AND STORAGE MEDIUM STORING PROGRAM MODULE

(75) Inventors: Takeshi Maeda, Musashino (JP); Yoshihiro Koizumi, Hachioji (JP); Tatsuji Tanaka, Urawa (JP); Katsuhiko Sekiguchi, Tama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/425,612

(22) Filed: Oct. 22, 1999

(30) Foreign Application Priority Data

Oct. 22, 1998 (JP) ............................................. 10-300964

(51) Int. Cl.$^7$ ............................. G05D 3/12; G05D 5/00; G05D 9/00; G05B 11/01; G05B 19/42
(52) U.S. Cl. ...................... 700/292; 700/293; 700/286; 700/22; 700/86
(58) Field of Search ................................. 700/286, 292, 700/293, 294, 9, 17, 22, 83, 86; 340/3.1–3.9, 638, 639, 644

(56) References Cited

U.S. PATENT DOCUMENTS

| | | | |
|---|---|---|---|
| 5,225,994 A | * | 7/1993 | Arinobu et al. ................ 342/51 |
| 5,231,565 A | * | 7/1993 | Bilas et al. .................... 700/22 |
| 5,253,159 A | * | 10/1993 | Bilas et al. .................... 700/22 |
| 5,680,324 A | * | 10/1997 | Schweitzer, III et al. ... 370/241 |
| 5,926,089 A | | 7/1999 | Sekiguchi et al. .......... 340/500 |
| 6,011,480 A | * | 1/2000 | Schweitzer, III et al. ... 340/644 |
| 6,285,917 B1 | | 9/2001 | Sekiguchi et al. |

OTHER PUBLICATIONS

Koizumi et al., "A Mobile Agent for Embed Systems," 58$^{th}$ National Convention Record Information Processing Society of Japan, Mar. 9, 1999, pp. 3–495–3–500.

Sekiguchi et al., "NC Relay: Protection and Control System Applying Internet Technology–Concept," 1999 National Convention Record Information I.E.E. Japan, Mar. 10, 1999, pp. 6–462–6–464.

Sekiguchi et al., "Power System Protection and Control System Applying Intranet Technology," Toshiba Review 1999, vol. 54, No. 6, pp. 34–50.

* cited by examiner

Primary Examiner—Leo Picard
Assistant Examiner—Ryan Jarrett
(74) Attorney, Agent, or Firm—Foley & Lardner

(57) ABSTRACT

In the electric power system protective control system, a plurality of protective control apparatuses each having a protective control function to an electric power system are distributed and connected through a communication network to each other so that data communication is permitted among the respective protective control apparatuses. Each of the protective control apparatuses is carried out a process of executing a control operation related to the protective control function of the own apparatus according to a program module. The program module migrates through the communication network to the own apparatus along a predetermined route of migration. Each of the protective control apparatuses executes a process of migrating the program module from the own apparatus to another protective control apparatus. The another protective control apparatus is determined to a next destination of migration according to the route of migration. In a case where the program module is not migrated by the migration process to the next destination protective control apparatus, each of the protective control apparatuses executes a process of changing a next destination of migration of the program module to a predetermined protective control apparatus except for the next destination protective control apparatus, making it possible to prevent the program module from stopping.

22 Claims, 31 Drawing Sheets

```
GOTO      SUBSTATION Ts1
SET       SWITCH SW1 ON
GOTO      SUBSTATION Ts2
GET       MOTOR M2 ROTATIONAL SPEED
GOTO      SUBSTATION Ts3
SET       SWITCH SW3 OFF
GOTO      SUPERVISION APPARATUS
DISPLAY   CONTROL RESULT
RECORD    CONTROL RESULT
```

```
SUBSTATION Ts1    APPARATUS 2A1    SWITCH SW1    ON
SUBSTATION Ts2    APPARATUS 2A2    MOTOR M2      ROTATIONAL SPEED
SUBSTATION Ts3    APPARATUS 2A3    SWITCH SW3    OFF
```
56A

```
GOTO SUBSTATION Ts1
SET  SWITCH SW1 ON
GOTO SUBSTATION Ts2 ELSE SUPERVISION 4
GET  MOTOR M2 ROTATIONAL SPEED
GOTO SUBSTATION Ts3
     .
     .
     .
```
10A

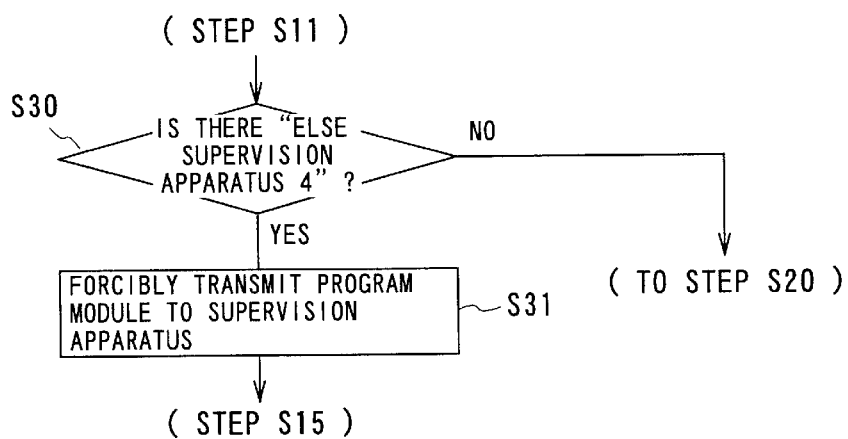
FIG. 10
```
GOTO SUBSTATION Ts1 ELSE (NOT BREAKDOWN) AFTER SUBSTATION Ts3
SET  SWITCH SW1 ON
GOTO SUBSTATION Ts2 ELSE (NOT BREAKDOWN) AFTER SUBSTATION Ts3
GET  MOTOR M2 ROTATIONAL SPEED
GOTO SUBSTATION Ts3 ELSE (NOT BREAKDOWN) AFTER SUPERVISION APPARATUS 4
 .
 .
 .
```
FIG. 11
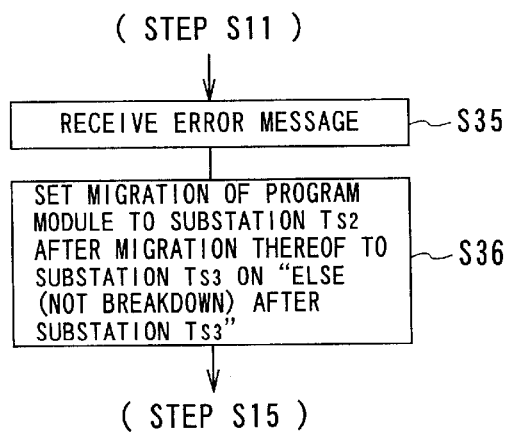
FIG. 12

| NAME OF SUBSTATION | ACTIVATION INFORMATION |
|---|---|
| SUBSTATION $T_{s1}$ (APPARATUS $2A_1$) | ○ |
| SUBSTATION $T_{s2}$ (APPARATUS $2A_2$) | × |
| SUBSTATION $T_{s3}$ (APPARATUS $2A_3$) | ○ |

| NAME OF SUBSTATION | COMMUNICATION NETWORK ADDRESS |
|---|---|
| SUBSTATION Ts1<br>SUBSTATION Ts2<br>⋮ | rmi://henden ts1.aaaaaaaa.toshiba.co.jp/manager<br>rmi://henden ts2.xxxxxxxx.toshiba.co.jp/manager<br>⋮ |

CT

```
                                                            10D1
┌─────────────────────────────────────────────────────────────────┐
│         ⋮                                                       │
│ GOTO    SUPERVISION APPARATUS 4B1  ELSE  SUPERVISION APPARATUS 4B2 │
│         ⋮                                                       │
│ REPORT  SUPERVISION APPARATUS 4B1  ELSE  SUPERVISION APPARATUS 4B2 │
│         ⋮                                                       │
│ GOTO    SUPERVISION APPARATUS 4B1  ELSE  SUPERVISION APPARATUS 4B2 │
└─────────────────────────────────────────────────────────────────┘
```

FIG. 30

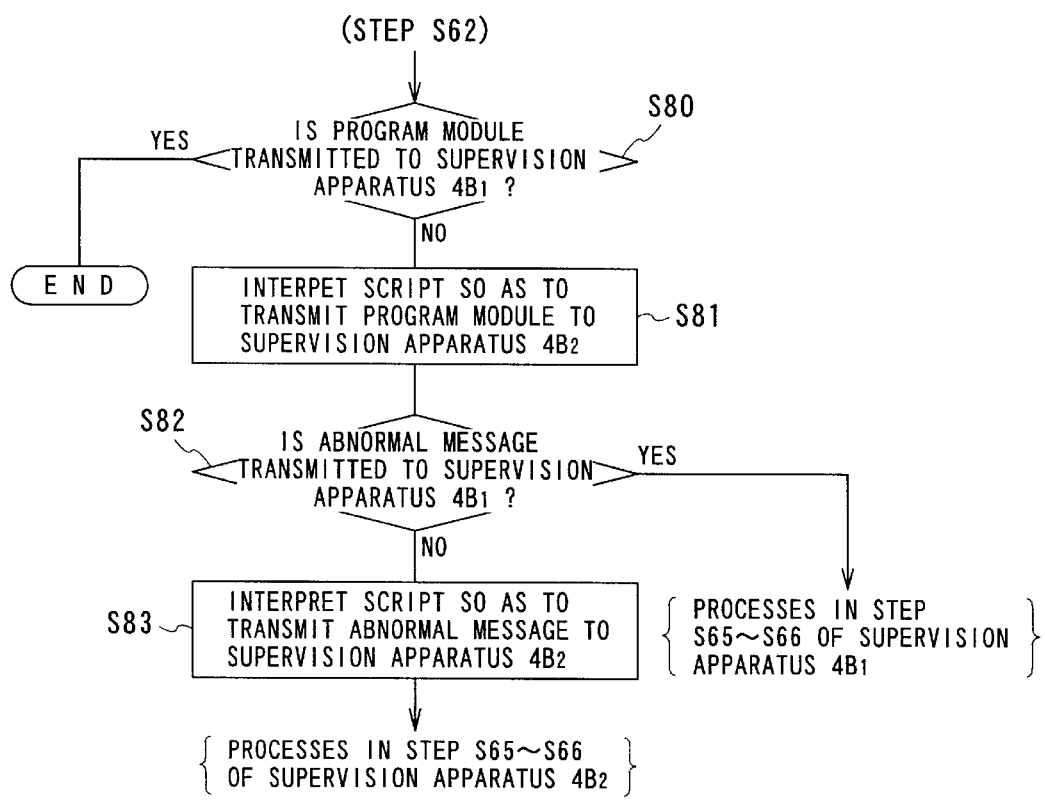

FIG. 31

```
          .
          .
          .
GOTO SUBSTATION TS2
<CONTROL CONTENT AND THE LIKE>
GOTO (SUBSTATION TS3 APPARATUS 2B1 APPARATUS 2B2 APPARATUS 2B3)
AT   APPARATUS 2B1
SET  PRESENT VALUE
AT   APPARATUS 2B2
GET  MAXIMUM VALUE
AT   APPARATUS 2B3
SET  MAXIMUM VALUE 100
GOTO SUBSTATION TS4
<CONTROL CONTENT AND THE LIKE>
          .
          .
          .
```
~ 10G

FIG. 33

```
GOTO      SABSTATION Ts1
MONITOR   (X > Y)
GET       Z1
GOTO      SABSTATION Ts2
GET       Z2
GOTO      SABSTATION Ts3
GET       Z3
ZVAL=(Z1+Z2+Z3)/3
SET       Z3 ZVAL
```

ELECTRIC POWER SYSTEM PROTECTIVE CONTROL SYSTEM, METHOD OF CONTROLLING ELECTRIC POWER SYSTEM PROTECTIVE CONTROL SYSTEM AND STORAGE MEDIUM STORING PROGRAM MODULE

BACKGROUND OF THE INVENTION

1. Field of the Invention

The present invention relates to an electric power system protective control system constituted by connecting through a communication network a plurality of protective control apparatuses for protectively controlling an electric power system, a method of controlling the electric power system protective control system and a storage medium storing a program module.

2. Description of the Prior Art

Recently, an electric power system has been widened and distributed with the increase of the demand of electric power so that the numbers of digital protective control apparatuses for protecting and controlling the widened and distributed electric power system have been enlarged.

Therefore, in order to save the monitoring work and the operational work of each of the protective control apparatuses, an electric power system protective control system is devised, wherein the electric power system protective control system is constituted by connecting through a communication network the protective control apparatuses with a display/operation apparatus (referred to remote terminal or operation terminal) disposed in a human control station (a human electric station) remotely arranged to the protective control apparatuses.

The devised electric power system protective control system (monitoring and controlling system) is operative to transmit from the display/operation apparatus a program module to the communication network so that the program module migrates through the communication network to the respective protective control apparatuses, thereby monitoring and controlling the operation and the operating condition of each of the digital protective control apparatuses, said program module being prepared by integrating data for remotely monitoring and controlling each protective control apparatus (such as, for setting a setting value of each protective control apparatus, for executing a protective control operation process thereof and so on) with a procedure of the remotely monitoring and controlling process.

As the program module mobile type of electric power system protective control system, there is a system for controlling relay setting values as the remotely monitoring and controlling operation, which is disclosed in Japanese Unexamined Patent Publication No. 10-222785 (referred to FIG. 41).

In the system shown in FIG. 41, a setting program module (mobile program module) 150 corresponding to contents of operation (control of a relay setting value) by the display/operation apparatus 120 is transmitted by a program module transmitting unit 121 so as to received through a communication network 130 by a program module receiving unit 110 in a digital protective control apparatus 111. An execution unit 112 in the digital protective control apparatus 110 executes a control operation of the setting value (for example, a changing operation of the setting value) so that the result of the control operation is stored in the program module 150.

After executing the program module 150 by the execution unit 112, the program module 150 is transmitted through a transmitting unit 113 to another digital protective control apparatus 140 so that the control operation of the setting value similar to the control operation by the digital protective control apparatus 111 is executed.

Thus, the program module 150 migrating to all of the digital protective control apparatuses so as to execute the control of the setting values thereof by the execution unit 112 is transmitted to the display/operation apparatus 120 so as to be received by a receiving unit 122 thereof. The results of the control operations (the results of setting values) included in the program module 150 are displayed by a display unit 123 on a monitor (not shown).

That is, in the above program module mobile type of electric power system protective control system, it is unnecessary to individually execute the operating and monitoring control, such as a change of a relay setting value to each of the large number of digital protective control apparatuses 111, 140 widely distributed, making it possible to efficiently execute the operating and monitoring control to each of the digital protective control apparatuses by, for example, single display/operation apparatus 120.

In the conventional program module mobile type of electric power system protective control system, the program module migrates along a previously determined route of migration (in the electric power system protective control system shown in FIG. 41, the digital protective control apparatus 110→the digital protective control apparatus 140→ . . . ).

However, in the conventional program module mobile type of electric power system protective control system, for example, while the monitoring and controlling operation (relay setting value control operation) is executed in a certain digital protective control apparatus according to the program module, in the case where some abnormality (hereinafter, referred to control abnormality) in that the present setting value of the protective control apparatus is not gotten due to, for example, the failure of the object of protective control, the setting value exceeding the allowable setting range is set or the like is caused, since there is no means to cope with the control abnormality, the remote monitoring and controlling operator, even if the control abnormality is occurred during the migration of the program module, does not realize the occurrence of the control abnormality until the program module is transmitted to the display/operation apparatus (display/operation terminal).

Therefore, there is the possibility that the control operation has been executed to the protective control apparatus in which the control abnormality is occurred, and in the case where the control abnormality is occurred so that it is necessary to immediately cope with the control abnormality, it takes a lot of time to cope therewith, thereby deteriorating the reliability and the economic characteristic of the program module mobile type of electric power system protective control system.

Furthermore, when the program module migrates along the predetermined route of migration from a certain digital protective control apparatus (origin of migration) to a next digital protective control apparatus (destination of migration), in the case where it is impossible for the program module to migrate to the next destination of migration of the digital protective control apparatus because of occurring a failure in a communication line connecting the origin of migration of protective control apparatus with the destination of migration (migration-destination) of the protective control apparatus, or occurring a failure in the destination of migration of the protective control apparatus itself, since there is no means to cope with the impossibility of migration (non-migration) of the program module, the migration of the program module is stopped, thereby deteriorating the reliability and the economic characteristic of the program module mobile type of electric power system protective control system.

On the other hand, to constitute the conventional program module mobile type of electric power system protective control system, it must be necessary to prepare the mobile program including the contents of protective control and the route of migration by using a complex programming language.

That is, in order to prepare the mobile program module, it must be necessary to prepare the control procedure including the contents of protective control and the route of migration by using the complex programming language based on a communication technology and a programming technology, and therefore, it is impossible for the remote monitoring and controlling operator (engineer), who is not familiar with the communication technology and the programming technology, to prepare the mobile program module required for the program module mobile type of electric power system protective control system, whereby not to constitute the program module mobile type of electric power system protective control system.

SUMMARY OF THE INVENTION

In view of the foregoing problems, a first object of the present invention is to provide an electric power system protective control system, a method of controlling the electric power system protective control system and a storage medium storing a program module, while a control operation related to a protective control function such as a change operation of a relay setting value is executed according to a program module, in the case where some abnormality is occurred to the control operation, each of which is capable of immediately informing the occurrence of the control abnormality, making it possible to improve the reliability and the economic characteristic of the electric power system protective control system.

Moreover, in view of the foregoing problems, a second object of the present invention is, in the case where the migration of the program module is impossible during the migration thereof, capable of making the electric power system protective control system continuously operate without stopping the operation thereof, so as to improve the reliability and the economic characteristic of the electric power system protective control system.

Furthermore, in view of the foregoing problems, a third object of the present invention is capable of more easily constituting the program module mobile type of electric power system protective control system than that of the prior art by using a mobile program module which is easily prepared by the engineer (remote monitoring and controlling operator) who is not familiar with the communication technology and the programming technology but familiar with the technology of the electric power system protective control system.

Still furthermore, in view of the foregoing problems, a fourth object of the present invention is to improve the functions of the program module mobile type of electric power system protective control system which is able to be constituted by the engineer (remote monitoring and controlling operator) who is not familiar with the communication technology and the programming technology.

To achieve such objects, according to one aspect of the present invention, there is provided an electric power system protective control system comprising: a plurality of protective control apparatuses each having a protective control function to an electric power system, the protective control apparatuses being distributed; and a communication network through which the protective control apparatuses are connected to each other so that data communication is permitted among the respective protective control apparatuses, each of the protective control apparatuses comprising: means for executing a control operation related to the protective control function of the own protective control apparatus according to a program module, the program module migrating through the communication network to the own protective control apparatus along a predetermined route of migration; migration means adapted to migrate the program module from the own protective control apparatus to another protective control apparatus, the another protective control apparatus being determined to a next destination of migration according to the route of migration; and means for, in a case where the program module is not migrated by the migration means to the next destination protective control apparatus, changing a next destination of migration of the program module to a predetermined protective control apparatus except for the next destination protective control apparatus.

Preferred embodiment of this one aspect further comprises a supervision apparatus connected to the communication network and adapted to supervise the protective control apparatuses, wherein the changing means has means for, in the case where the program module is not migrated by the migration means to the next destination protective control apparatus, changing the next destination of migration of the program module to one of the predetermined protective control apparatus and the supervision apparatus.

For achieving such objects, according to another aspect of the present invention, there is provided an electric power system protective control system comprising: a plurality of protective control apparatuses each having a protective control function to an electric power system, the protective control apparatuses being distributed; a supervision apparatus for supervising the protective control apparatuses; and a communication network through which the protective control apparatuses and the supervision apparatus are connected to each other so that data communication is permitted among the respective protective control apparatuses and the supervision apparatus, each of the protective control apparatuses comprising: means for executing a control operation related to the protective control function of the own protective control apparatus according to a program module, the program module migrating through the communication network to the own protective control apparatus along a predetermined route of migration; and means for, during the control operation of the execution means to the own protective control apparatus, when a control abnormality is occurred in relation to the control operation, stopping the control operation so as to migrate the program module to another protective control apparatus, the another protective control apparatus being determined to a next destination of migration according to the predetermined route thereof.

In preferred embodiment of this another aspect, each of the protective control apparatuses comprises means for transmitting data expressing the control abnormality to the supervision apparatus.

To achieve such objects, according to further aspect of the present invention, there is provided an electric power system protective control system comprising: a plurality of protective control apparatuses each having a protective control function to an electric power system, the protective control apparatuses being distributed; and a communication network through which the protective control apparatuses are connected to each other so that data communication is permitted among the respective protective control apparatuses, each of the protective control apparatuses executing a control operation related to the protective control function of the own protective control apparatus according to a program module, the program module migrating through the communication network along a predetermined route of migration, wherein the program module comprises a script file having a control procedure and an interpretation program for interpreting the script file so as to read the control procedure, the control procedure including at least a content of the control operation and the route of migration of the program module, the script file being prepared in a document format, and wherein each of the protective control apparatuses comprises: interpretation means for executing the interpretation program of the program module so as to interpret the control procedure of the script file, the program module migrating through the communication network to each of the protective control apparatus; control means for executing a control operation related to the protective control function of the own protective control apparatus according to the content of the control operation of the control procedure interpreted by the interpretation means; and migration means for migrating the program module along the route of migration of the control procedure interpreted by the interpretation means.

In preferred embodiments of this further aspect, each of the protective control apparatuses further comprises carry means for integrating a result of the control operation executed by the control means with the program module so as to carry the integrated result of the control operation and the program module.

The further aspect of the present invention has an arrangement of further comprising a display/operation apparatus connected to the communication network and having a GUI unit, the display/operation apparatus being adapted to monitor and control an operating condition of each of the protective control apparatuses, wherein the display/operation apparatus comprises: means for describing the control procedure in the document format by using the GUI unit; means for storing therein the described control procedure in the document format as a script file; means for previously storing therein a program module body including the interpretation program and a migration process program; means for integrating the program module body with the script file to prepare the program module, thereby executing the interpretation program in the integrated program module so as to interpret the control procedure of the script file; and means for transmitting the program module to a predetermined destination of migration through the communication network according to the route of migration of the interpreted control procedure.

In preferred embodiment of this further aspect, the migration means has, in a case where the program module is not migrated to another protective control apparatus of a next destination of migration determined as the route of migration of the program module, means for making the program module skip the next destination protective control apparatus so as to migrate the program module to a predetermined protective control apparatus, the predetermined protective control apparatus being selected from other protective control apparatuses except for the next destination protective control apparatus.

This further aspect of the present invention has an arrangement of further comprising a supervision apparatus connected to the communication network and adapted to supervise the protective control apparatuses, wherein the control procedure of the script file includes, in a case where the program module is not migrated to another protective control apparatus of a next destination of migration determined as the route of migration of the program module, a changing procedure for changing a next destination of migration of the program module from the own protective control apparatus to one of other predetermined protective control apparatuses except for the next destination protective control apparatus or the supervision apparatus, and wherein the migration means comprises, when the program module is not migrated to the next destination protective control apparatus determined as the route of migration, means for changing the next destination of migration of the program module according to the changing procedure to one of other predetermined protective control apparatuses or the supervision apparatus.

In preferred embodiment of this further aspect, the control procedure of the script file includes, in the case where the program module is not migrated to another protective control apparatus of a next destination of migration determined as the route of migration of the program module, a changing procedure for changing an order of the migration of the program module to the next destination protective control apparatus according to a cause of a non-migration of the program module so as to migrate, after one of other protective control apparatuses except for the next destination protective control apparatus, the program module to the next destination protective control apparatus, and wherein the migration means comprises: when the program module is not migrated to the next destination protective control apparatus determined as the route of migration, means for detecting the cause of the non-migration of the program module; and after the program module is migrated to the one of other protective control apparatuses except for the next destination protective control apparatus so that the control operation is executed, means for migrating the program module after the migration of the one of other protective control apparatuses to the next destination protective control apparatus according to the changing procedure.

This further aspect of the present invention has an arrangement that the control procedure of the script file includes a retry procedure for retrying, before changing the next destination of migration of the program module to the supervision apparatus, the program module to the next destination protective control apparatus, and wherein the migration means comprises: when the program module is not migrated to the next destination protective control apparatus determined as the route of migration, means for detecting the cause of the non-migration of the program module; and before changing the next destination of migration of the program module to the supervision apparatus according to the changing procedure, means for retrying the program module to the next destination protective control apparatus according to the retry procedure.

In preferred embodiment of this further aspect, the control procedure of the script file has a collective control procedure including some of the protective control apparatuses (collective control objects of protective control apparatuses) to which collectively control operations are desired and the contents of the control operations of the collective control objects of protective control apparatuses, further comprising means for generating a plurality of program module elements from the program module according to the collective control procedure interpreted by the script interpretation means, each of the program module elements including each of the contents of the control operations of each of the collective control objects of protective control apparatuses and a interpretation program for interpreting each of the contents of the control operations, and means for transmitting the generated program module elements to the collective control objects of protective control apparatuses, respectively, each of the collective control objects of protective control apparatuses comprises means for executing the interpretation program in each of the program module elements so as to interpret each of the contents of the control operations of the script file, means for executing the control operation of the own protective control apparatus according to the content of the control operation thereof, and means for transmitting the executed result of the control operation to the program module element generating means, and wherein the program module element generating means comprises means for integrating each of the transmitted control results of each of the collective control objects of protective control apparatuses with the program module, and means for migrating the program module integrated with each of the control results to a destination of migration next to each of the collective control objects of protective control apparatuses.

In order to achieve such objects, according to still further aspect of the present invention, there is provided a method of controlling an electric power system protective control system including a plurality of protective control apparatuses each having a protective control function of an electric power system, in which the protective control apparatuses are distributed and connected through a communication network to each other so that data communication is permitted among the respective protective control apparatuses, each of the protective control apparatuses executing a control operation related to the protective control function of the own protective control apparatus according to a program module, the program module migrating through the communication network along a predetermined route of migration, the method comprising the steps of: preparing a script file including a control, the control procedure including at least a content of the control operation and the route of migration of the program module, the control procedure being prepared in a document format; preparing a program module including an interpretation program for interpreting the script file so as to read out the control procedure; integrating the script file with the program module; migrating the integrated program module to a predetermined destination protective control apparatus based on the route of migration through the communication network; causing the predetermined protective control apparatus to execute the interpretation program of the transmitted program module so as to interpret the control procedure of the script file; causing the predetermined protective control apparatus to execute the control operation related to the protective control function of the own apparatus according to the content of the control operation in the interpreted control procedure; and migrating the program module from the predetermined protective control apparatus to a next destination protective control apparatus along the route of migration in the interpreted control procedure.

In order to achieve such objects, according to still further aspect of the present invention, there is provided a storage medium storing a program module readable by a plurality of protective control terminals of an electric power system protective control system, each of the protective control terminals having a protective control function to an electric power system, in which the protective control terminals are distributed and connected through a communication network to each other so that data communication is permitted among the respective protective control terminals, each of the protective control terminals executing a control operation related to the protective control function of the own protective control terminal according to the program module, the program module migrating through the communication network along a predetermined route of migration, the program module comprising: a script file including a control procedure, the control procedure including at least a content of the control operation and the route of migration of the program module and being prepared in a document format; and an interpretation program for causing each of the protective control terminals to interpret the script file so as to read out the control procedure.

According to the above aspects of the present invention, while the control operation related to the protective control function is executed according to the program module, in the case where some control abnormality is occurred, it is capable of immediately stopping the control operation so as to migrate the program module to the next destination protective control apparatus (terminal) according to the previously determined route of migration, or informing data expressing the control abnormality, making it possible to prevent the control operation from being executed to the protective control apparatus related to the control abnormality regardless of the occurrence of the control abnormality, thereby improving the reliability and the economic characteristic of the electric power system protective control system.

In addition, according to the above aspects of the present invention, in the case where the migration of the program module to a next destination of protective control apparatus is impossible during the migration thereof, it is able to change the next destination of migration of the program module into one of other predetermined protective control apparatuses except for the next destination protective control apparatus so as to continuously execute the control operation without stopping the control operation, thereby further improving the reliability and the economic characteristic of the electric power system protective control system.

Furthermore, according to the above aspects of the present invention, it is capable of preparing the control procedure as the script file including the contents of control and the route of migration not in a program format but in the document format which is easily understood by the human system such as the remote monitoring and controlling operator, so as to prepare the program module by integrating the script file with the script file interpreting program for interpreting the script file. Therefore, each protective control apparatus is adapted to execute the interpreting program to interpret the control procedure of the script file, to execute the control operation related to the protective control function of the own protective control apparatus according to the contents of the control operation of the interpreted control procedure, and to migrate the program module along the route of migration of the interpreted control procedure.

Accordingly, the remote monitoring and controlling operator who is not familiar with the communication technology and the programming technology is capable of easily preparing the control procedure (script file) including the contents of the control operation and the route of migration, and on the other hand, the programming or communication engineer who is familiar with the communication technology and the programming technology, even if the programming or communication engineer is not familiar with the technology of the electric power system protective control system, is able to easily prepare the script interpreting program.

As a result, it is possible to easily constitute the electric power system protective control system for protectively controlling each protective control apparatus by migrating the mobile program module through the communication network.

Still furthermore, according to the above aspects of the present invention, it is capable of realizing the electric power system protective control system with high functions, that includes: a process of changing the destination of migration of the program module in accordance with the control abnormality; a process of informing data expressing the control abnormality to the supervision apparatus; and a process of skipping the protective control apparatus to which the program module does not migrate so as to migrate the program module to another protective control apparatus except the protective control apparatus to which the program module does not migrate or the supervision apparatus, on the basis of the control procedure in document format described in the script file, making it possible to more easily constitute the electric power system protective control system with the above many high functions than a conventional electric power system protective control system in the prior art.

BRIEF DESCRIPTION OF THE DRAWINGS

Other objects and aspects of the present invention will become apparent from the following description of embodiments with reference to the accompanying drawings in which:

FIG. 10 is a schematically flow chart showing an example of processes of an electric power system protective control system of the modification of the second embodiment;

FIG. 11 is a view showing an example of a script file related to a third embodiment;

FIG. 12 is a schematically flow chart showing an example of processes of an electric power system protective control system of the third embodiment;

FIG. 16 is a diagram showing an activation information table of each digital protective control apparatus of each substation, which is stored in a memory according to the fourth embodiment;

FIG. 30 is a view showing an example of a script file according to the eleventh embodiment;

FIG. 31 is a schematically flow chart showing an example of processes of an electric power system protective control system of the eleventh embodiment;

FIG. 33 is a view showing an example of a script file according to the twelfth embodiment;

FIG. 37 is a view showing an example of a script file according to the thirteenth embodiment;

DETAILED DESCRIPTION OF THE PREFERRED EMBODIMENTS

Embodiments of a program module mobile type of electric power system protective control system according to the present invention will now be described hereinafter with reference to the drawings.

(First Embodiment)

An electric power system protective control system according to the first embodiment of the present invention will be described according to FIG. 1 to FIG. 7.

Figure 1:
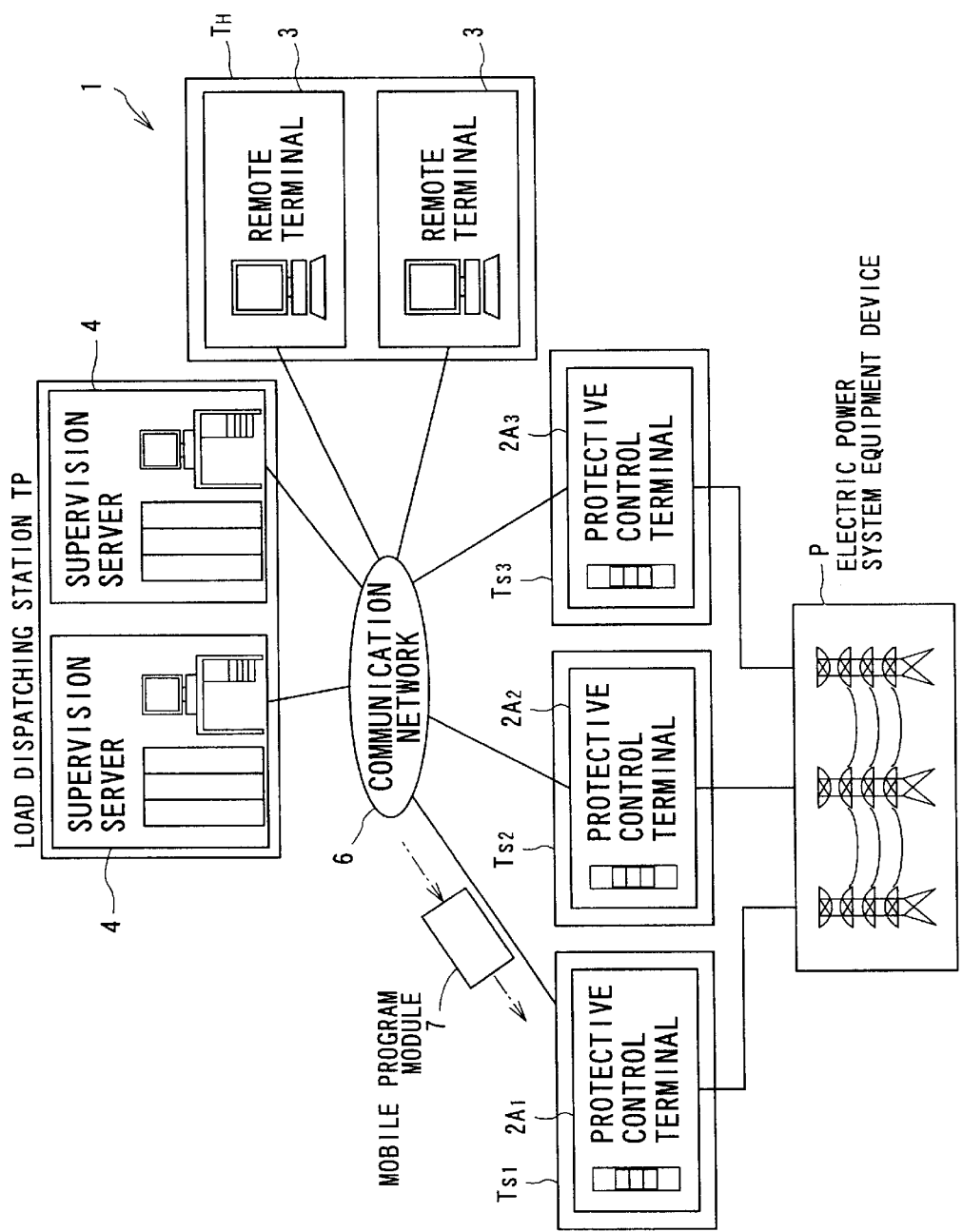
FIG. 1 is a diagram showing a total structure of an electric power system protective control system according to a first embodiment of the present invention.

FIG. 1 is a diagram showing the total components of an electric power system protective control system 1 according to the first embodiment.

The electric power system protective control system (hereinafter, referred to merely "protective control system" too) 1 shown in FIG. 1 comprises digital protective control apparatuses (protective control terminals (clients)) 2a1 to 2a3 which are respectively arranged in a plurality of electric stations (substations or the like, hereinafter referred to as substations) Ts1 to Tsn (in the present embodiment, n=3) for protecting and controlling an electric power system P having various types of electric power system equipment devices.

The protective control system 1 is provided with display/operation apparatuses (remote terminals) 3, 3 which are provided, for example, in a manned substation Th positioned far from the substations Ts1 to Ts3 (digital protective control apparatuses 2a1 to 2a3) for monitoring and controlling the operating conditions of the respective digital protective control apparatuses 2a1 to 2a3 from a remote place.

The protective control system 1 also has supervision apparatuses (supervision servers) 4, 4 which are provided in a manned load dispatching station Tp positioned far from the substations Ts1 to Ts3 and which supervise the plurality of digital protective control apparatuses 2a1 to 2a3.

Then, these substations Ts1 to Ts3 (digital protective control apparatuses 2a1 to 2a3), display/operation apparatuses 3, 3, and supervision apparatuses 4, 4 are mutually connected to each other through a communication network 6 so that data communication is permitted among the components 2a1 to 2a3, 3 and 4.

Furthermore, a mobile program module (agent type program module) 7 is made to cyclically go (migrate) in the display/operation apparatus 3, 3, the respective digital protective control apparatuses 2a1 to 2a3 and the supervision apparatuses 4, 4 through the communication network 6 such as a telephone line network, an internet and so on so that the protective control system 1 is constructed.

Figure 2:
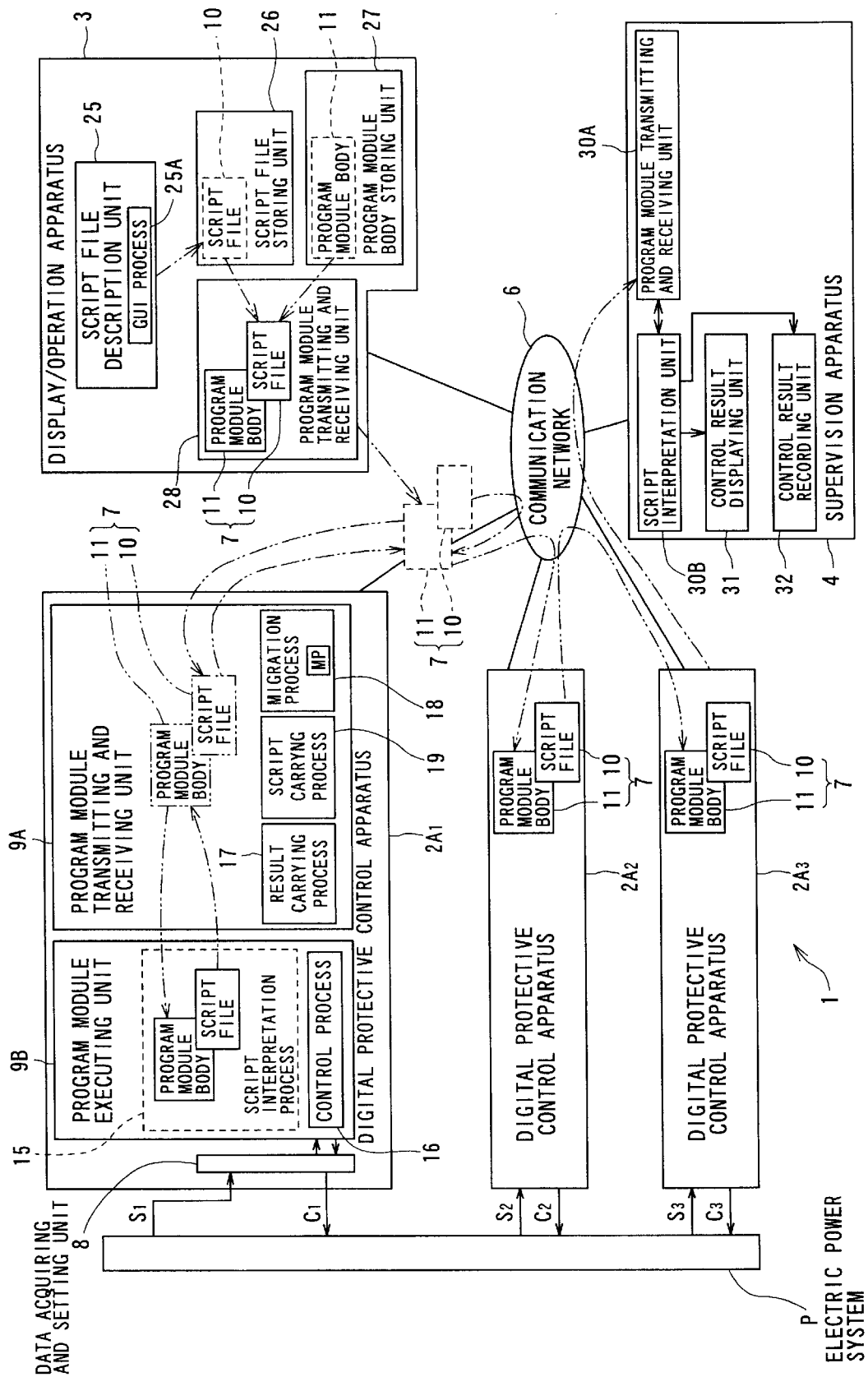
FIG. 2 is a diagram showing components of the functional blocks of the electric power system protective control system shown in FIG. 1.

FIG. 2 is a diagram showing the components of the functional blocks of the protective control system 1 shown in FIG. 1.

According to FIG. 2, each of the digital protective control apparatuses 2a1 to 2a3 (in FIG. 2, only the digital protective control apparatus 2a1 is shown) has a data acquiring and setting unit 8 for acquiring each of the analog quantities of state such as current or voltage (quantities of electricity; S1 to S3) from the electric power system P to be the object of protection and control so as to convert the acquired electric quantities S1 to S3 of into digital electric quantity data, thereby outputting the digital electric quantity data.

The data acquiring and setting unit 8 is also operative to set the contents of protective control operation to an external device such as a breaker relating to the object of the protective control according to the results of the program module execution process of a program module executing unit (functional unit, module) 9B to be described later so as to output protective control operation commands C1 to C3 corresponding to the set protective control operation.

In addition, each of the digital protective control apparatuses 2a1 to 2a3 is provided with a program module transmitting and receiving unit 9A operative to receive a program module 7 for the remote monitor and control, which migrates to the own digital protective control apparatus through the communication network 6 and to transmit the program module 7 to the digital protective control apparatus (or the supervision apparatus 4 or the display/operation apparatus 3) specified for the next destination of migration according to the results of the program module execution process by the program module executing unit 9B.

Furthermore, each of the digital protective control apparatuses 2a1 to 2a3 is provided with a program module executing unit 9B operative to execute the program module 7 received by the program module transmitting and receiving unit 9A so as to remotely carry out the control operation process relating to the protective control functions such as a function of changing the relay setting values, a function of automatically inspecting the respective apparatuses 2a1 to 2a3, a function of acquiring and monitoring the above electric quantities, a function of controlling the relay operation, a function of displaying operating conditions of the respective apparatuses 2a1 to 2a3 and a function of displaying an abnormality in the case of occurrence of abnormality in the respective apparatuses 2a1 to 2a3.

The program module executing unit 9B is also operative to carry out a process of transmitting the results obtained by executing the program module 7 to the program module transmitting and receiving unit 9A.

Figures 3, 4:
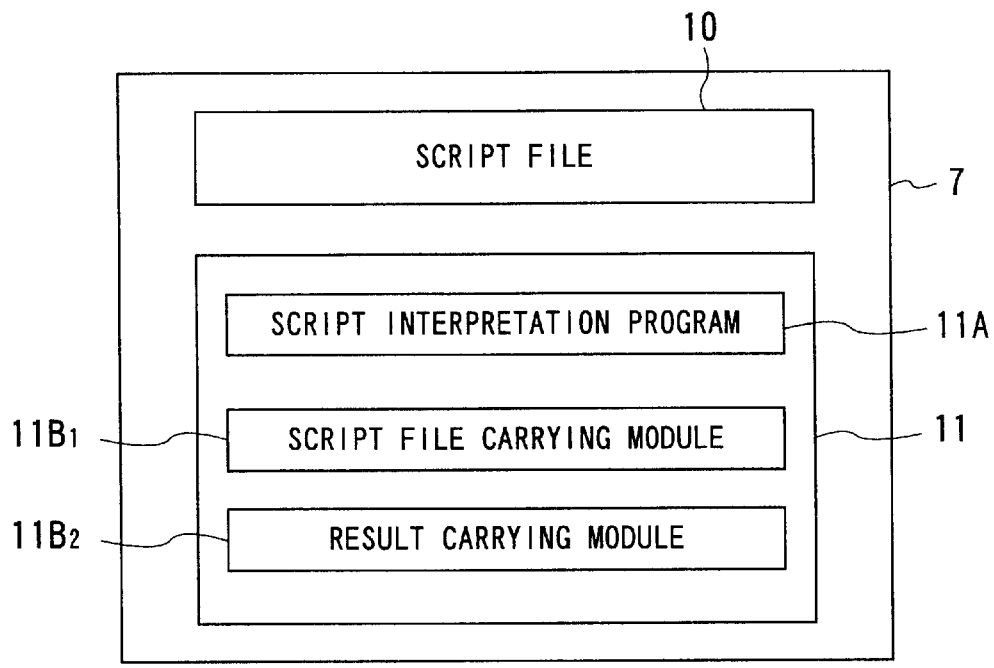
FIG. 3 is a conceptually view showing a program module shown in FIG. 2.
FIG. 4 is a view showing an example of a script file in the program module shown in FIG. 3, wherein the script file is prepared in a document format.

As shown in FIG. 3, the program module 7 comprises a file 10 in which the control procedure including at least a content of control and a route of migration (transportation) of the program module 7 are described, for example, for every 1 line in the easy document format capable of being easily understood by the human system (hereafter, in the present specification, the above control procedure described in the document format (text format) is defined as a script, and a file including the script is defined as a script file).

The program module also has a program module body 11 including a script interpretation program 11a for interpreting the script file 10 so as to read out the control procedure.

Incidentally, the program module 7 is implemented by using, for example, Java ("Java" is a trademark of Sun Microsystems in U.S.) which is a computer language corresponding to a network and the function rmi (remote method invocation) which is the network function of this Java.

An example of the script file 10 (first line to ninth line) prepared in the above document format in the program module 7 is shown in FIG. 4.

The script file 10 shown in FIG. 4 shows the control procedure as follows.

That is, according to the control procedure shown in FIG. 4, first, the program module 7 is migrated to the substation Ts1 (digital protective control apparatus 2a1) ("goto substation Ts1"), and a switch sw1 which is the object of protective control (electric power system equipment device) corresponding to the digital protective control apparatus 2a1 is turned on ("set switch sw1 ON"). Next, the program module 7 is migrated to the substation Ts2 (digital protective control apparatus 2a2) ("goto substation Ts2"), and the rotational speed of a motor m2 which is the object of protective control (electric power system equipment device) corresponding to the digital protective control apparatus 2a2 is gotten ("get motor m2 rotational speed").

Furthermore, as shown in FIG. 4, in the script file 10 according to the present embodiment, the control procedure in that the program module 7 is transported to the substation Ts3 after the substation Ts2 so as to perform a specific control (for example, switching off of a switch sw3) ("goto substation Ts3", "set switch sw3 OFF") and the control procedure in that the program module 7 is migrated to the supervision apparatus 4 after the substation Ts3 ("goto supervision apparatus 4") are described, respectively.

Then, in the script file 10, the control procedure in that the results of the control operation obtained by the respective control apparatuses 2a1 to 2a3 are displayed in the supervision apparatus 4 ("display control result") and the control procedure in that the obtained results of the control operation are recorded (stored) in the supervision apparatus 4 ("record control result") are described, respectively.

On the other hand, the script interpretation program 11a of the program module 7 is a program for interpreting the script file 10 prepared in the document format so as to read the control procedure of the script file 10.

Then, the program module body 11 has a script file carrying module 11b1 for integrating the script file 10 with the program module body 11 so as to carry the integrated program module body 11 and the script file 10 as the program module 7. The script file carrying module 11b1 is implemented in the program module body 11 as internal variables thereof.

Moreover, the program module body 11 has a result carrying module 11b2 for integrating the results of the control operations gotten when the control operation is executed on the basis of the control procedure of the script file 10 with the program module 7 so as to carry the integrated program module 7 including the results of the control operations. The result carrying module 11b2 is implemented in the program module body 11 as internal variables thereof.

That is, in the prior art, the mobile program including the contents of control and the route of migration are prepared by using a complex programming language.

However, in the present invention (present embodiment), the program module 7 is prepared (produced) as follows. That is, the content of control and the route of migration are prepared and produced in advance as a script file not in a complex program format but in a document format capable of being easily understood by the human system such a remote monitoring operator, and thereafter, the prepared script file is combined with the program module body including the script interpretation program for interpreting the script file so that the mobile program module 7 in the present invention (present embodiment) is produced.

In addition, the program module transmitting and receiving unit 9A of the respective digital protective control apparatuses 2a1 to 2a3 is operative to execute a program MP for movement process provided in advance in the respective digital protective control apparatuses 2a1 to 2a3 so as to perform the process (migration (transportation) process 18) of receiving the program module 7 migrating through the communication network 6 and holding that therein.

Furthermore, as shown in FIG. 2, the program module executing unit 9B of each of the apparatuses 2a1 to 2a3 is operative to perform the script interpretation process 15 of executing the script interpretation program 11a of the program module 7 held by the migration process (receiving process) 18 so as to interpret the control procedure (the content of control and the route of migration) of the script file 10.

The program module executing unit 9B of each of the apparatuses 2a1 to 2a3 is operative to carry out the control process 16 of executing control operations relating to the protective control function so as to transfer the results of the control operation to the program module transmitting and receiving unit 9A.

That is, the control operations include a control operation for getting (acquiring) the electric quantity data of the equipment device of the object of protective control, a control operation to set the protective control operation such as a trip command to an external device such as a breaker relating to the object of protective control, a control operation for changing the relay setting value and so on.

Furthermore, each of the program module transmitting and receiving unit is adapted to execute a result carrying process 17 (result carrying module 11b2) of storing the results (results of the control operations) transferred from the control process 16 as internal variables of the program module body 11 so as to carry the results of the control operations integrally with the program module 7.

The program module transmitting and receiving unit 9A is also adapted to perform a migration process 18 of executing the program MP so as to transport the program module 7 through the communication network 6 along the route of migration (transportation) in the control procedure interpreted by the script interpretation process 15.

Furthermore, the program module transmitting and receiving unit 9A is adapted to execute a script carrying process 19 (script file carrying module 11b1) of storing the script file 10 as the internal variables of the program module body 11 so as to integrate the script file 10 with the program module body 11, thereby carrying the integrated script file 10 and the program module body 11 as the program module 7.

Incidentally, similarly to the program module 7, the above program MP for the movement process is implemented by using, for example, the Java which is the computer language corresponding to network and the function rmi which is the network function of the Java.

On the other hand, the display/operation apparatus 3 (incidentally, in FIG. 2, the number of display/operation apparatuses (remote terminals) is one) comprises a script file description unit 25 for describing and preparing the script file 10 by using a monitor, an input unit and the like to be described hereinafter by executing the GUI (Graphical User Interface) process 25a.

The display/operation apparatus 3 also has a script file storing unit 26 for storing the descried and prepared script file 10, a program module body storing unit 27 for storing the previously prepared program module body 11 and a program module transmitting and receiving unit 28 for integrating the stored script file 10 and the stored program module body 11 so as to transmit the integrated script file 10 and the program module body 11 to the communication network 6 as the program module 7 and for receiving the program module 7 transmitted to the display/operation apparatus 3 through the communication network 6.

Furthermore, the supervision apparatus 4 (incidentally, in FIG. 2, the number of supervision apparatuses (supervision servers) is one) comprises a program module transmitting and receiving unit 30A having a process of executing the migration process program MP so as to receive the program module 7 transmitted to the supervision apparatus 4 through the respective digital protective control apparatuses 2a1 to 2a3 along the above route of migration and a process of performing the migration process program MP so as to transmit the program module 7 to the digital protective control apparatuses 2a1 to 2a3 or the like through the communication network 6 as the need arises.

The supervision apparatus 4 is also provided with a script interpretation unit 30B for executing the script interpretation program 11a of the program module 7 received by the receiving process of the transmitting and receiving unit 30A so as to interpret the process procedure (control result displaying process procedure, control result recording process procedure and so on) to be performed by the supervision apparatus 4, which is included in the control procedure of the script file 10.

Furthermore, the supervision apparatus 4 is also provided with a control result displaying unit 31 for displaying through a console to be described later, the results of the control operations of the respective digital protective control apparatuses 2a1 to 2a3 included in the program module 7 on the basis of the control result displaying process procedure interpreted by the script interpretation unit 30B and a control result recording unit 32 for recording the results of the control operations into an external recording unit (recording server) to be described later according to the control result recording process procedure interpreted by the script interpretation unit 30.

Figure 5:
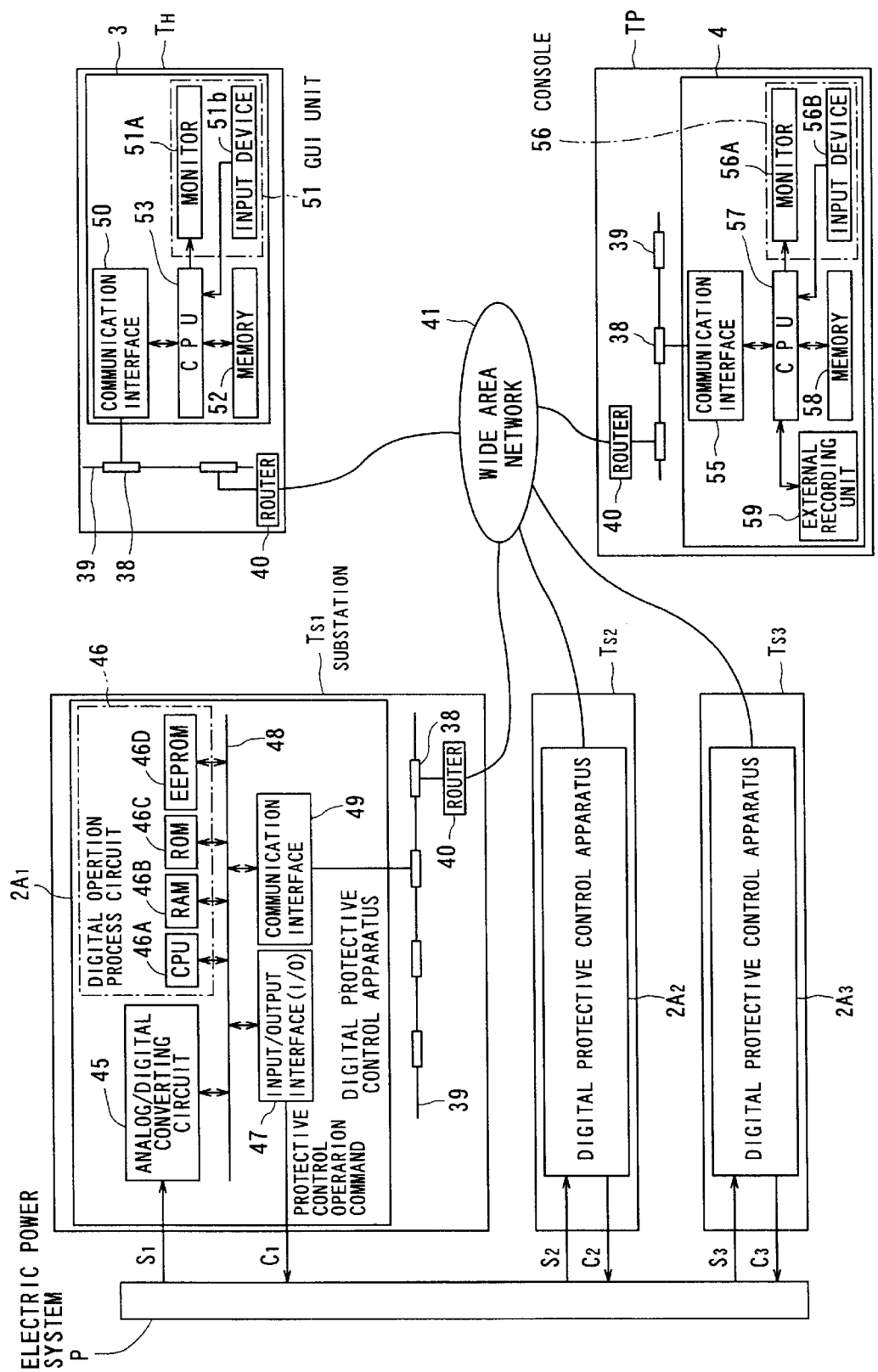
FIG. 5 is a diagram showing a hardware structure for concretely realizing processes of respective functional blocks of a digital protective control apparatus, a display/operation apparatus and a supervision apparatus each constituting the electric power system protective control system of the first embodiment.

FIG. 5 is a diagram showing the components of the hardware for concretely realizing the processes of the respective functional blocks of the digital protective control apparatus 2a1, the display/operation apparatus 3 and the supervision apparatus 4 included in the protective control system 1 of the present embodiment.

The digital protective control apparatus 2a1 shown in FIG. 5 is mutually connected to other apparatuses in the same substation Ts1 through a transceiver 38 and an Ethernet LAN 39 so that data communication (transmission and receiving) is permitted among these apparatuses. The Ethernet LAN 39 connecting the local area in the substation Ts1 is connected to a wide area network 41 such as a telephone line through the transceiver 38 and a router 40.

The digital protective control apparatus 2a1 comprises an analog/digital converting circuit 45 for collecting the electric quantities S1 from a plurality of equipment devices relating to the protective control section of the digital protective control apparatus 2a1 in the electric power system P so as to convert them into the digital electric quantity data and a digital operation process circuit 46 for executing various processes such as the protective control process based on the electric quantity data.

Moreover, the digital protective control apparatus 2a1 is also provided with an input/output interface (I/O) 47 for the interface process related to the input of the electric quantities S1 from the electric power system P and the output of the protective control operation command C1, a bus 48 for connecting these respective hardware blocks (the analog/digital conversion circuit 45, the digital operation process circuit 46 and the input/output interface 47) so that data communication is permitted among these hardware blocks 45, 46 and 47 and a communication interface 49 connected to the transceiver 38 of the Ethernet LAN 39 and connected to the bus 48. The communication interface 49 is operative to perform the interface process relating to the data input/output between the Ethernet LAN 39 and the digital operation process circuit 46.

The digital operation process circuit 46 comprises: a CPU 46a for performing each of the processes 15 to 19 shown in the above FIG. 2 in order to concretely realizing the above program module executing unit 9B; a RAM 46b for temporarily storing the program module 7, the migration process program MP, the electric quantity data, and the data and program at the time of processing of the CPU 46a; a ROM 46c for storing the Os (operating system) performing the entirely control of the digital operation process circuit such as a program control and a network control, a network browsing software (browser) and a procedure (program) of the processes including each of the processes 15 to 19; and an EEPROM 46d for rewritably storing the setting values for the relay operation.

Incidentally, since the components of the hardware of the digital operation process circuit 46 of each of the digital protective control apparatuses 2a2 and 2a3 is substantially equal to the components of the hardware of the digital protective control apparatus 2a1 except that the gotten electric quantities are expressed by S2 and S3 and the outputs of the protective control operation are expressed by C2 and C3, the description thereof will be omitted.

Furthermore, the display/operation apparatus 3 is connected to the Ethernet LAN 39 connecting the local area in the manned substation Th, through the transceiver 38, and the Ethernet LAN 39 in the manned substation Th is connected to the wide area network 41 through the router 40 and the transceiver 38.

That is, the display/operation apparatus 3 comprises a communication interface 50 for performing the interface process so as to input the program module 7, the results of the control operations and the like transmitted from the wide area network 41 through the router 40, the Ethernet LAN 39 and the transceiver 38 into a CPU, to be described later, of the own display/operation apparatus 3 and a GUI unit 51 having a monitor 51a and an input device 51b including, for example, a mouse and a keyboard.

The GUI unit 51 is adapted to perform the description process of the control procedure in the document format related to the above script file 10 and the data input process for operational monitoring process by inputting operation of the input device 51b with aids of the monitor 51a and a CPU 53 described later. The GUI unit 51 is also adapted to operate the display process of the results of the control operations with an aid of the CPU 53 and the monitor 51a.

The display/operation apparatus 3 also has a memory 52 for storing in advance the program module body 11, the program for performing the process of the CPU 53 and the data necessary for the process of the CPU 53 and the CPU 53. The CPU 53 of the display/operation apparatus 3 is operative to perform the process of concretely realizing the unit (script file storing unit 26) for storing the control procedure (script) in the document format inputted by the GUI unit 51 (input device 51b) as the script file 10 in the memory 52, to perform the process of concretely realizing the script file description unit 25 shown in the above FIG. 2, and to perform the process of concretely realizing the program module transmitting and receiving unit 28.

Furthermore, the supervision apparatus 4 is connected to the Ethernet LAN 39 connecting the local area in the load dispatching station Tp, through the transceiver 38, and the Ethernet LAN 39 in this load dispatching station Tp is connected to the wide area network 41 through the router 40 and the transceiver 38.

The supervision apparatus 4 comprises: a communication interface 55 for performing the interface process of inputting the program module 7, the results of protective control and the like transmitted from the wide area network 41 through the router 40, the Ethernet LAN 39, and the transceiver 38 into a CPU 57 described later; a 56 console for data input and display which has a monitor 56a, an input device 56b including, for example, a mouse, a keyboard and the like; the CPU 57 for performing the process of displaying the results of the control operations transmitted through the communication interface 55 on the monitor 56a of the console 56, the recording process of recording the results of the control operations into an external recording unit 59 to be described later, and the like; a memory 58 for storing the results of the control operations, the program for performing the processes of the CPU 57, and the data and the results of the control operations necessary for the processes of the CPU 57; and the external recording unit (recording server) 59 for recording them.

Next, the total operation of the electric power system protective control system 1 of the present embodiment will be described.

Figure 6:
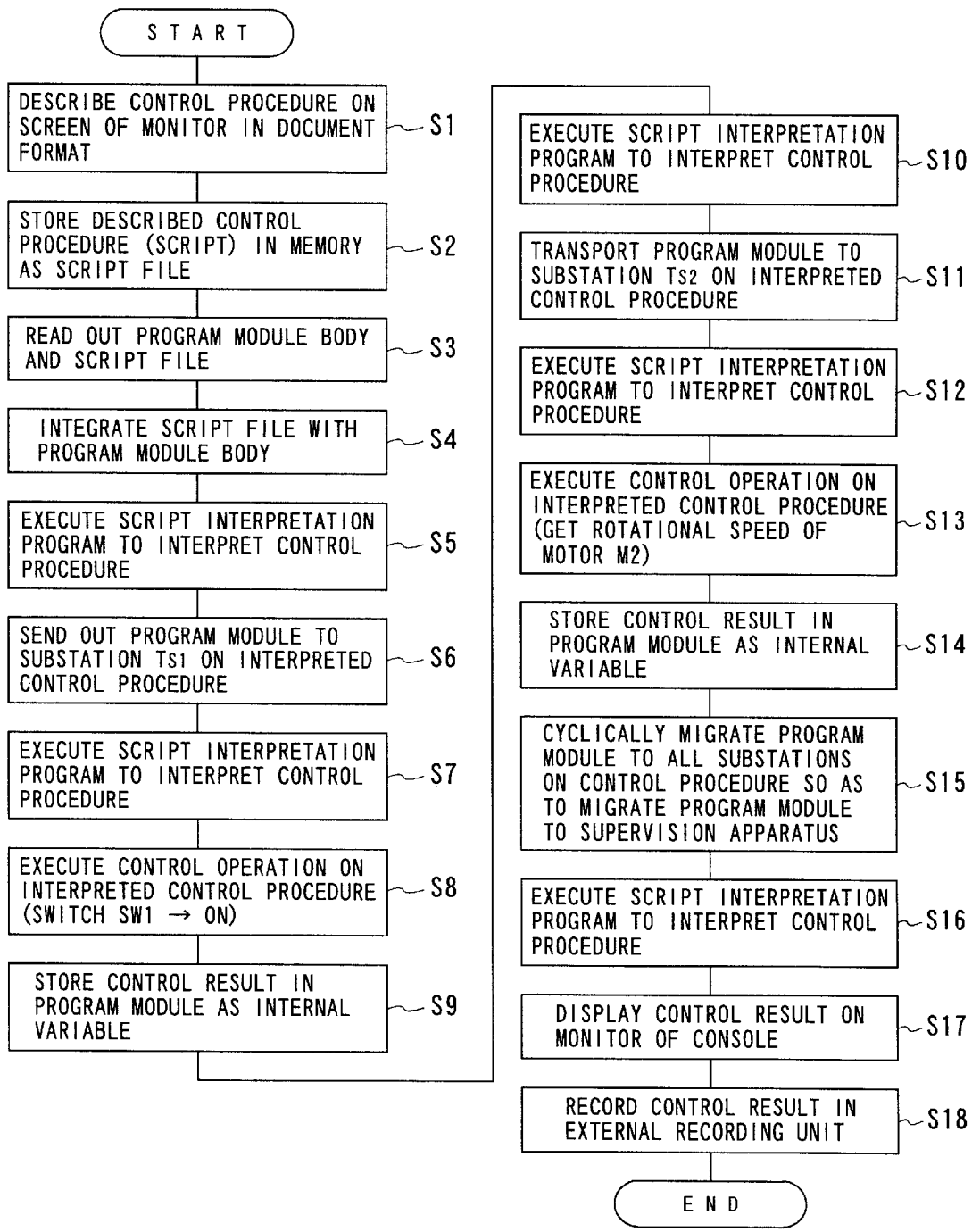
FIG. 6 is a schematically flow chart showing an example of processes of the electric power system protective control system of the first embodiment.

A remote operator operates the input device 51b of the GUI unit 51 so as to describe and input the protection and control procedure shown in FIG. 4 onto the screen of the monitor 51a in the document format (FIG. 6; step S1). At this moment, the CPU 53 receives the protection and control procedure (script) described in the document format and stores it in the memory 52 in the file format (script file 10) (step S2).

Next, the CPU 53 reads out each of the program module body 11 stored in advance in the memory 52 and the script file 10 (step S3), and the CPU 53 integrates the read-out script file 10 with the program module body 11 as internal variables of the program module body 11 so as to prepare the program module 7 (step S4).

Then, the CPU 53 executes the script interpretation program 11a in the program module 7 so as to interpret the control procedure of the script file 10 in turn, for example, from the first line (step S5).

Now, since the first line of the script file 10 is ("goto substation Ts1"), the CPU 53 sends out the prepared program module 7 to the substation Ts1 through the wide area network 41, the Ethernet LAN 39 and the like by the migration process based on the migration process program MP (step S6). As a result of that, the program module 7 migrates to the digital protective control apparatus 2a1 of the substation Ts1 which is the destination of the migration through the wide area network 41 or the like.

At this time, the CPU 46a of the digital protective control apparatus 2a1 receives the program module 7 migrated to the digital protective control apparatus 2a1, through the Ethernet LAN 39, the communication interface 49 and the like, and the CPU 46a executes the script interpretation program 11a in this program module 7 so as to interpret the second line of the control procedure of the script file 10 (step S7).

Now, since the second line of the script file 10 is ("set switch sw1 ON"), the CPU 46a transmits toward the switch sw1 of the electric power system P through the input/output interface 47 the protective control operation command C1 for switching on the switch sw1 (step s8). Then, the CPU 46a receives the result of the control operation corresponding to the protective control operation command C1 from the switch sw1 of the electric power system P, and the CPU 46a stores the received result of the operation control in the program module 7 as internal variables of the program body 11 (step S9).

Next, the CPU 46a executes the script interpretation program 11a to interpret the third line of the control procedure of the script file 10 (step S10).

Since the third line of the script file 10 is ("goto substation Ts2"), the CPU 46a transports the program module 7 to the substation Ts2 through the Ethernet LAN 39, the wide area network 41 and the like, by the migration process based on the migration process program MP (step S11).

Then, similarly to the processing of the CPU 46a of the digital protective control apparatus 2a1, the CPU 46a of the digital protective control apparatus 2a2 receives the migrated program module 7 through the Ethernet LAN 39 and the communication interface 49, and the CPU 46a stores that in the RAM 46b. Then, the CPU 46a executes the script interpretation program 11a in this program module 7 to interpret the fourth line of the control procedure of the script file 10 (step S12), and the CPU 46a gets the rotational speed (electric quantity data expressing the rotational speed) of the motor m2 of the electric power system P according to the content of description ("get motor m2 rotational speed") (step S13). After the process of step S13, the CPU 46a stores the result of the control operation (rotational speed of the motor m2) in the program module 7 as internal variables of the program module body 11 (step S14).

Thus, the migration process and the control operation process are performed according to the control procedure (contents of control, route of migration) described in the script file 10, and consequently, the program module 7 which has gone around (cyclically migrated to) all the substations Ts1 to Ts3 (digital protective control apparatuses 2a1 to 2a3) to perform the protective control operation migrates to the CPU 57 of the supervision apparatus 4 through the wide area network 41, the Ethernet LAN 39, the communication interface 55 and the like (step S15).

The CPU 57 receives the migrated program module 7 on the basis of the migration process program MP, and the CPU 57 executes the script interpretation program 11a to interpret the process procedure (eighth line and ninth line) of the supervision apparatus 4 in the control procedure of the script file 10 line by line (step S16), and on the basis of the results of interpretation of "display control result", the CPU 57 refers to the internal variables in the program module body 11 of the program module 7 so as to read out the respected results of the protection and control of the respective digital protective control apparatuses 2a1 to 2a3, thereby displaying them on the monitor 56a of the console 56 (step S17).

After the process of step S17, the CPU 57 records the results of the control operations of the respective digital protective control apparatuses 2a1 to 2a3 in the external recording unit 59 on the basis of the results of interpretation of "record control result" (step S18), and the CPU 57 ends the process.

Figures 7, 8, 9:
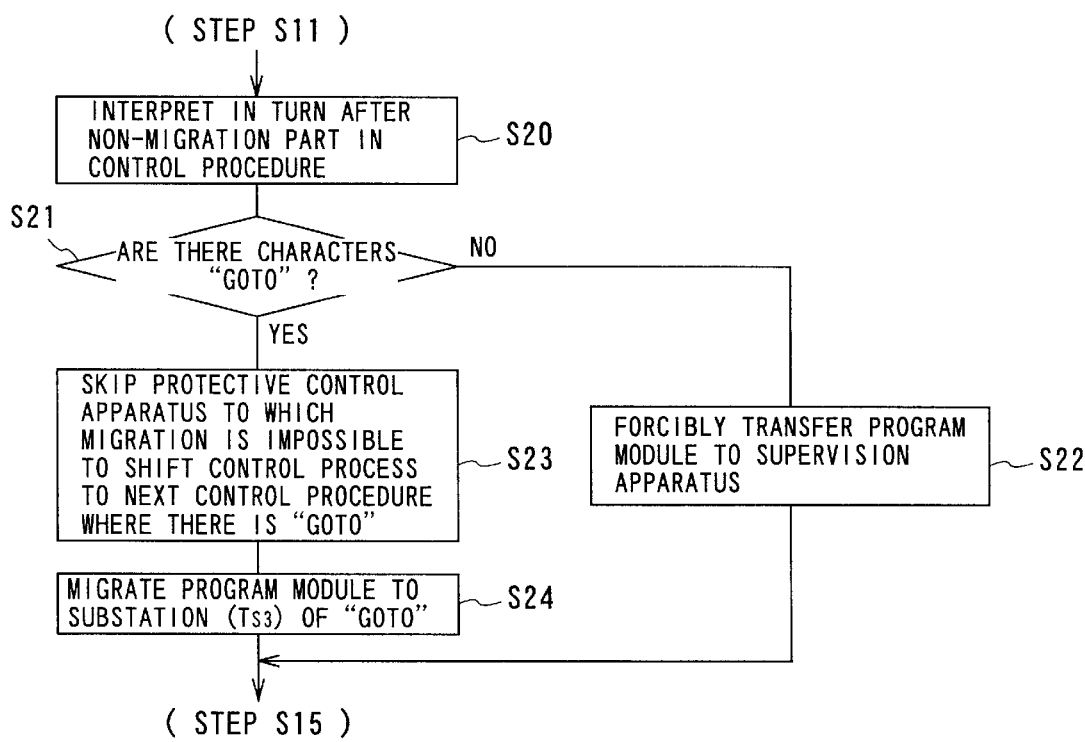
FIG. 7 is a view showing a screen of a monitor on which control results gained in the processes in the first embodiment are displayed.
FIG. 8 is a schematically flow chart showing an example of processes of an electric power system protective control system of a second embodiment.
FIG. 9 is a view showing an example of a script file related to a modification of the second embodiment.

As a result, on the monitor 56a of the supervision apparatus 4, as shown in FIG. 7, the results of the control operations of the respective digital protective control apparatuses 2a1 to 2a3 based on the control procedure described in the script file 10 of the program module 7 are displayed.

That is, the electric power system protective control system 1 is able to be realized, in which the program module 7 is migrated through the communication network 6 (wide area network or the like) to perform the control operation related to the protection and control function of the respective digital protective control apparatuses 2a1 to 2a3, and the results of the protection and control can collectively be supervisory controlled, for example, by a terminal (for example, supervision apparatus 4) at one position.

As mentioned above, according to the present embodiment, the control procedure including the contents of control and the route of migration is prepared as a script file not in the complex program format but in the document format which is able to be easily understood by the human system such as a remote monitoring operator, and this script file and the script interpretation program for interpreting the above script file are combined to prepare the program module, and therefore, it is possible for the remote monitoring operator to very easily prepare the control procedure (script file) including the contents of control and the route of transportation even if the operator is not familiar with the communication technology and the programming technology.

On the other hand, a programming engineer who is familiar with the communication technology and the programming technology can easily prepare the above script interpretation program even if the engineer is not familiar with the electric power system protection and control technology.

Accordingly, an electric power system protective control system is able to be easily constructed, in which the respective digital protective control apparatuses are protected and controlled by migrating a mobile protection and control program module through a communication network.

Incidentally, in the present embodiment, a description is written in the script file 10 so as to send the results of the control operations of the respective digital protective control apparatuses 2a1 to 2a3 to the supervision apparatus 4 and to display the results of the control operations, but the present invention is not limited to this. That is, for example, in a case where the descriptions of the seventh line and the eighth line of the script file 10 are ("goto display/operation apparatus 3") and ("display protection control result"), it is also possible to display the above results of the control operations through the monitor 51a of the display/operation apparatus 3.

(Second Embodiment)

Since the components of the functional blocks of an electric power system protective control system 1A according to the present embodiment and the components of the hardware for concretely implementing the processes of these respective functional blocks are substantially equal to those in FIG. 2 and FIG. 5 of the first embodiment, the description thereof will be omitted.

In the present embodiment, when the CPU 46a of each of the digital protective control apparatuses 2a1 to 2a3 interprets the control procedure of the script file 10 so as to migrate the program module 7 to the next destination of transportation according to the route of migration recognized by the interpretation, even in the case where for example, a failure occurs in the communication line between the substation (digital protective control apparatus, for example, the protective control apparatus 2a1) of the origin of migration and the substation (the digital protective control apparatus, for example, the protective control apparatus 2a2) of the next destination of migration whereby a failure of communication to the digital protective control apparatus 2a2 is caused, the CPU 46a is adapted to perform the process of migrating the program module 7 to another substation (for example, the digital protective control apparatus 2a3 of the substation Ts3) by skipping the specified substation (for example, the digital protective control apparatus 2a2 of the substation Ts2) of the next destination of transportation.

That is, the CPU 46a of the digital protective control apparatus 2a1 of the present embodiment performs the process of migrating the program module 7 to the substation Ts2 through the Ethernet LAN 39, the wide area network 41 and the like by the interpretation ("goto substation Ts2") of step S10 (FIG. 6; referred to step S11).

However, at this moment, the program module 7 cannot be migrated because of the above breakdown in the communication line.

Therefore, the CPU 46a executes the script interpretation program 11a so as to interpret in turn lines (fourth line, fifth line, . . . ) after the non-migration part (third line) in the control procedure of the script file 10 (FIG. 8; step S20), and the CPU 46a performs the retrieval process to see whether or not there are characters "goto" expressing the migration of the program module (step S21).

As a result of the retrieval processing of this step S21, when there is no "goto" (step S21→NO), the CPU 46a forcibly transfers the program module 7 to the supervision apparatus 4 (step S22) so as to return to the process of step S15.

On the other hand, as a result of the retrieval process of the step S21, when there is a "goto" (in the present embodiment, there is a "go" on the fifth line; step S21→YES), the CPU 46a skips the digital protective control apparatus 2a2 to which migration is impossible so as to shift the control process to the next control procedure (fifth line) where there is the "goto" (step S23).

Then, the CPU 46a migrates the program module 7 to the substation Ts3 through the Ethernet LAN 39, the wide area network 41 and the like on the basis of the fifth line ("goto substation Ts3") of the control procedure (step S24) so as to return to the process of step S15.

As a result, even in the case where the communication line to the digital protective control apparatus 2a2 of the destination of migration is in trouble and the program module 7 cannot be migrated to the digital protective control apparatus 2a2, the program module 7 is able to migrate to another digital protective control apparatus 2a3 by skipping the digital protective control apparatus 2a2 to which migration is impossible.

That is, according to the present embodiment, even if a breakdown occurs in a communication line to a certain substation (digital protective control apparatus) among a plurality of substations (a plurality of digital protective control apparatuses), it is possible to migrate the program module to another substation (another digital protective control apparatus) to which migration is possible after the substation (digital protective control apparatus) to which migration is impossible so as to perform each control operation.

Accordingly, it is possible to surely perform the control operation to a sound substation (digital protective control apparatus) except substations (digital protective control apparatuses) to which migration is impossible, making it possible to highly keep the reliability and the economical efficiency of the electric power system protective control system.

Incidentally, in the present embodiment, a case is shown, where the program module 7 is migrated to another substation Ts3 (digital protective control apparatus 2a3) skipping the substation Ts2 (digital protective control apparatus 2a2) when for example, the migration to the substation Ts2 (digital protective control apparatus 2a2) is impossible.

However, in some cases, the migration to the digital protective control apparatus 2a3 is not very meaningful if the migration to migrate that to the digital protective control apparatus 2a2 is impossible, depending on the contents of the protection and control (for example, in the case where the results of the protective control of the digital protective control apparatus 2a2 is necessary for the protective control of the digital protective control apparatus 2a3).

Therefore, as a modification of the present embodiment, an electric power system protective control system will be described, in which the migration of the program module 7 is not stopped even in the above case.

That is, in this electric power system protective control system 1B, when the remote operator operates the input device 51b of the GUI unit 51 to describe the protection and control procedure shown in FIG. 4 on the screen of the monitor 51a in a document format, in the case where in the statements "goto" to the respective substations Ts1 to Ts3 (digital protective control apparatuses 2a1 to 2a3), the migration of the program module to the substation (digital protective control apparatus) in the statement "goto" is impossible, the remote operator describes a statement "goto" (for example, the statement "goto" on the third line) for returning the program module 7 to the supervision apparatus 4 as shown in FIG. 9 so as to prepare a script (script file 10A).

That is, as shown in FIG. 9, in the control procedure of the third line expressing the contents of the migration to the substation Ts2 (digital protective control apparatus 2a2), after "the substation Ts2", "else supervision apparatus 4" expressing the contents of [migrating the program module to the supervision apparatus 4 when the migration to the substation Ts2 is impossible] is described in addition.

When the script file 10A is described as shown in FIG. 9, in the case where the CPU 46a of the digital protective control apparatus 2a1 of the present modification has performed the process of migrating the program module 7 to the substation Ts2 through the Ethernet LAN 39, the wide area network 41 and the like by the interpretation ("goto substation Ts2 . . . ") of the script file 10A (third line of the protection and control procedure) in step S10 (FIG. 6; referred to step S11), the CPU 46A, when the program module 7 does not migrate because of the above communication line breakdown, judges whether or not there is "else supervision apparatus 4" after the destination of transportation (substation Ts2) of the statement "goto" of the above third line (FIG. 10; step S30).

In the case where there is no "else supervision apparatus 4" as a result of the judgment of step S30 (step S30→NO), the CPU 46a returns to the process of the above step S20.

On the other hand, in the case where there is "else supervision apparatus 4" as a result of the judgment of step S30 (step S30→YES), the CPU 46a forcibly transmits the program module 7 to the supervision apparatus 4 on the basis of the "else supervision apparatus 4" (step S31), and the CPU 46a returns to the process of step S15.

As a result, the project module 7 can return to the supervision apparatus 4 without stagnating in the digital protective control apparatus 2a1 or the wide area network 41 even in the case where the communication line to the digital protective control apparatus 2a2 of the destination of migration is in trouble so that the program module 7 cannot be migrated to the digital protective control apparatus 2a2.

Therefore, it is possible to provide the electric power system protective control system which has such a high order of function that the substation (digital protective control apparatus) to which migration of the program module is impossible is skipped so that the control operation for another sound substation (digital protective control apparatus) is surely performed, and in addition, in the case where the migration of the program module is unnecessary, the program module is forcibly returned to the supervision apparatus.

(Third Embodiment)

Since the components of the functional blocks of an electric power system protective control system 1C according to the present embodiment and the components of the hardware for concretely implementing the processing of these respective functional blocks are substantially equal to those in FIG. 2 and FIG. 5 of the first embodiment, the description thereof will be omitted.

In the present embodiment, similarly to the second embodiment, in the case where the program module 7 cannot be transported from the substation (digital protective control apparatus, for example, the protection and control apparatus 2a1) of the initial position of transportation to the substation (digital protective control apparatus, for example, the protection and control apparatus 2a2) of the following destination of transportation, when performing the processes (step 20 to step 24) to skip the substation (for example, the protection and control apparatus 2a2 of the substation Ts2) of the specified following destination of transportation to be transported to another substation (for example, the protection and control apparatus 2a3 of the substation Ts3), the process of transporting the program module 7 to the skipped substation (the station Ts2, the digital protective control apparatus 2a2) is left until later according to the cause of impossibility of transportation.

For example, as the cause to make it impossible to migrate the program module 7 to the digital protective control apparatus of the following destination of migration, the case where the digital protective control apparatus 2a2 (CPU 46a thereof) has not yet energized (has not been activated), the case where the communication passage to the digital protective control apparatus 2a2 of the following destination of migration is occupied by another data or the other similar cases are considered other than the breakdown of the above communication line.

In the case where the program module 7 cannot be migrated because of the causes (hereafter, referred to as sound causes) attributed to, for example, the fact that the digital protective control apparatus has not yet been activated, or the fact that the communication passage is occupied by another data other than the above fact that the communication line is in breakdown, there is a high possibility that the digital protective control apparatus 2a2 is activated or the data occupation of the communication passage finishes after a certain time has elapsed.

Accordingly, in order to deal with the situation in the case where the program module 7 is not able to be migrated to the digital protective control apparatus 2a2 of the following destination of migration because of the sound cause other than the breakdown of the communication line, it is sufficient to perform the migration of the program module 7 after the migration to other substations (digital protective control apparatuses) has ended (there is a high possibility that the above digital protective control apparatus 2a2 is activated or the data occupation of the communication passage finishes while the program module migrates to another digital protective control apparatus).

On the basis of such a background, the remote operator in the electric power system protective control system 1C of the present embodiment describes the statement "goto" to the respective substations Ts1 to Ts3 (digital protective control apparatuses 2a1 to 2a3) as shown, for example, in FIG. 11 to prepare the script (script file 10B) when describing the control procedure shown in FIG. 4 in the screen of the monitor 51a by operating the input device 51b of the GUI unit 51.

As shown in FIG. 11, in the control procedure of the first line, third line, and fifth line expressing the contents of migrating to the respective substations Ts1 to Ts3 (digital protective control apparatuses 2a1 to 2a3), in the case where the migration to the respective substations Ts1 to Ts3 is impossible because of a cause other than the cause attributed to a breakdown (not breakdown), the script 10B is described by adding, after the respective "substations Ts1 to Ts3", "else (not breakdown) after substation Ts3 (in the case of the substations Ts1, Ts2) or supervision apparatus 4 (in the case of the substation Ts3)" expressing the contents in that [in the case where the migration of the program module 7 to the respective substations Ts1 to Ts3 is impossible because of a cause other than a breakdown (not breakdown), the program module 7 is migrated again to the substation to which migration of the program module 7 is impossible after the program module 7 has been migrated to the substation of the following destination of migration or to the supervision apparatus 4].

When the script file 10B is described like this, the CPU 46a of the digital protective control apparatus 2a1 of the present embodiment interprets the script file 10B (third line of the control procedure) by the process of step S10 ("goto substation Ts2 . . . "), and first, the CPU 46a performs the process of migrating the program module 7 to the substation Ts2 through the Ethernet LAN 39, the wide area network 41 and the like (FIG. 6; referred to step S11).

At this moment, when the program module 7 does not migrate because of the above sound cause, in the case where for example, the digital protective control apparatus 2a2 (or the migration process program MP thereof) is not activated, an error message expressing the inactivated state is transmitted to the digital protective control apparatus 2a1 (in the case where the migration process program MP is described in Java).

On the other hand, in the case where the communication passage is occupied by another data and the communication passage is not able to be secured, a different error message is transmitted. Incidentally, it is possible to classify the exceptional processes of the error messages by the Exception class in Java.

The CPU 46a of the digital protective control apparatus 2a1 receives the migrated error message by the process based on the migration process program MP (FIG. 12; step S35), and next, the CPU 46a sets the migration of the program module 7 to the digital protective control apparatus 2a2 of the substation Ts2 after the migration of the program module 7 to the substation Ts3, on the basis of "else (not breakdown) after substation Ts3" described after "substation Ts2" of the script file 10B (third line of the control procedure) according to the received error message (step S36), so as to change over to the process of step S15.

As a result, the program module 7 is transmitted to the digital protective control apparatus 2a2 of the substation Ts2 after the migration to the substation Ts3 by the process of step S15 of the CPU 46a.

That is, according to the present embodiment, even in the case where the communication to the digital protective control apparatus of the destination of migration has become impossible because of a sound cause, the program module can be migrated to all digital protective control apparatuses by migrating the program module again to the digital protective control apparatus to which migration of the program module is impossible, after the diversion to another digital protective control apparatus.

Accordingly, the program module is possible to be transported to a digital protective control apparatus to which the transportation has previously been impossible because of a sound cause, thereby improving the protection and control efficiency of the electric power system protective control system.

By the way, in the present embodiment, the fact that the migration of the program module to the substation (digital protective control apparatus) to which migration of the program module is impossible is performed after the migration to another substations (digital protective control apparatuses) is described in the protection and control procedure of the script file and the migration process is performed on the basis of the contents of the description, but it is also possible to migrate the program module to all substations (digital protective control apparatuses) without putting off the migration to the above substation (digital protective control apparatus) to which migration of the program module is impossible.

Figures 13, 14:
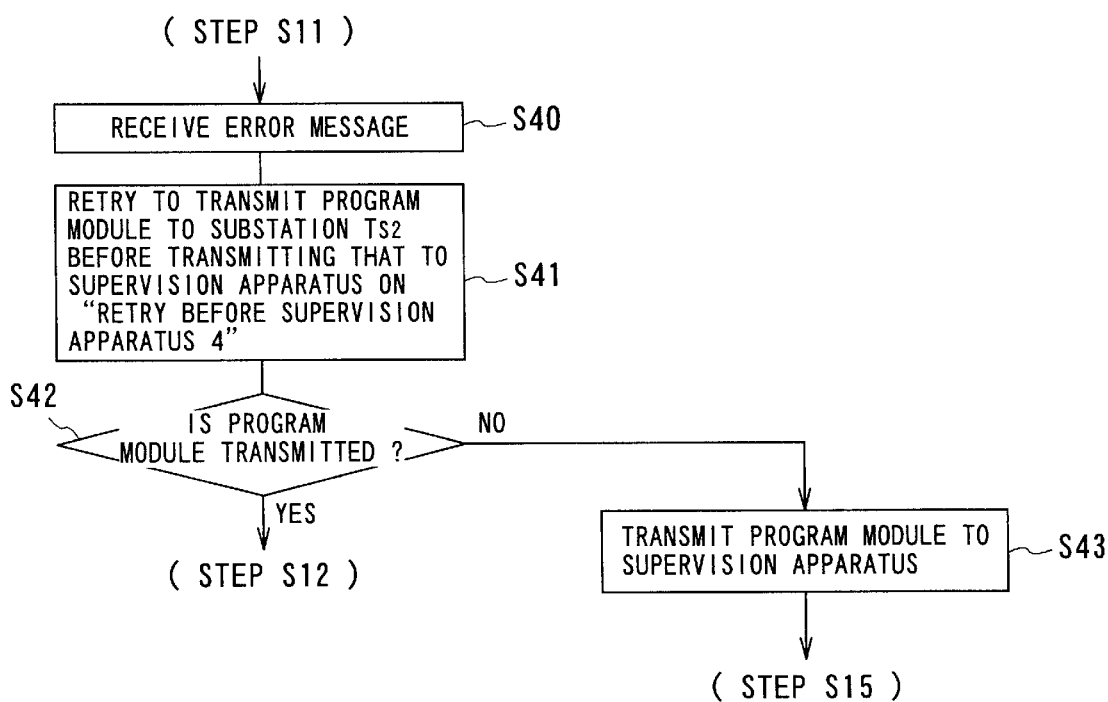
FIG. 13 is a view showing an example of a script file related to a modification of the third embodiment.
FIG. 14 is a schematically flow chart showing an example of processes of an electric power system protective control system of the modification of the third embodiment.

That is, in a modification of the present embodiment, when operating the input device 51b of the GUI unit 51 to describe the protection and control procedure shown in FIG. 4 on the screen of the monitor 51a in a document format, the remote operator describes the statement "go" to the respective substations Ts1 to Ts3 (digital protective control apparatuses 2a1 to 2a3), for example, as shown in FIG. 13, so as to prepare the script (script file 10C).

As shown in FIG. 13, in the protection and control procedure of the first line, third line, and fifth line expressing the contents of migration to the respective substations Ts1 to Ts3 (apparatuses 2a1 to 2a3), in addition after the respective "substations Ts1 to Ts3", "retry before supervision apparatus 4" expressing the contents in that [in the case where the migration to the respective substations Ts1 to Ts3 is impossible because of a cause other than a breakdown, the program module 7 is migrated to the supervision apparatus 4, but before the migration to the supervision apparatus 4, it is retried to migrate the program module 7 to the substations Ts1 to Ts3 (apparatuses 2a1 to 2a3) to which migration of the program module 7 is impossible].

When the script file 10C is described like this, the CPU 46a of the control apparatus 2a1 of the present modification interprets the script file 10C (third line of the protection and control procedure) by the processing of step S10 ("goto substation Ts2 . . . "), and first, the CPU 46a performs the process of transporting the program module 7 to the substation Ts2 through the Ethernet LAN 39, the wide area network 41 and the like (FIG. 6; referred to step S11).

At this moment, the CPU 46a of the control apparatus 2a1 receives the transmitted error message by the process based on the migration process program MP (FIG. 14; step S40), and next, the CPU 46a retries to transmit the program module 7 to the substation Ts2 before transmitting the program module 7 to the supervision apparatus 4, on the basis of "retry before supervision apparatus 4" described after "substation Ts2" of the script file 10C (third line of the control procedure) according to the received error message (step S41).

In the case where the program module 7 can be transmitted to the digital protective control apparatus 2*a*2 to which the transportation is impossible, by this process of step 41 (a case where the digital protective control apparatus 2*a*2 is activated, or a case where the occupied condition of the communication line is canceled; the result of the judgment of step S42 is YES), the CPU 46*a* shifts to the process of step S12.

On the other hand, in the case where the program module 7 cannot be transmitted to the digital protective control apparatus 2*a*2 to which the transportation is impossible, by the process of step S41 (the result of the judgment of step S42 is NO), the CPU 46*a* transfers the program module 7 to the supervision apparatus 4 (step S43) so as to change over to the process of step S15.

According to the above modification, in the case where the occupation of the communication passage in a digital protective control apparatus to which the transportation is impossible, for example, because of the occupation of the communication passage is canceled after performing the first transportation to the digital protective control apparatus to which the transportation is impossible, it is possible to transport the program module to the digital protective control apparatus to which the transportation is impossible, by the retried transportation process of the program module of step S41, making it possible to migrate the program module to all digital protective control apparatuses.

Accordingly, in addition to the effects of the present embodiment, it is possible to improve the flexibility in the transportation (migration) of the program module.

(Fourth Embodiment)

Figure 15:
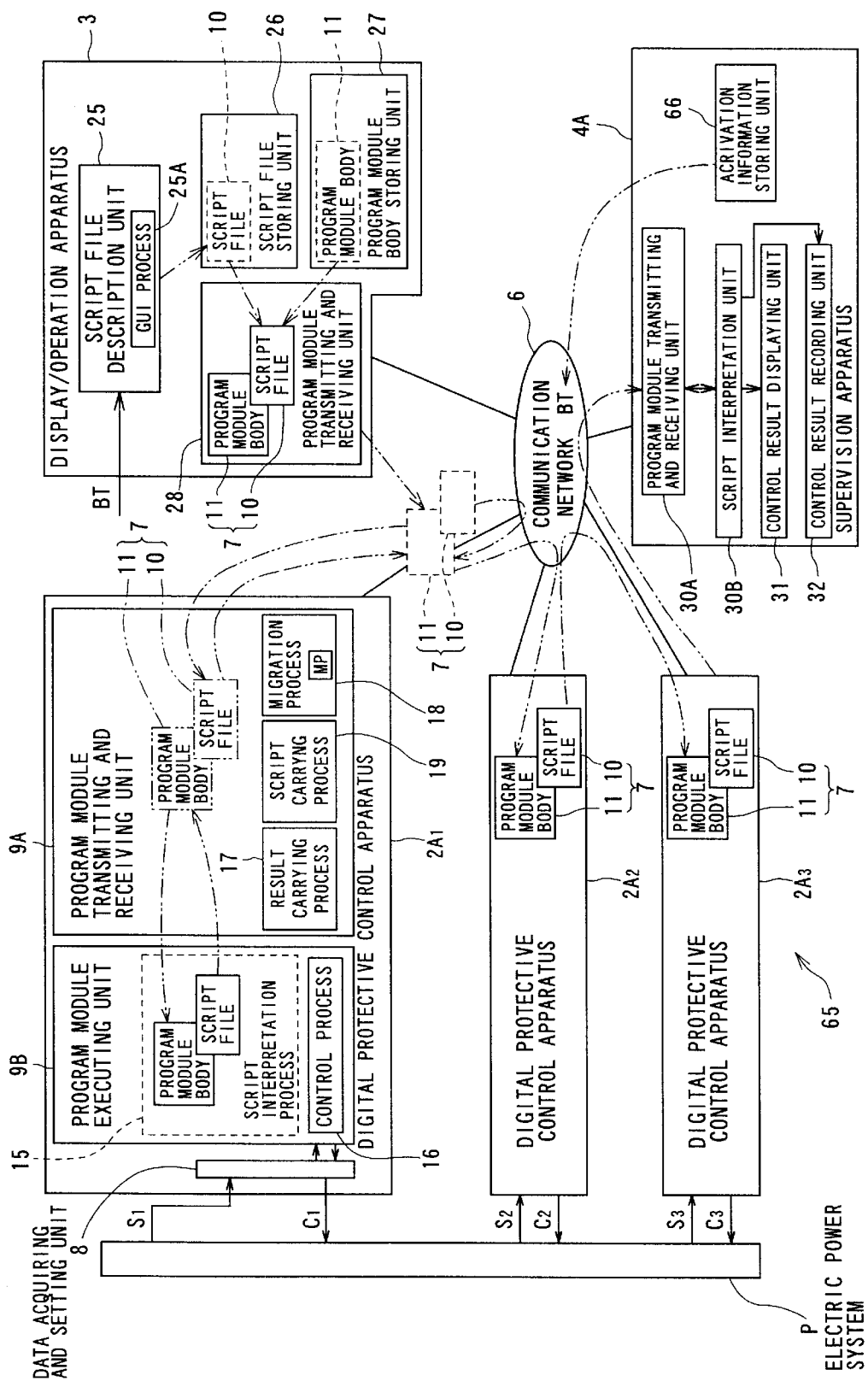
FIG. 15 is a diagram showing components of functional blocks of an electric power system protective control system according to a fourth embodiment of the present invention.

The components of the functional blocks of an electric power system protective control system 65 according to the present embodiment will be shown in FIG. 15.

According to FIG. 15, a supervision apparatus 4A (CPU 57 thereof) comprises an activation (start) information storing unit 66 for storing an activation information in the memory 58 as an activation information table BT, wherein the activation information is obtained so that the CPU 57 monitors (supervises) the apparatuses 2*a*1 to 2*a*3 (migration process programs MP thereof) of the respective substations Ts1 to Ts3.

The activation information expresses whether or not the respective digital protective control apparatuses 2*a*1 to 2*a*3 (migration process programs MP) is energized.

FIG. 16 is a diagram showing the activation information table BT of the respective apparatuses 2*a*1 to 2*a*3 of the respective substations Ts1 to Ts3 stored in the memory 58.

According to FIG. 16, in the activation information table BT, the respective names of the substations (respective names of the apparatuses) are stored in advance, and the activation information (○ or X) is stored corresponding to the respective names of the substations (respective names of the apparatuses).

For example, in the present embodiment, "activation information ○" is stored for the activated substations Ts1 and Ts3 (apparatuses 2*a*1 and 2*a*3), and which are energized, and "activation information X" is stored for the substation Ts2 (apparatus 2*a*2) which is not activated (started).

The supervision apparatus 4A (CPU 57 thereof) monitors the conditions of the respective apparatuses 2*a*1 to 2*a*3 (migration process programs MP thereof) at all times by regularly performing the communication with the respective apparatuses 2*a*1 to 2*a*3 (migration process programs MP thereof) of the respective substations Ts1 to Ts3, and the apparatus 4A (CPU 57), when confirming activation or stop of activation, rewrites the activation information of the activation information table BT.

Incidentally, since the components of other functional blocks of the electric power system protective control system 65 according to the present embodiment and the components of the hardware for concretely implementing the processes of these respective functional blocks are substantially equal to those in FIG. 2 and FIG. 5 of the first embodiment, the description thereof will be omitted.

The remote operator in the electric power system protective control system 65 of the present embodiment performs the process shown hereinafter before describing the protection and control procedure on the screen of the monitor 51*a* in the document format.

Figure 17:
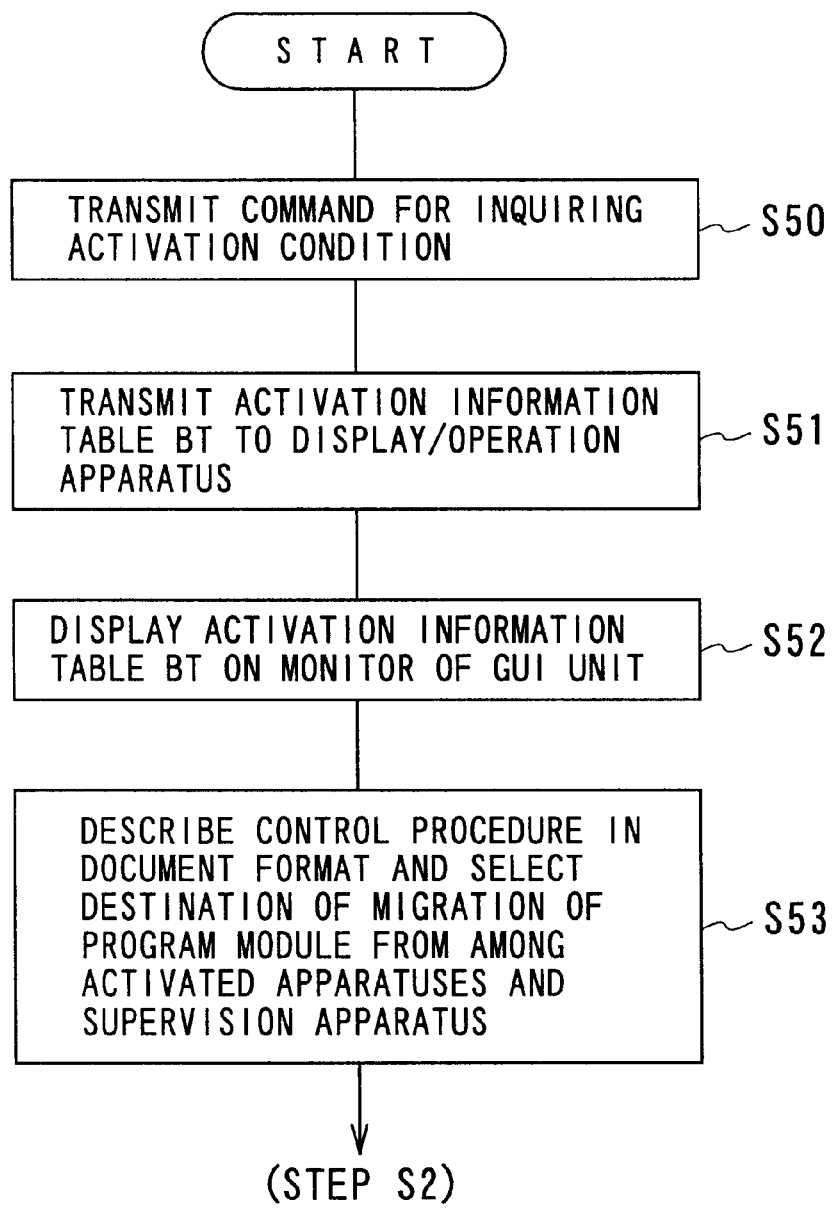
FIG. 17 is a schematically flow chart showing an example of processes of an electric power system protective control system of the fourth embodiment.

That is, the remote operator operates the input device 51*b* of the GUI unit 51 of the display/operation apparatus 3 to transmit a command (inquiry command) for inquiring the activation conditions of the respective substations Ts1 to Ts3 (respective apparatuses 2*a*1 to 2*a*3) to the supervision apparatus 4A (FIG. 17; step S50).

The CPU 57 of the supervision apparatus 4A receives the transmitted inquiry command through the communication interface 55 and the like so as to transmit the activation information table BT to the display/operation apparatus 3 through the wide area network 41, the Ethernet LAN 39 and the like (step S51).

The CPU 53 of the display/operation apparatus 3 receives the transmitted activation information table BT through the communication interface 50 or the like so as to display the activation information table BT on the monitor 51*a* of the GUI unit 51 (step S52).

Then, the remote operator describes the control procedure (script) in the document format by operating the input device 51*b* of the GUI unit 51 while referring to the activation information table BT displayed on the monitor 51*a*. At this moment, the operator selects the destination of migration of the program module 7 in the migration route of the control procedure from among the apparatuses except for the inactivated digital protective control apparatuses, that is, the activated apparatuses 2*a*1, 2*a*3 (substations Ts1 and Ts3) among the apparatuses 2*a*1 to 2*a*3 (substations Ts1 to Ts3) and the supervision apparatus 4A so as to describe the selected apparatus (step S53), and the CPU 53 performs the process of step S2. As a result, the script file 10D which has set at least one of the substations Ts1, Ts3 of the activated digital protective control apparatuses 2*a*1, 2*a*3 and the supervision apparatus 4A as the destination of the cyclic migration, is stored in the memory 52 by the process of step S2 of the CPU 53.

After the step S2 of the CPU 53, the program module 7 migrates to the activated apparatuses except the inactivated apparatus through the wide area network 41 by the processes of step S3 to step S6.

That is, in the present embodiment, since the destination of the migration of the script file 10D is set from among the activated digital protective control apparatuses 2*a*1, 2*a*3 and the supervision apparatus 4A, it is possible to prevent the program module 7 being stagnated due to the inactivated state of the digital protective control apparatus of the substation of the destination of migration, and to migrate the program module 7 on a very efficient route.

(Fifth Embodiment)

Figure 18:
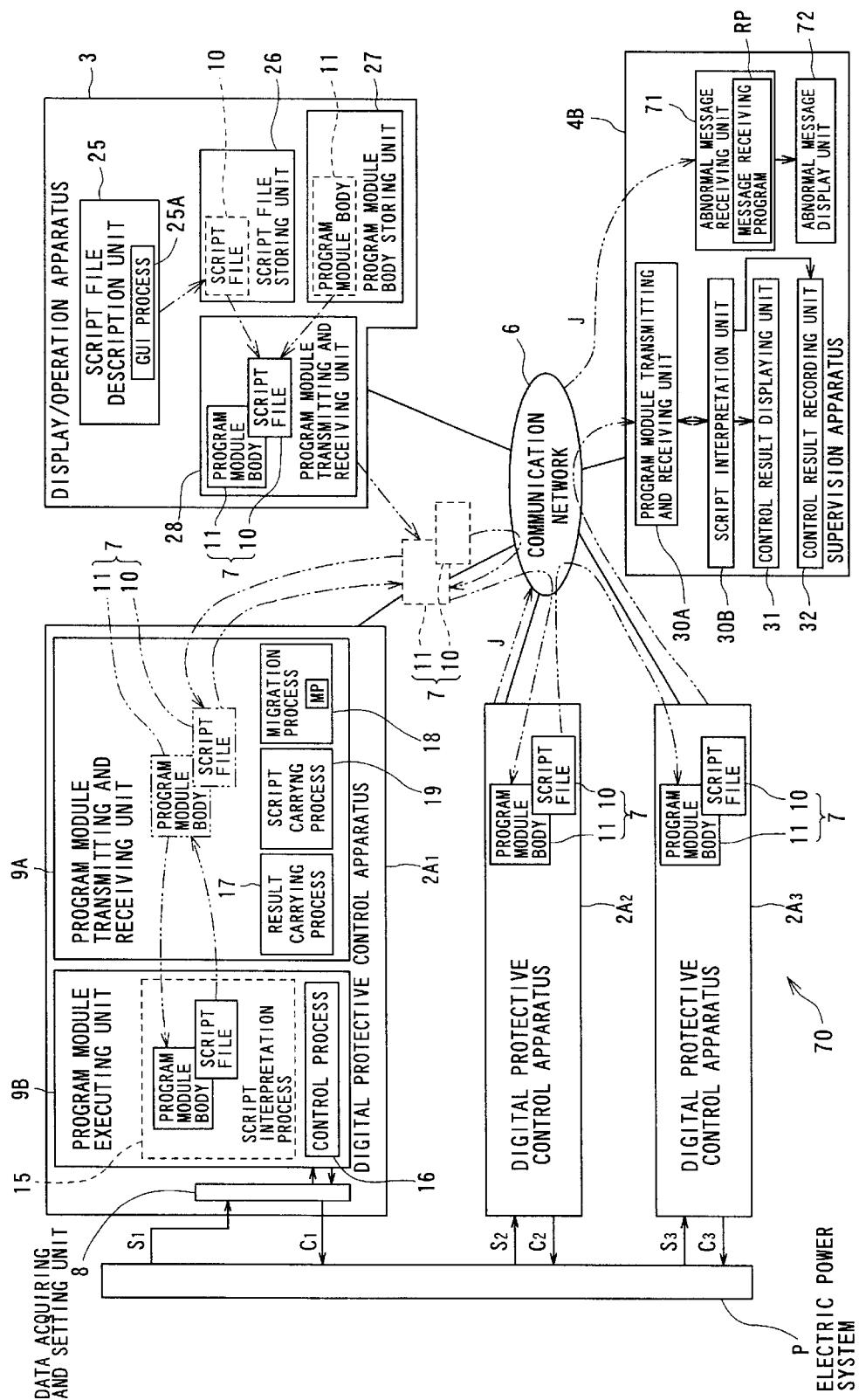
FIG. 18 is a diagram showing components of functional blocks of an electric power system protective control system according to a fifth embodiment of the present invention.

The components of the functional blocks of an electric power system protective control system 70 according to the present embodiment will be shown in FIG. 18.

According to FIG. 18, the supervision apparatus 4B of the electric power system protective control system 70 of the present embodiment stores in advance a message receiving program RP prepared by, for example, the rmi method and the sleep method of the thread class of Java in the memory 58. The supervision apparatus 4B (the CPU 57 thereof) comprises an abnormal message receiving unit 71 for activating the message receiving program RP so as to receive the data (abnormal message) expressing the control abnormality transmitted from the apparatuses 2a1 to 2a3 of the respective substations Ts1 to Ts3, and abnormal message display unit 72 for displaying the received abnormal data (abnormal message) on the monitor 56a of the console 56.

Incidentally, since the components of other functional blocks of the electric power system protective control system 70 according to the present embodiment and the components of the hardware for concretely implementing the processes of these respective functional blocks are substantially equal to those in FIG. 2 and FIG. 5 of the first embodiment, the description thereof will be omitted.

Figure 19:
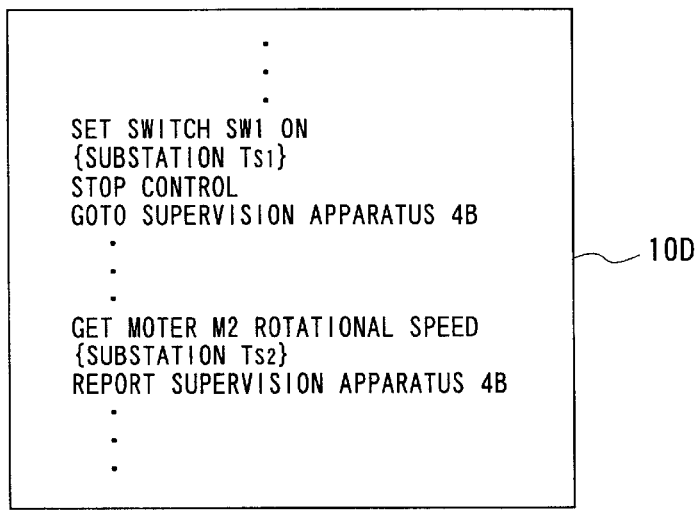
FIG. 19 is a view showing an example of a script file related to the fifth embodiment.

On the other hand, when describing the control procedure shown in FIG. 4 on the screen of the monitor 51a in the document format by operating the input device 51b of the GUI unit 51, the remote operator in the control system 70 of the present embodiment inserts, for example, the statements shown in FIG. 19 after, for example, the control statement (statement "set" or the like) to the substations Ts1 and Ts2 among the plurality of substations Ts1 to Ts3 (digital protective control apparatuses 2a1 to 2a3) so as to prepare the script (script file 10D).

As shown in FIG. 19, after the statement "set" of the control operation statement of the substation Ts1 (digital protective control apparatus 2a1), the statements of "{substation Ts1}", "stop control", and "goto supervision apparatus 4B" are additionally inserted and described so that the script (script file 10D) is prepared.

The statements of "{substation Ts1}", "stop control", and "goto supervision apparatus 4B" express the contents in that [in the case where abnormality occurs in the control operation at the substation Ts1 (apparatus 2a1), the control operations after the substation Ts1 are stopped so that the destination of the migration of the program module 7 is changed to the supervision apparatus 4B].

For example, the abnormality occurs in a case where the quantities of state cannot be gotten from the object of protective control because of a failure of the object of protective control or the like, or in a case where a control operation value (relay setting value or the like) exceeding the range of capability of protective control is set. The abnormality of this embodiment is also generically referred to as control abnormality in the present specification).

Similarly, after the statement "get" of the control operation statement of the substation Ts2 (digital protective control apparatus 2a2), the statements of "{substation Ts2}" and "report supervision apparatus 4B" are additionally inserted and described, which express the contents of [reporting the occurrence of the control abnormality to the supervision apparatus 4B when the control abnormality occurs in the substation Ts2 (apparatus 2a2)].

When the script file 10D is described like this, the CPU 46a of the control apparatus 2a1 of the present embodiment interprets the script file 10D (fourth line of the control procedure) by the process of step S7 so as to perform the control operation for switching on the switch sw1 of the electric power system P according to the contents of description ("set switch sw1 ON") (step S8).

At this moment, the CPU 46a judges whether or not a control abnormality has occurred in the above control operation (FIG. 20; step S60), and in the case where a control abnormality has occurred in the above control operation as a result of this judgment (step S60→YES), the CPU 46a interprets the additionally additionally inserted control procedure after the fifth line. That is, the CPU 46a interprets "{substation Ts1}", "stop control", and "goto supervision apparatus 4B" so as to stop the above control operation at once according to the interpreted result (step S61), and the CPU 46a transfers the program module 7 to the supervision apparatus 4B by the process based on the migration process program MP (step S62) so as to end the process.

On the other hand, in the case where no control abnormality has occurred in the control operation in the digital protective control apparatus 2a1 of the substation Ts1 (step S60→NO), the processes expressed by step S9 to S11 shown in FIG. 6 are performed.

After the process of step S11 (migration process of the program module 7 to the substation Ts2 (apparatus 2a2)), the CPU 46a of the digital protective control apparatus 2a2 interprets the script file 10D (ninth line including the additionally inserted statement of the control procedure) by the process of step S12 (step S12), and the CPU 46a performs the control operation for getting the rotational speed (electric quantity data expressing the rotational speed) of the motor m2 of the electric power system P according to the contents of description ("get motor m2 rotational speed") (step S13).

At this moment, the CPU 46a judges whether or not a control abnormality has occurred in the above control operation (step S63), and in the case where no control abnormality has occurred as a result of this judgment (step S63→NO), the processes processes expressed by step S14 and afterward shown in FIG. 6 are performed.

On the other hand, in the case where a control abnormality has occurred in the above control operation as a result of the judgment of step S63 (step S63→YES), the CPU 46a transmits the data (abnormal message J) expressing the control abnormality to the supervision apparatus 4B through the wide area network 41 and the like on the basis of the migration process program MP (especially, the rmi method in Java and the sleep method of the thread class) by interpreting "{substation Ts2}" and "report supervision apparatus 4B" of the tenth line and afterward of the additionally inserted control procedure (step S64).

On the other hand, the CPU 57 of the supervision apparatus 4B activates in advance the message receiving program RP previously stored in the memory 58, and the CPU 57 receives the abnormal message J transmitted from the digital protective control apparatus 2a2 through the wide area network 41 and the like according to the message receiving program RP (step S64), and so as to display the received abnormal message J on the monitor 56a of the console 56 (step S65), thereby ending the process.

As mentioned above, according to the present embodiment, while performing the control operation based on the program module in a certain digital protective control apparatus, even if a control abnormality such as a case where the quantities of state cannot be gotten from the object of protective control because of a failure of the object thereof or a case where a control operation value (relay setting value or the like) exceeding the range of capability of protective control is set, has occurred, it is possible to stop the control operation at once corresponding to the occurrence of a control abnormality (referred to step S61), thereby transmitting the program module to the supervision apparatus 4B (referred to step S62).

Furthermore, in the case where the above control abnormality has occurred, it is possible to transmit an abnormality message expressing the control abnormality to the supervision apparatus 4B according to the control abnormality.

Therefore, even if a control abnormality such as a setting abnormality has occurred, an immediately response such as the stop process of the corresponding control operation or the abnormal message transmitting process is able to be made, making it possible to improve the reliability and economical efficiency of the electric power system protective control system.

Incidentally, in the present embodiment, the supervision apparatus 40B displays and outputs the abnormal message transmitted from the respective digital protective control apparatuses 2a1 to 2a3 on the monitor 56a of the console 56, but in addition to these display and output process, it is also possible to perform the warning output process such as a process of sounding a warning buzzer previously provided in the console 56, flashing an alarm lamp previously provided in the console 56, or sending warning information to a specific telephone number, by, for example, activating a warning output program (not shown in the figure) which has previously been resident in the memory 58.

By performing a warning output process like this, highly developed and various types of reports to the outside for a control abnormality is possible.

(Sixth Embodiment)

Since the components of the functional blocks of an electric power system protective control system 1C according to the present embodiment and the components of the hardware for concretely implementing the processing of these respective functional blocks are substantially equal to those in FIG. 2 and FIG. 5 of the first embodiment, the description thereof will be omitted.

In the first embodiment to the fifth embodiment, the results of the control operations are transported together with the program module 7 in the state of being integrated with the program module 7 as internal variables thereof, by the result carrying process (step S9, step S14 and the like of the above FIG. 6) of the CPU 46a.

At this moment, the size of the data expressing the results of the control operations gradually gets to be larger, as the cyclic migration to a plurality of digital protective control apparatuses of the program module 7 is performed, and in some cases, it is not efficient to transport the results of the control operations with a large size like this, integrally together with the program module 7 at all times.

For example, in the case where the results of the control operations are carried by being stored in the class variables of Java as internal variables in the program module 7, the data size capable of being stored by one variable is determined to be approximately 50 K bytes in Java because of the restriction of the programming language, and therefore, in the case where the data size expressing the results of the control operations exceeds 50 K bytes, the data should be stored by being divided into a plurality of variables.

However, when the results of the control operations are migrated by being divided into a plurality of variables and by being integrated with the program module 7, the migration speed of the program module 7 itself is affected, and therefore, in the case where the data size expressing the results of the control operations stored in the one variable exceeds, for example, the data size of 50 K bytes allowable to one variable, it is also preferable to transmit the data expressing the results of the control operations once to the supervision apparatus 4, from the viewpoint of the above migration speed of the program module 7.

From the viewpoint of a background like this, the upper limit value (for example, 50 K bytes) of the data size capable of being integrated with the program module 7 is stored in advance for the RAM 46b (or the ROM 46c) of each of the digital protective control apparatuses 2a1 to 2a3 of the present embodiment.

Then, the CPU 46a of each of the digital protective control apparatuses 2a1 to 2a3 judges whether or not the size of the data expressing all results of the control operations stored as internal variables of the program module 7 exceeds the upper limit value, after the process of step S9, step S14 or the like of the above FIG. 6, that is, after storing the results of the control operations in the program module 7 as internal variables.

In the case where the size does not exceed the upper limit value as a result of this judgment, the CPU 46a changes over to the process of the next step (step S10, step S15 or the like).

On the other hand, in the case where the size exceeds the upper limit value as a result of the above judgment, the CPU 46a of each of the apparatuses 2a1 to 2a3 transmits the results of protective control to the supervision apparatus 4, so as to change over to the process of step S10, step S15 or the like, thereby performing the process of step S10, step S15, or the like.

Incidentally, the transmitting method to the supervision apparatus 4 is substantially equal to the abnormal message transmitting method in the fifth embodiment.

In the supervision apparatus 4, the results of the control operations are displayed on the monitor 56a of the console 56, and further, they are recorded in the external recording unit 59, for example, by performing the processes similar to the processes of step S16 to step S18 of the above FIG. 6.

Thus, according to the present embodiment, in the case where the size of the data expressing the results of the control operations to be integrated with the program module 7 exceeds the upper limit value (for example, 50 K bytes) having a possibility of affecting the migration speed of the program module itself, the data expressing the results of the control operations is once transmitted to the supervision apparatus 4, and the program module can be migrated to the digital protective control apparatus of the next destination of transportation, again.

Accordingly, it is possible to carry the results of the control operations having a proper size which does not affect the migration speed of the program module, together with the program module, and it is possible to efficiently migrate the program module.

(Seventh Embodiment)

In the above first embodiment to sixth embodiment, the description of the respective substations in the script file 10 is simply described as "substations Ts1 to Ts3", but in the actual system, it is necessary that the migration process program MP can understand the name of the substation, that is, the destination of the migration of the program module 7.

For example, in the migration process program MP based on the rmi method of Java, it should be the URL (Uniform Resource Locator) format which is the address of the information provider on the Internet.

In the first embodiment to sixth embodiment, it is sufficient sufficient that the process program for converting the above substations Ts1 to Ts3 into the communication network addresses (hereafter, referred to as URL) is prepared in advance in the script interpreting program 11a, or that only the parts of the names of the substations Ts1 to Ts3 are prepared in advance by using the address (URL) considering the communication program when describing the script file 10.

However, when using the above method, in the case where the URL corresponding to the substation is changed, it is necessary to each time change the script interpretation program 11a of the program module 7 (in the former case) or the script file 10 (in the latter case), and there has been an anxiety to worsen the maintainability of the system. Especially, in the latter case, it is the remote operator that prepares the script file 10 so that it has actually been preferable to avoid the description considering the communication program as much as possible.

Figure 21:
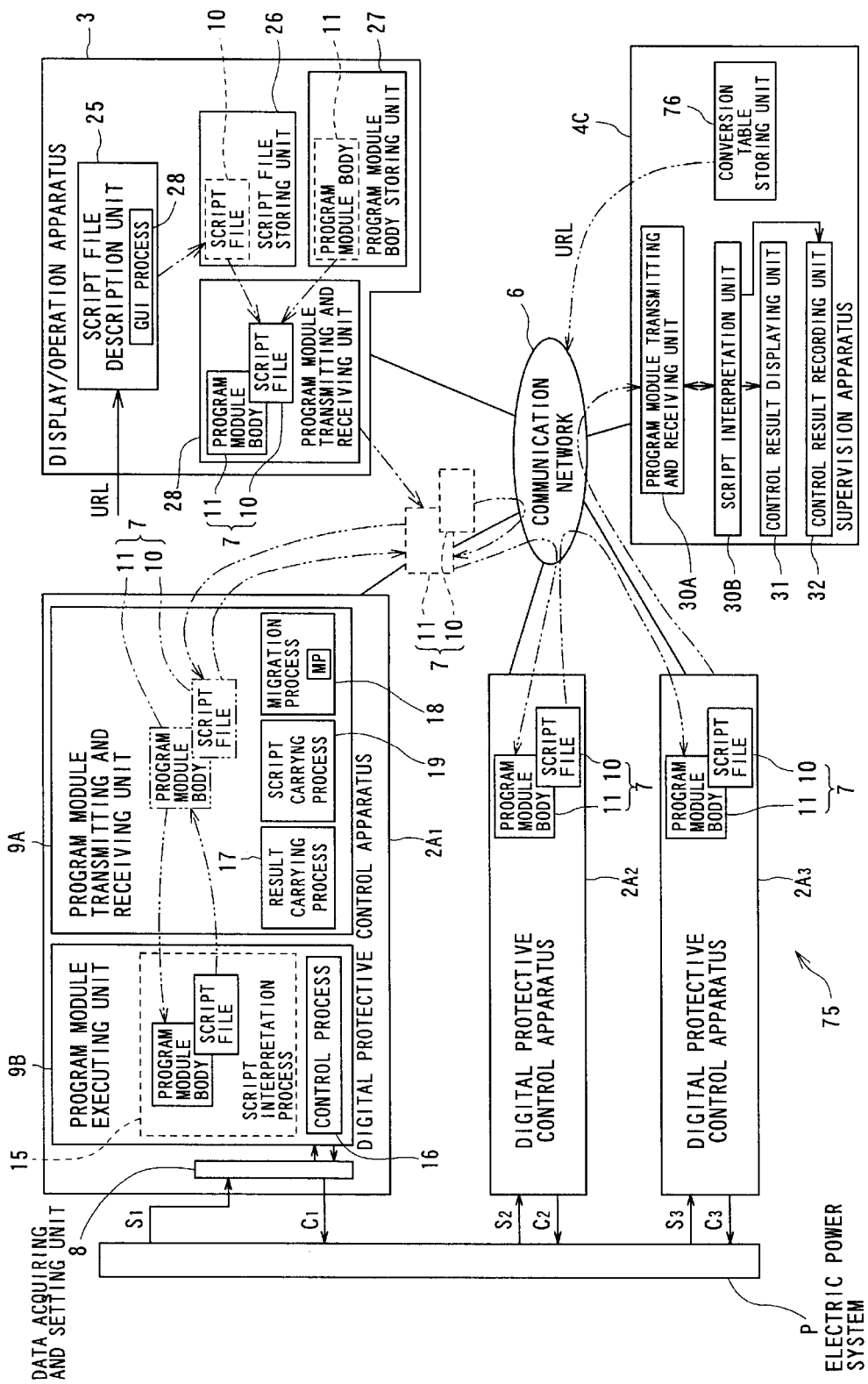
FIG. 21 is a diagram showing components of functional blocks of an electric power system protective control system according to a seventh embodiment of the present invention.

Therefore, on the basis of the above situation, the components of the functional blocks of an electric power system protective control system 75 according to the present embodiment is formed as shown in FIG. 21.

That is, according to FIG. 21, the supervision apparatus 4C (CPU 57 thereof) of the electric power system protective control system 75 of the present embodiment comprises a conversion table storing unit 76 previously storing, in the memory 58, a conversion table CT in which the data expressing the names of the respective substations (names capable of being understood by the human system; Ts1 to Ts3) and the data (communication network address) expressing the names capable of being understood by the migration process (communication) program MP are associated. The CPU 57 is operative to convert the names of the substations Ts1 to Ts3 into the communication network addresses by referring the conversion table CT.

Figures 22, 23:
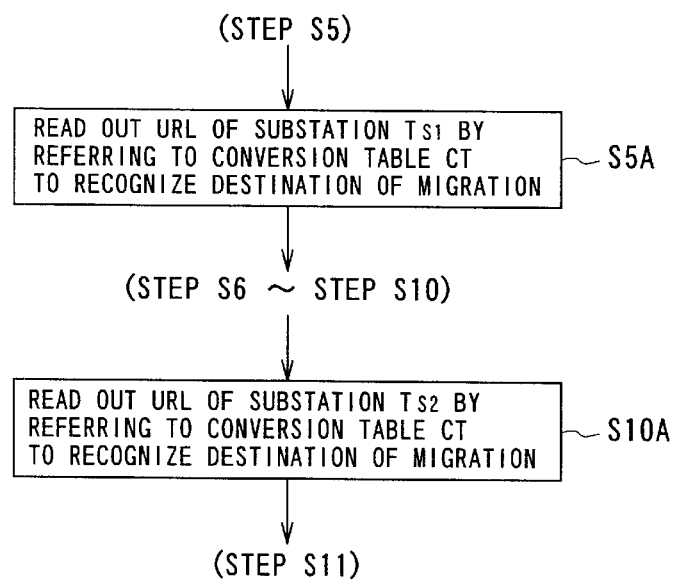
FIG. 22 is a diagram showing a conversion table in which communication network addresses corresponding to respective substations are stored is memorized in a memory according to the seventh embodiment.
FIG. 23 is a schematically flow chart showing an example of processes of an electric power system protective control system of the seventh embodiment.

FIG. 22 is a diagram showing the conversion table CT in which the communication network addresses corresponding to the respective substations Ts1, Ts2, . . . are stored is memorized in the memory 58.

According to FIG. 22, the names of the respective substations (substations Ts1, Ts2, . . . ) and the communication network addresses (URL) {rmi://hendents1.aaaaaaaa.toshiba.co.jp/manager, rmi://hendents2.xxxxxxxx.toshiba.co.jp/manager, . . . } of these names of the substations (substations Ts1, Ts2,. . . ) are associated and coordinated to be stored in the conversion table CT.

At this moment, the CPU 53 of the display/operation apparatus 3 according to the present embodiment interprets the control procedure "goto substation Ts1" in the process of step S5, and after that, the CPU 53 refers to the conversion table CT stored in the memory 58 of the supervision apparatus 4C and reads out the URL {rmi://hendents1.aaaaaaaa.toshiba.co.jp/manager} corresponding to the substation Ts1 so as to recognize the destination of transportation (FIG. 23; step S5a), thereby changing over to the process of step S6.

Similarly, the CPU 46a of the digital protective control apparatus 2a1 interprets the control procedure "goto substation Ts2" in the process of step S10, and after that, the CPU 46a refers to the conversion table CT stored in the memory 58 of the supervision apparatus 4C so as to read out the URL {rmi://hendents2.xxxxxxxx.toshiba.co.jp/manager} corresponding to the substation Ts2, thereby recognizing the destination of migration (FIG. 23; step S10a). Thereafter, the CPU 46a shifts to the process of step S6. Incidentally, the situation is also the same in the program module migration process in step S15 of the CPU 46a of the digital protective control apparatus 2a2.

That is, according to the present embodiment, it is possible for the remote operator to prepare the parts of the names of the substations Ts1 to Ts3 in the document format capable of being understood by the human system without considering the communication program.

Furthermore, in the present embodiment, even in the case where the URL corresponding to the substation is changed, it is sufficient to rewrite the contents of the conversion table CT of the supervision apparatus 4C, and it is unnecessary to change the script interpretation program 11a of the program module 7 or the script file 10, making it possible to improve the maintainability of the protective control system.

(Eight Embodiment)

In the preparation of the script file 10 according to the above first embodiment to seventh embodiment, the remote operator describes the control procedure including, for example, the names of the substations, objects of control, and the control operation, but the work to actually describe the substation (digital protective control apparatus), the object of control of the substation (digital protective control apparatus), and the control operation for each substation is a slow work, and further, in the case where the human system such as the remote operator performs the description work, there is the possibility to accidentally describe the system equipment devices or the like which are not the objects of control of the substation (digital protective control apparatus).

Figure 24:
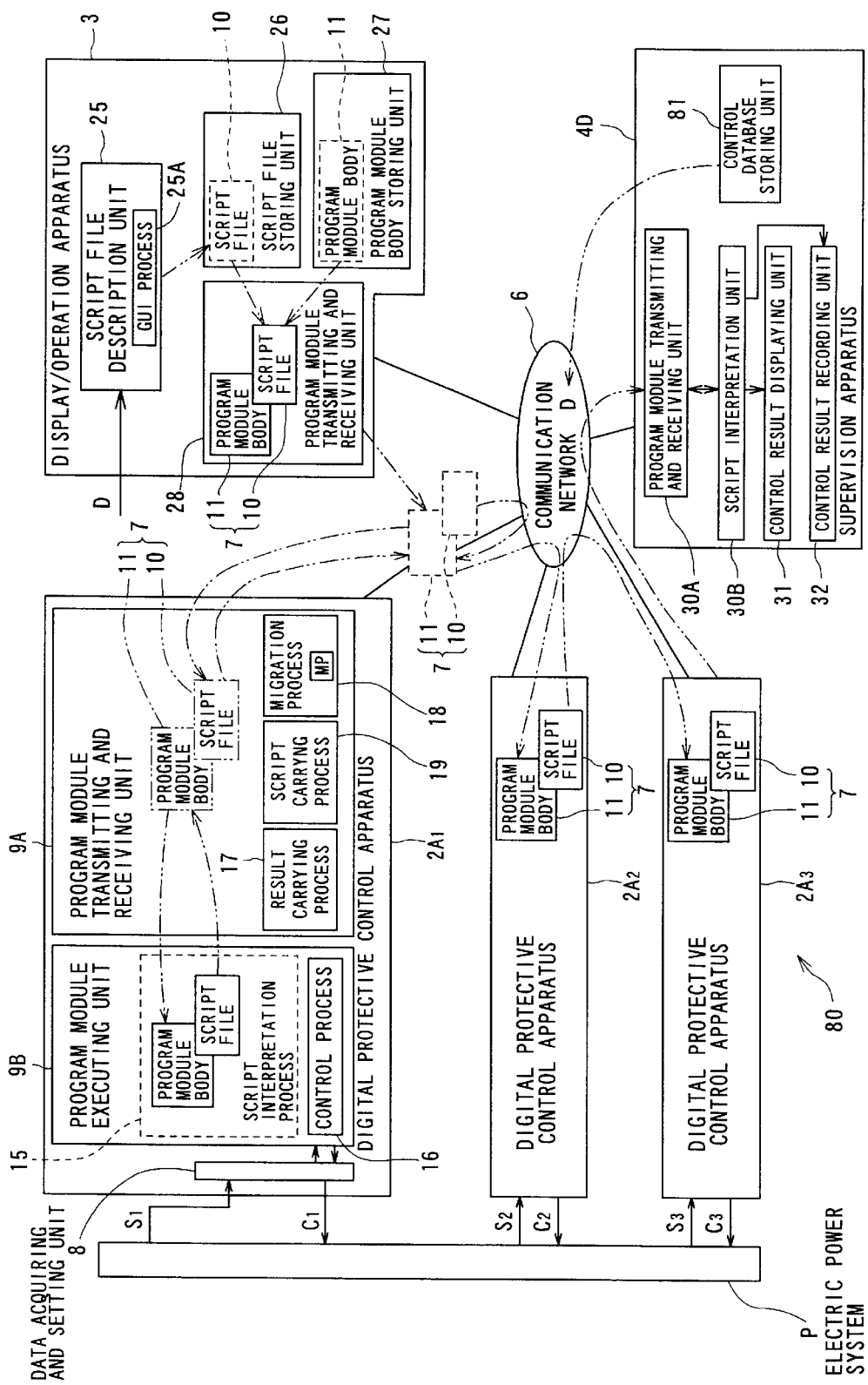
FIG. 24 is a diagram showing components of functional blocks of an electric power system protective control system according to an eighth embodiment of the present invention.

Therefore, on the basis of the above situation, the components of the functional blocks of an electric power system protective control system 80 according to the present embodiment is made as shown in FIG. 24.

That is, according to FIG. 24, the supervision apparatus 4D (CPU 57 thereof) of the electric power system protective control system 80 of the present embodiment comprises a control database storing unit 81 for preparing in advance and storing, in the external recording unit 59, a control database 81A.

The control database 81A includes the names (data) of the respective substations, the names (data) of the protective control apparatuses corresponding to the respective substations, and the data expressing the control operation having a high possibility of being performed in the respective protective control apparatuses so that the names (data) of the respective substations, the names (data) of the protective control apparatuses and the data expressing the control operation are mutually associated.

Figure 25:
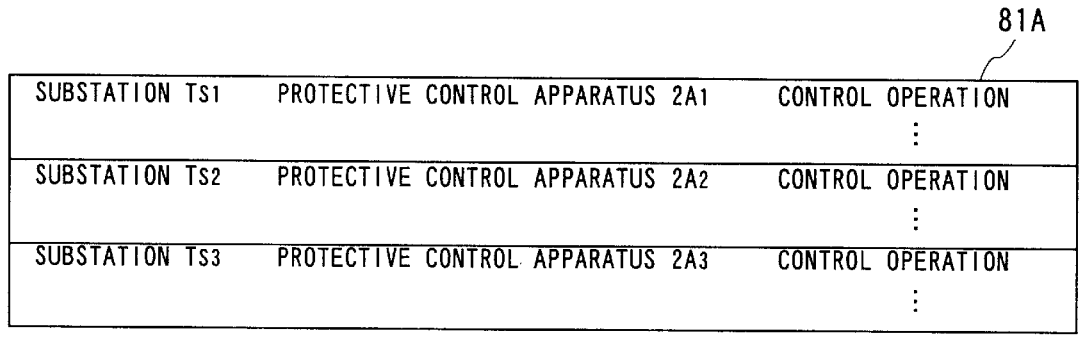
FIG. 25 is a view showing a control database stored in a memory according to the eighth embodiment.

One example of the control database 81A is shown in FIG. 25. According to FIG. 25, the substations Ts1 to Ts3, the digital protective control apparatuses 2a1 to 2a3 corresponding to the substations Ts1 to Ts3, and the data of the control operation are mutually associated so as to be respectively stored in the control database 81A.

Figure 26:
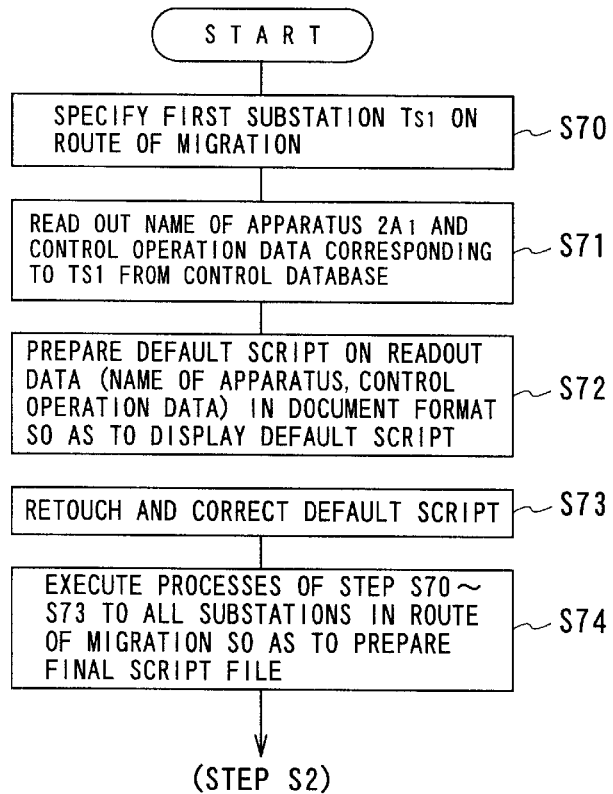
FIG. 26 is a schematically flow chart showing an example of processes of an electric power system protective control system of the eighth embodiment.

At this moment, the remote operator in the electric power system protective control system 80 of the present embodiment operates the input device 51b of the GUI unit 51 of the display/operation apparatus 3 to specify the first substation (Ts1) based on the desired route of migration (FIG. 26; step S70).

The CPU 53 reads out the name of the digital protective control apparatus 2a1 corresponding to the specified substation Ts1 and the control operation data from the control database 81A stored in the external recording unit 59 of the supervision apparatus 4D (step S71), and on the basis of the read-out data D, the CPU 53 prepares the control procedure (default script) in the document format including the digital protective control apparatus 2a1 and the data of the control operation corresponding to the apparatus 2a1 so at to display the control procedure on the monitor 51a (step S72).

The remote operator retouches and corrects the default script displayed on the monitor 51a by using the input device 51b of the GUI unit 51 if necessary (step S 73). As a result, the script for the substation Ts1 is prepared.

Then, while specifying the substations Ts2 and Ts3 along the route of migration, the remote operator prepares the final script file 10E by the default script generating process and the retouching and correcting process based on the above step S70 to step S73 (step S74), and shifts to the process of step S2.

That is, according to the present embodiment, since it is permitted to prepare the script file 10E by using the default script file 81A which is stored in the external recording unit 59 of the supervision apparatus 4D and which includes the control procedure (default script) in the specified document format, it is possible to immediately and accurately describe the script file 10E. Furthermore, the quantity of the script actually described by the remote operator is reduced, making it possible to reduce the possibility that errors of description occurs to the script file 10E.

(Ninth Embodiment)

Figure 27:
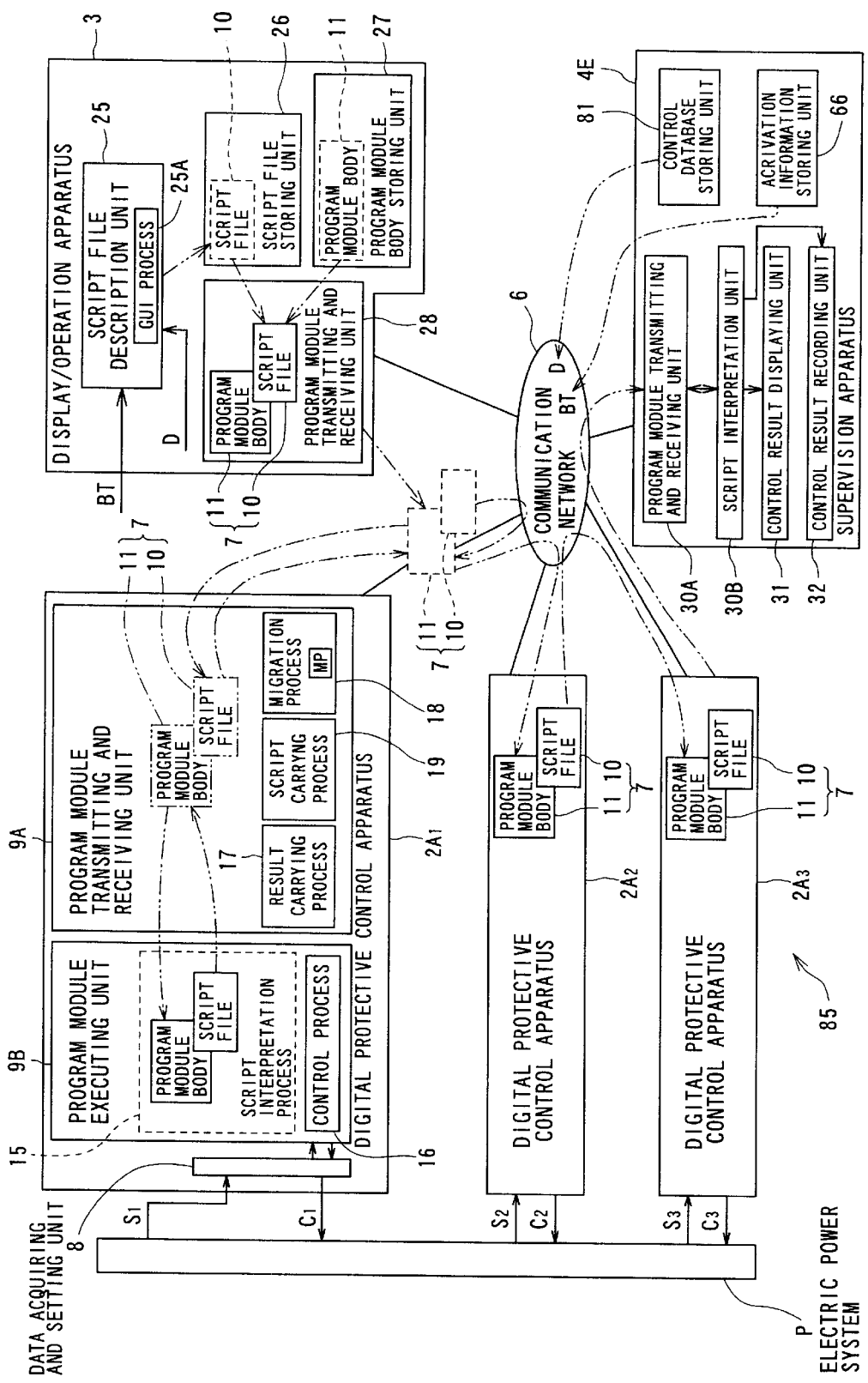
FIG. 27 is a diagram showing components of functional blocks of an electric power system protective control system according to an ninth embodiment of the present invention.

The components of the functional blocks of an electric power system protective control system 85 according to the present embodiment will be shown in FIG. 27.

According to FIG. 27, the supervision apparatus 4E (CPU 57 thereof) of the electric power system protective control system 85 of the present embodiment comprises an activation information storing unit 66 (referred to the above FIG. 15) for storing in the memory 58 the activation information table BT shown in the above FIG. 16 and a control database storing unit 81 for storing in advance the control database 81A which is previously prepared and shown in the above FIG. 25 in the external recording unit 59.

According to the present embodiment, the CPU 53 of the display/operation apparatus 3 reads out the name of the digital protective control apparatuses 2a1 to 2a3 corresponding to the specified substations Ts1 to Ts3 and the data of the control operation (referred to generically as the data D) from the database 81A stored in the memory 60 of the recording unit 5A by the processes of step S70 to step S72 and step S74 in the above FIG. 26, and after that, the CPU 53 transmits the activation condition inquiry commands of the respective substations Ts1 to Ts3 (respective units 2a1 to 2a3) to the supervision apparatus 4A similarly to the process of step S50 in the above FIG. 17.

The CPU 57 of the supervision apparatus 4A transmits the activation information table BT to the display/operation apparatus 3 through the wide area network 41, the Ethernet LAN 39 and the like according to the transmitted activation condition inquiry command similarly to the process of step S51 in the above FIG. 17.

At this moment, the CPU 53 of the display/operation apparatus 3 refers to the transmitted activation information table BT in the processes of step S72 and step S73, and the CPU 53 does not prepare the default script for the digital protective control apparatus 2a2 in which the migration process program MP or the apparatus 2a2 itself is not activated and to which the program module 7 cannot be transported, but the CPU 53 prepares the default script only for the activated digital protective control apparatuses (2a1 and 2a3) so as to display the default script on the monitor 51a, thereby shifting to the retouching and correcting process of step S73 or the like.

That is, according to the present embodiment, because of referring to the activation information table BT, the default script is not prepared for the digital protective control apparatus 2a2 to which the program module 7 cannot be migrated in advance, and therefore, the script can be prepared more efficiently than that of the eighth embodiment.

(Tenth Embodiment)

As mentioned in the first embodiment, the results of the control can be displayed on the monitor 56a of the supervision apparatus 4 or the monitor 51a of the display/operation apparatus 3, and further, the results of the control operations can also be recorded in the external recording unit 59.

At this moment, as mentioned in the eighth embodiment and the ninth embodiment, in the case where the control database 81A is held in the external recording unit 59 of the supervision apparatuses 4D and 4E, it is also possible to enter the results of the protection and control in the control database 81A.

Figure 28:
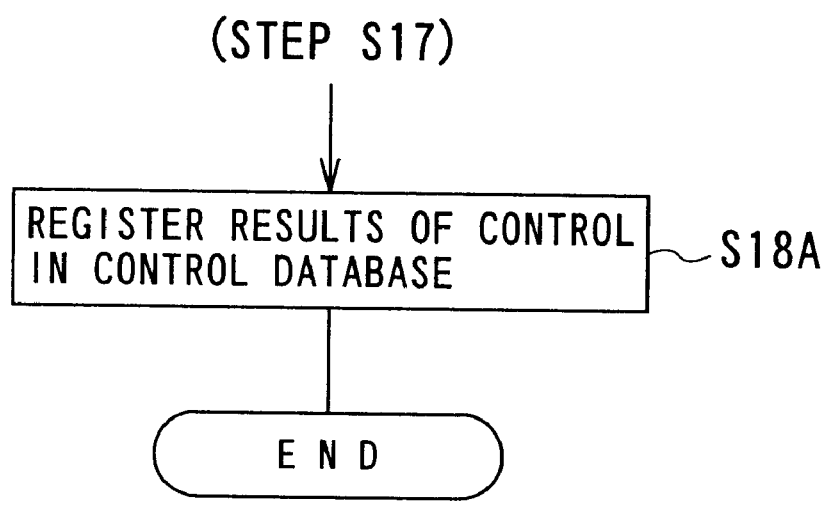
FIG. 28 is a schematically flow chart showing an example of processes of an electric power system protective control system of a tenth embodiment.

That is, in the script file 10F, in the case where the script ("record control result on control database 81A of external recording unit 59") expressing the performance of the process of registering the results of the protective control gotten in the respective digital protective control apparatuses 2a1 to 2a3 in the control database 81A of the recording unit 5A is described, the CPU 57 of the supervision apparatus 4 can register the results of the control of the respective digital protective control apparatuses 2a1 to 2a3 in the control database 81A, by performing the process based on the program (JDBC method (Java Database connectivity) of Java) previously stored in the memory 60 instead of the process of step S18 in the above FIG. 6 (FIG. 28; step S18a).

That is, according to the present embodiment, the results of the control of the respective digital protective control apparatuses 2a1 to 2a3 is able to be automatically registered in the control database, and therefore, it gets to be possible to manage the results of the control more efficiently and accurately.

(Eleventh Embodiment)

In the first embodiment to tenth embodiment, in order to simplify the description, a case is described, where the number of supervision apparatuses (supervision terminals) 4 (4A to 4E) is one.

However, a group of substations such as the substations Ts1 to Ts3 and the like are the objects of control, and they cannot be multiplexed, but the supervision apparatus can be multiplexed since the main function is to integrate and supervise the information (results of the control operations and the like), thereby improving the reliability of the total of the electric power system protective control system.

Figure 29:
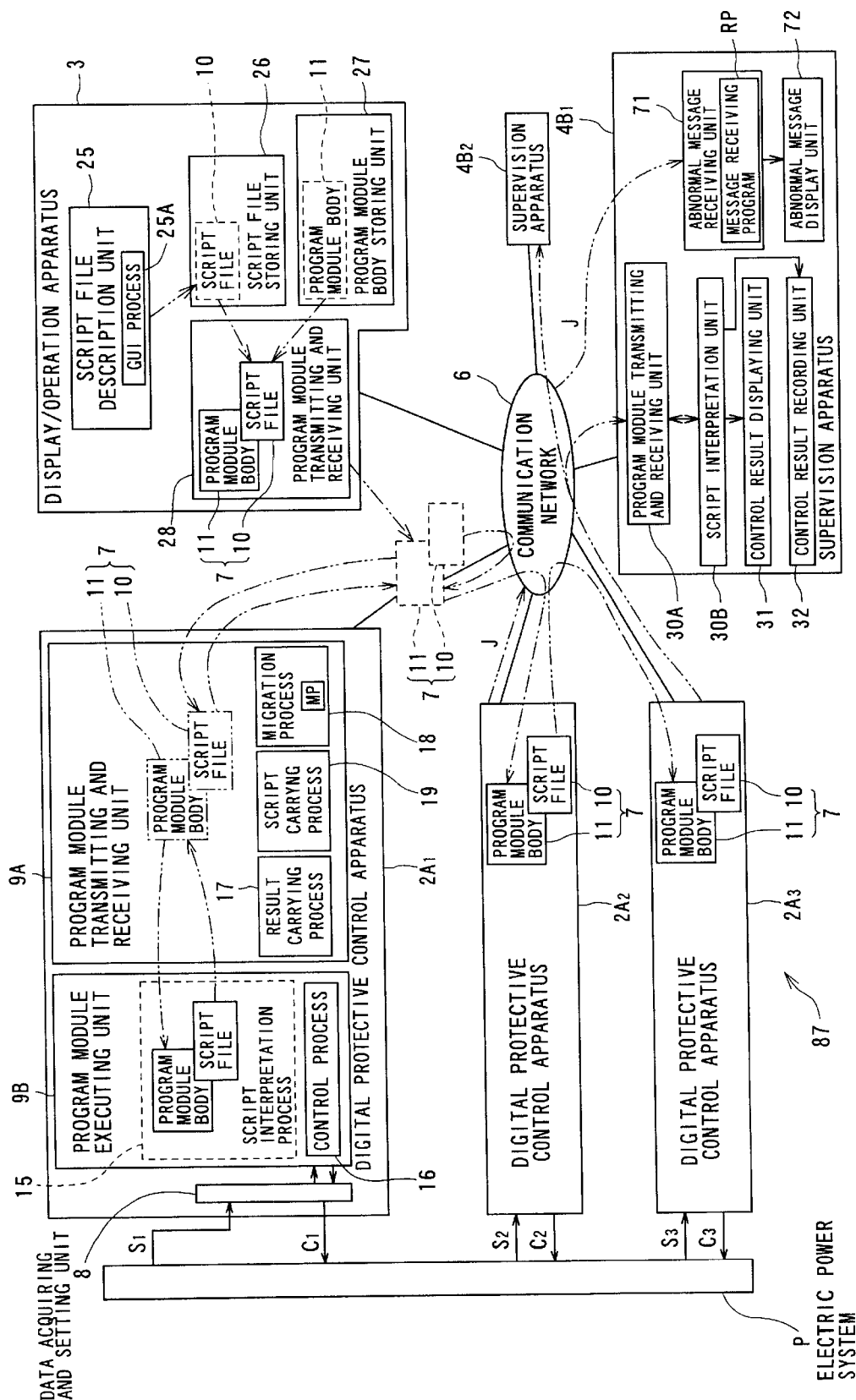
FIG. 29 is a diagram showing components of functional blocks of an electric power system protective control system according to an eleventh embodiment of the present invention.

FIG. 29 is a diagram showing the components of the functional blocks of an electric power system protective control system 87 when the supervision apparatus 4B shown in the above FIG. 18 has been multiplexed (for example, duplex).

According to FIG. 29, the electric power system protective control system 87 comprises duplex supervision apparatuses 4B1 and 4B2. The supervision apparatuses 4B1 and 4B2 can perform the same processes as the supervision apparatus 4B shown in the above FIG. 18.

At this moment, one (supervision apparatus 4B1) of the multiplexed supervision apparatuses 4B1 and 4B2 is determined to be the usually used supervision apparatus, and the supervision apparatus 4B2 is set to be used in the case where the communication (migration of the program module 7 or transmitting of an abnormal message) to the supervision apparatus 4B1 is impossible.

In this electric power system protective control system 87 in which the supervision apparatus is duplex, the remote operator rewrites the script "goto supervision apparatus 4B" as that shown in FIG. 30 when preparing the script (script file 10D) shown in FIG. 4 and FIG. 19.

That is, as shown in FIG. 30, the script is rewritten to the script "goto supervision apparatus 4B1 else supervision apparatus 4B2" expressing the contents in that [in the case where the migration of the program module to the supervision apparatus 4B1 is impossible, the program module is migrated to the supervision apparatus 4B2].

Similarly, "report supervision apparatus 4B" is rewritten to "report supervision apparatus 4B1 else supervision apparatus 4B2" expressing the contents in that [reporting to the supervision apparatus 4B2 is performed in the case where reporting to the supervision apparatus 4B1 is impossible].

Figure 20:
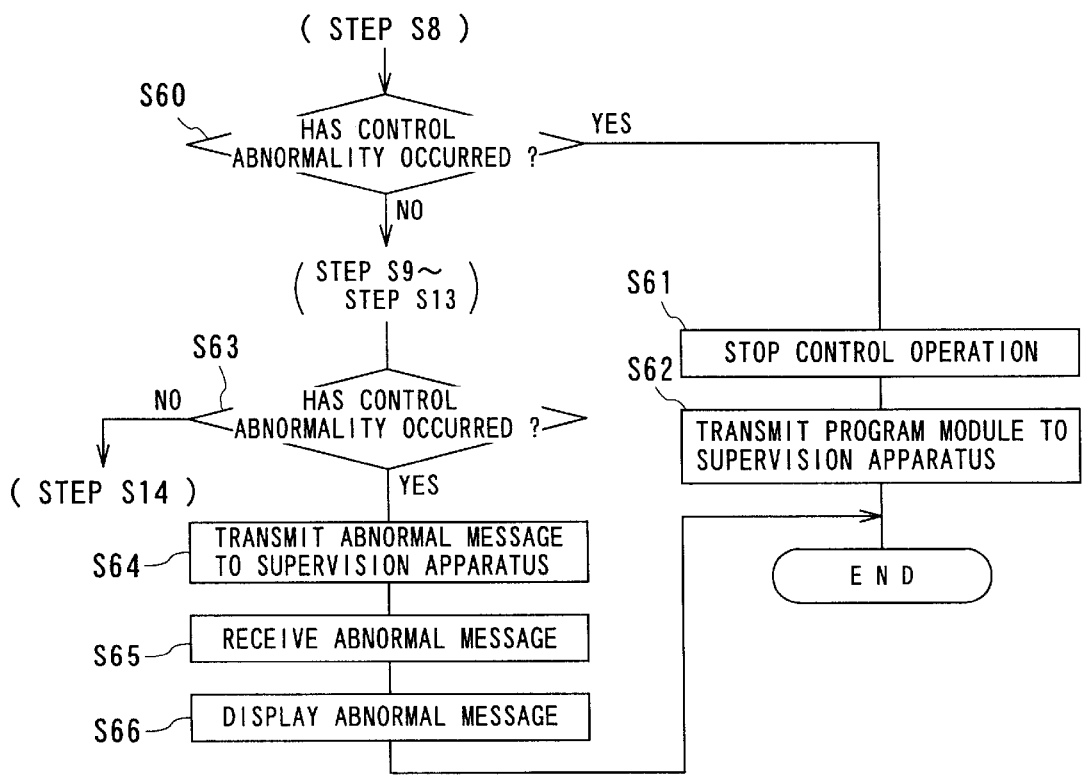
FIG. 20 is a schematically flow chart showing an example of processes of an electric power system protective control system of the fifth embodiment.

When the script file 10D1 is described like this, the CPU 46a of the digital protective control apparatus 2a1 of the present embodiment stops the control operation of the substation Ts1 by the processes of step 60 and step 61 in the above FIG. 20, and after that, the CPU 46a interprets "goto supervision apparatus 4B1 else supervision apparatus 4B2" so as to migrate the program module 7 to the supervision apparatus 4B1 by the process based on the migration process program MP (step S62).

At this moment, the CPU 46a judges whether or not the program module 7 could be migrated to the supervision apparatus 4B1 (FIG. 31; step S80), and in the case where the migration could normally be performed (step S80→YES), the CPU 46A of the substation Ts1 ends the process.

On the other hand, in the case where the migration cannot normally be performed as a result of the judgment of step S80 (step S80→NO), the CPU 46a transmits the program module 7 to the supervision apparatus 4B2 on the basis of the interpretation of the above "goto supervision apparatus 4B1 else supervision apparatus 4B2" (step S81).

As a result, the program module 7 is received by the supervision apparatus 4B2.

Similarly, as a result of the judgment of step S63 in the above FIG. 30, in the case where the CPU 46a of the digital protective control apparatus 2a2 judges that a control abnormality has occurred in the control operation for getting the rotational speed of the motor m2 of the electric power system P, the CPU 46a transmits the abnormal message J to the supervision apparatus 4B1 through the wide area network 41 and the like on the basis of the migration process program MP, by interpreting "{substation Ts2}" and "report supervision apparatus 4B1 else supervision apparatus 4B2" (step S64).

At this moment, the CPU 46a judges whether or not the abnormal message could accurately be transmitted to the supervision apparatus 4B1 (step S82), and in the case where the transmission could accurately be performed (step S82→YES), the CPU 46a shifts to the processes of step S65 and step S66 (abnormal message receiving and displaying process in the supervision apparatus 4B1).

On the other hand, as a result of the judgment of step S82, in the case where the transmission cannot accurately be performed (step S82→NO), the CPU 46a transmits the abnormal message to the supervision apparatus 4B2 on the basis of the interpretation of the above "report supervision apparatus 4B1 else supervision apparatus 4B2" (step S83), so as to shift to the processes of step S65 and step S66 (abnormal message receiving and displaying process in the supervision apparatus 4B2).

As mentioned above, according to the present embodiment, the program module 7 and the abnormal message can be transmitted to either of the two duplex supervision apparatuses 4B1 and 4B2.

Accordingly, even in the case where the communication (migration of the program module 7 or the transmission of the abnormal message) to one of the above two supervision apparatuses 4B1 and 4B2 is impossible, the program module 7 and the abnormal message can be transmitted to the other supervision apparatus, making it possible to improve the reliability of the electric power system protective control system.

Incidentally, in the present embodiment, a case is shown, where the supervision apparatus 4B is duplex, but the present invention is not limited to the above structure.

For example, in the case where the supervision apparatus 4B of an electric power system protective control system 87' is N-multiplexed to supervision apparatuses 4B1 to 4BN, an apparatus to be used first is set to the apparatus 4B1, and an apparatus to be used when the communication to the apparatus 4B1 is faulty is set to the apparatuses 4B2, . . . , and an apparatus to be used when the communications to the apparatuses 4B1 to 4BN-1 are faulty is set to the apparatus 4BN among the N-multiplexed supervision apparatuses 4B1 to 4BN.

When setting is made like the structure, for example, by re-describing the script "goto supervision apparatus 4B1 else supervision apparatus 4B2" and the script "report supervision apparatus 4B1 else supervision apparatus 4B2" in the above duplex case, to the script "goto supervision apparatus 4B1 else supervision apparatus 4B2 else 4B3 else . . . else 4BN-1 else 4BN" and the script "report supervision apparatus 4B1 else supervision apparatus 4B2 else 4B3 else . . . else 4BN-1 else 4BN", the program module 7 and the abnormal message can be received on the supervision apparatus in the case where any one of the N-multiplexed supervision apparatuses 4B1 to 4BN is normal, and therefore, it is possible to further improve the reliability of the electric power system protective control system 87'.

(Twelfth Embodiment)

Figure 32:
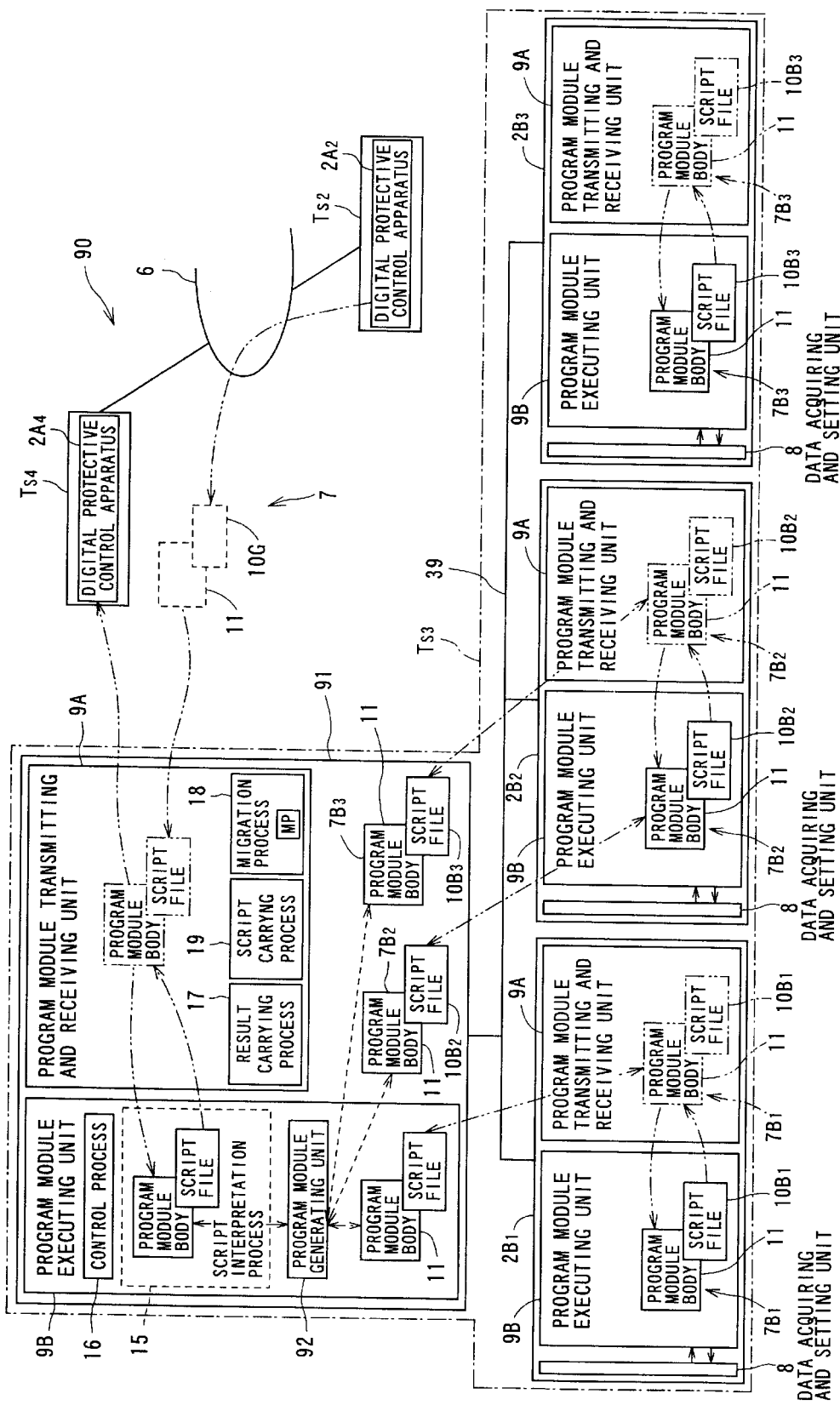
FIG. 32 is a diagram showing components of functional blocks of an electric power system protective control system according to a twelfth embodiment of the present invention.

The schematically components of the functional blocks of an electric power system protective control system 90 according to the twelfth embodiment of the present invention will be shown in FIG. 32. Incidentally, in FIG. 32, the illustrations of the display/operation apparatus 3 and the supervision apparatus 4 are omitted.

The electric power system protective control system 90 shown in FIG. 32 is configured by connecting electric stations at four places (substations Ts1 to Ts4; incidentally, the sub station Ts1 is omitted in FIG. 32) to the communication network 6, and the substation Ts3 comprises a plurality of (for example, three terminals) digital protective control apparatuses 2b1 to 2b3.

Each of the digital protective control apparatuses 2b1 to 2b3 has the same components of hardware as the digital protective control apparatus 2a1 shown in the above FIG. 5, and the respective digital protective control apparatuses 2b1 to 2b3 are mutually connected by the local network in the substation Ts3 including the Ethernet LAN 39, the transceiver 38 and the like (hereinafter, the local network is referred to simply as the Ethernet LAN 39).

In the first embodiment to eleventh embodiment, the program module 7 controls the respective digital protective control apparatuses 2a1 to 2a3 while cyclically migrating to the digital protective control apparatuses 2a1 to 2a3 of the respective substations Ts1 to Ts3.

Accordingly, even in the case where a plurality of digital protective control apparatuses 2b1 to 2b3 are provided in the substation Ts3 as shown in the present embodiment, it is possible similarly to the first embodiment to eleventh embodiment to control the respective digital protective control apparatuses 2b1 to 2b3 by migrating in turn the program module 7 in the substation Ts3 through the Ethernet LAN 39 to the respective digital protective control apparatuses 2b1 to 2b3 along the specified route of migration (routes of migration described in the script file 10).

However, for example, in the above case where a plurality of digital protective control apparatuses are provided in the same substation, there are a large number of cases where the control is able to be simultaneously performed for the respective digital protective control apparatuses, and further, depending on the situations, there are some cases where the control should be simultaneously performed for the above respective digital protective control apparatuses.

Therefore, in the present embodiment, a plurality of digital protective control apparatuses 2b1 to 2b3 provided, for example, in the same substation Ts3 are simultaneously collectively controlled.

That is, in the electric power system protective control system 90 according to the present embodiment, the substation Ts3 comprises a batch control terminal 91 for collectively controlling the respective digital protective control apparatuses 2b1 to 2b3, and this batch control terminal 91 is mutually connected to the respective digital protective control apparatuses 2b1 to 2b3 through the Ethernet LAN 39.

As shown in FIG. 32, the batch control terminal 91 comprises a program module generating unit 92 for generating new mobile program modules (program modules) 7b1 to 7b3 corresponding to the respective digital protective control apparatuses 2b1 to 2b3 from the program module 7 on the basis of the control procedure interpreted by the script interpretation process 15, in addition to the respective functional blocks except for the data acquiring and setting unit 8 in the digital protective control apparatus 2a1 shown in the above FIG. 2. Incidentally, the program module 7 is also described as the program module 7 of the origin of generation. The program module 7 of the origin of generation is referred simply to original program module 7. Moreover, since the components of the hardware of the batch control terminal is substantially equal to the components of the hardware of the digital protective control apparatus 2a1 shown in the above FIG. 5, the description thereof is omitted.

Furthermore, the respective digital protective control apparatuses 2b1 to 2b3 are adapted to execute the program modules 7b1 to 7b3 transmitted through the Ethernet LAN 39 by the program module executing unit 9 (script interpretation process 15 and the like), respectively. By the way, since each process such as the script interpretation process 15 of the program module executing unit 9 is substantially equal to that of the first embodiment except that the program module changes to the program modules 7b1 to 7b3 from the original program module 7, the description thereof will be omitted.

The program module generating unit 92 reads in the contents (script) of control corresponding to the respective protective control apparatuses 2b1 to 2b3 from the script file 10G of the original program module 7, as the script files 10b1 to 10b3, and the program module generating unit 92 integrates the read-in script files 10b1 to 10b3 and the program module body 11 to generate the program modules 7b1 to 7b3.

On the other hand, the script file 10G in the original program module 7 in the present embodiment is prepared, for example, as shown in FIG. 33 by the description process using the GUI unit 51 of the display/operation apparatus 3 of the remote operator. Incidentally, the control procedure (script) before migration of the original program module 7 to the substation Ts2 (before "goto substation Ts2") is the same as the control procedure shown in the above FIG. 4.

That is, the script file 10G shown in FIG. 33 has the procedure in that [first, the program module 7 is migrated to the substation Ts2 (apparatus 2a2) ("goto substation Ts2"), and the control operation based on the specified contents of control is performed in the apparatus 2a2 ("<(control content and the like)>")].

Next, the script file 10G has the procedure in that [the program module 7 is transmitted to the substation Ts3 (batch control terminal), and the control operations of the apparatus 2b1, apparatus 2b2 and apparatus 2b3 are collectively performed ("goto substation Ts3 apparatus 2b1 apparatus 2b2 apparatus 2b3")]. That is, the description (script) of ("goto substation-name apparatus-name apparatus-name . . . ") expresses the place of batch control and the apparatuses to be collectively controlled.

Furthermore, the script file 10G has the procedure relating to the specified contents of control in the respective apparatuses 2b1 to 2b3, that is, the contents of the batch control which expresses that [at the apparatus 2b1 ("at apparatus 2b1"), for example, the value (setting value) of the unit 2b1 is set to the present value ("set present value"), and at the apparatus 2b2 ("at apparatus 2b2"), for example, the maximum value of the setting range of the apparatus 2b2 is gotten ("get maximum value"), and further, at the apparatus 2b3 ("at apparatus 2b3"), for example, the maximum value of the setting range of the apparatus 2b3 is set at [100] ("set maximum value 100")].

Then, the script file 10G has the procedure in that [after ending the batch control, the program module 7 is transmitted to the substation Ts4 and the control operation based on the specified contents of control is performed in the corresponding digital protective control apparatus 2a4 ("<control content and the like>")].

Incidentally, since the components of other functional blocks of the electric power system protective control system 90 according to the present embodiment and the components of the hardware for concretely implementing the processes of these respective functional blocks are substantially equal to those in FIG. 2 and FIG. 5 of the first embodiment, the description thereof will be omitted.

That is, according to the present embodiment, the CPU 46a of the digital protective control apparatus 2a2 executes the script interpretation program 11a and interprets the control procedure ("goto substation Ts2" of the first line in FIG. 33) of the script file 10G so as to transmit the program module 7 to the substation Ts2 (referred to step S11), and the CPU 46a of the control apparatus 2a2 executes the script interpretation program 11a in the transported program module 7 so as to interpret the control procedure ("<control content>" of the second line in FIG. 33) of the script file 10G, thereby performing the control operation according to the specified contents of control (referred to step S12 and step S13).

Figure 34:
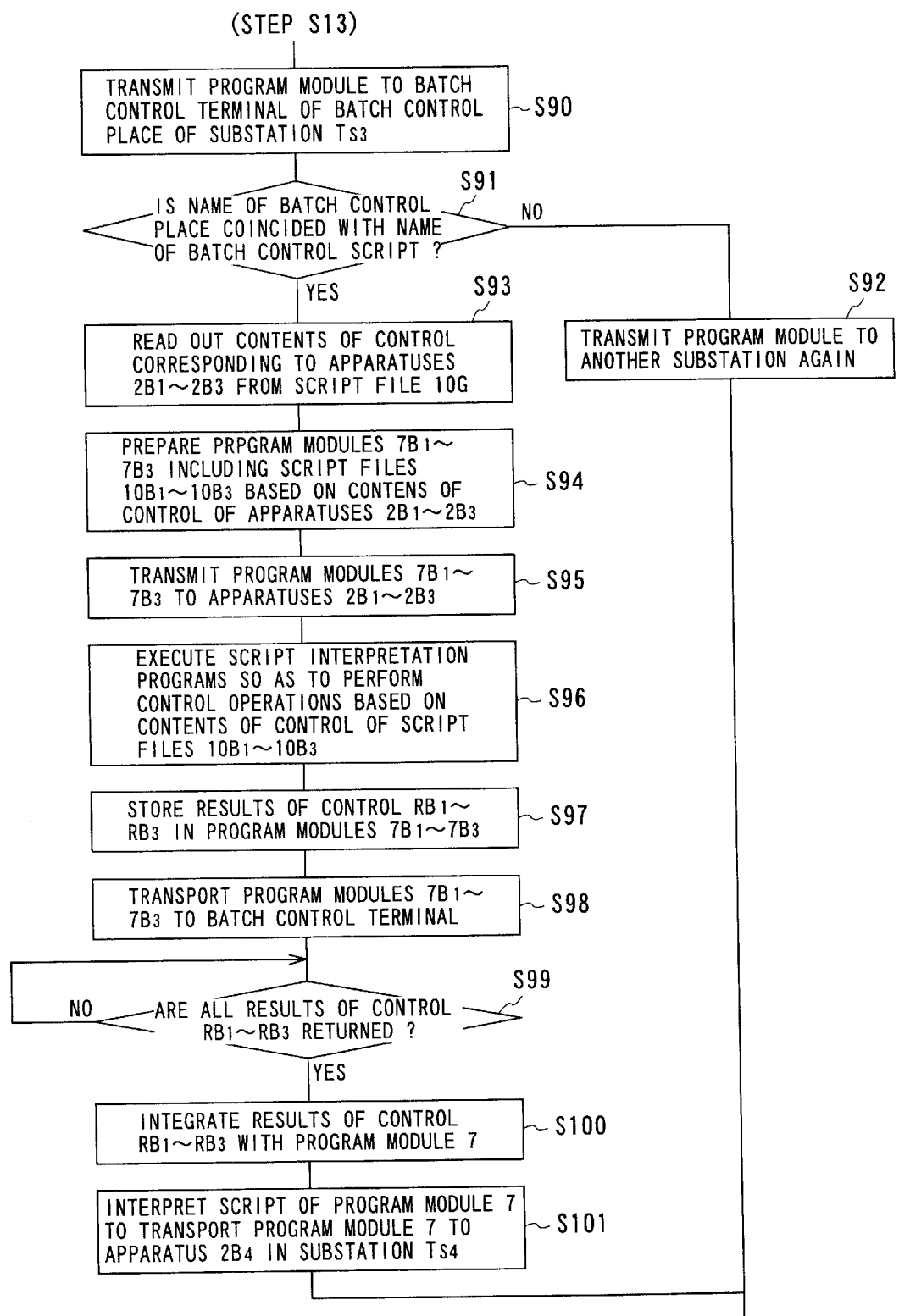
FIG. 34 is a schematically flow chart showing an example of processes of an electric power system protective control system of the twelfth embodiment.

Next, the CPU 46a of the substation Ts2 executes the script interpretation program 11a so as to interpret the control procedure {the batch control script "goto (substation Ts3 apparatus 2b1 apparatus 2b2 apparatus 2b3)" of the third line in the FIG. 33} of the script file 10G, thereby recognizing that the next destination of migration of the program module 7 is the substation Ts3 (batch control terminal 91) which is the place of batch control, and the CPU 46a transmits the program module 7 to the batch control terminal 91 of the substation Ts3 (FIG. 34; step S90).

The batch control terminal 91 (CPU thereof) of the substation Ts3 judges whether or not the name of the own substation (Ts3) is coincided with the name of the substation in the batch control script {"goto (substation Ts3 apparatus 2b1 apparatus 2b2 apparatus 2b3)"} of the transported program module 7 (step S91), and in the case where they are not coincided (the result of the judgment of step S91 is NO), the batch control terminal 91 transports the program module 7 to another substation again (step S92).

Since the name of the own substation Ts3 and the name of the substation in the batch control script are coincided with each other in the present embodiment (the result of the judgment of step S91 is YES), the batch control terminal 91 reads out the contents of control {the apparatus 2b1→"at apparatus 2b1" and "set present value", the apparatus 2b2→"at apparatus 2b2" and "get maximum value", and the apparatus 2b3→"at apparatus 2b3" and "set maximum value 100"} corresponding to the respective protective control apparatuses 2b1 to 2b3 from the script file 10G of the original program module 7 (step S93) so as to generate new program modules 7b1 to 7b3 by integrating the read-in script expressing the contents of control of the respective apparatuses 2b1 to 2b3 as the script files 10b1 to 10b3 with the program module body 11 of the original program module 7, respectively (step S94).

After the step S94, the batch control terminal 91 transports the newly generated program modules 7b1 to 7b3 to the corresponding digital protective control apparatuses 2b1 to 2b3 by the transportation process based on the migration process program MP, respectively (step S95).

At this moment, the CPU 46a of the respective digital protective control apparatuses 2b1 to 2b3 respectively executes the script interpretation programs 11a in the respective transported program modules 7b1 to 7b3, and respectively performs the control operations based on the contents of control {the apparatus 2b1→"at unit 2b1" and "set present value", the apparatus 2b2→"at apparatus 2b2" and "get maximum value", and the apparatus 2b3→"at apparatus 2b3" and "set maximum value 100"} of the respective script files 10b1 to 10b3 (step S96).

That is, the CPU 46a of the apparatus 2b1 sets the present setting value in the EEPROM 46d as it is, and the CPU 46a of the apparatus 2b2 gets the maximum value determining the setting range of the EEPROM 46d, and the CPU 46a of the apparatus 2b3 sets the maximum value determining the setting range of the EEPROM 46d at 100.

Then, the CPU 46a of the respective digital protective control apparatuses 2b1 to 2b3 stores the results of the control operations Rb1 to Rb3 gotten by the respective control operations in the respective program modules 7b1 to 7b3 as internal variables thereof (step S97), and transports the program modules 7b1 to 7b3 to the batch control terminal 91 by the transportation process based on the migration process program MP (step S98).

On the other hand, the batch control terminal 91 judges whether or not all results of the control operations Rb1 to Rb3 (program modules 7b1 to 7b3) have returned by the process based on, for example, the sleep method of the thread class of Java in the migration process program MP, when executing the above batch control script {"goto (substation Ts3 apparatus 2b1 apparatus 2b2 apparatus 2b3)"} (step S99), and until the program modules 7b1 to 7b3 return, the batch control terminal 91 waits for the process of interpreting and executing the next script ("goto substation Ts4") of the batch control procedure in the script 10G of the program module 7 (the result of the judgment of step S99 is NO).

Then, in the case where the result of the judgment of step S99 is YES, that is, all program modules 7b1 to 7b3 have returned to the batch control terminal 91, the batch control terminal 91 judges that the batch control to the respective apparatuses 2b1 to 2b3 has ended, and integrates the returned results of the control operations (program modules 7b1 to 7b3) with the original program module 7 (step S100).

Next, the batch control terminal 91 interprets the next script ("goto substation Ts4") of the batch control procedure in the script 10G of the program module 7, and executes the migration (transportation) process based on the migration process program MP so as to transport the program module 7, with which the results of the control operations Rb1 to Rb3 of the respective apparatuses 2b1 to 2b3 are integrated, to the digital protective control apparatus 2b4 of the substation Ts4 (step S101), and the batch control terminal 91 ends the process of the batch control.

That is, according to the present embodiment, new program modules are generated from one program module and the new program modules are transported to a plurality of digital protective control apparatuses, for example, at the same time, and consequently, the respective digital protective control apparatuses is able to be simultaneously collectively controlled. As a result, it is possible to efficiently perform the control for a lot of digital protective control apparatuses.

Especially, in the present embodiment, since the above batch control can be performed by the script description, a program module mobile type of electric power system protective control system corresponding to a batch control can be constructed more easily than that of the prior art.

Incidentally, in the present embodiment, at the judgment of step S99, the batch control terminal 91 does not perform the next process (migration process of the program module 7) until all results of the control operations Rb1 to Rb3 (program modules 7b1 to 7b3) return, but the present invention is not limited to the structure.

For example, as the reason why all results of the control operations Rb1 to Rb3 (program modules 7b1 to 7b3) are not collected, a possibility that the communication between the delayed program module and the batch control terminal takes a time is considered.

Figure 35:
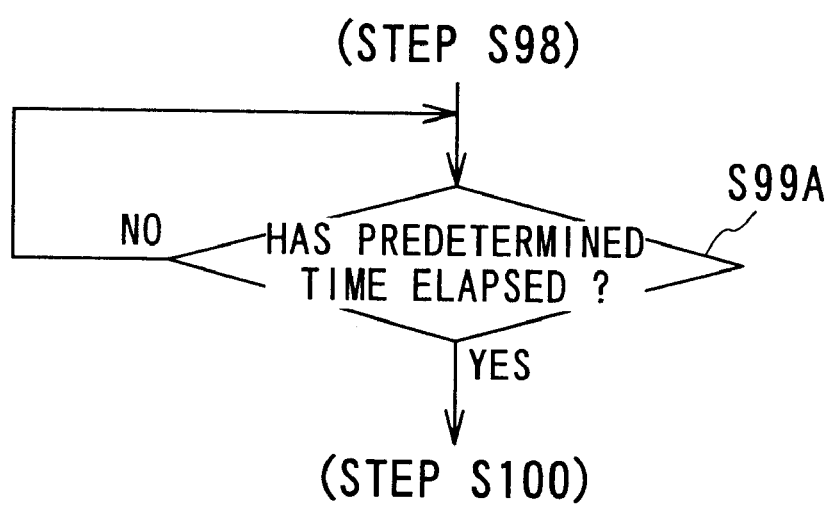
FIG. 35 is a schematically flow chart showing an example of processes of an electric power system protective control system of a modification of the twelfth embodiment.

At this moment, for example, when desiring the results of the control operations at once or the like, the batch control terminal 91 repeatedly judges whether or not a predetermined time (for example, 100 seconds) has elapsed after the migration of the program modules 7b1 to 7b3 to the respective units 2b1 to 2b3 as the judgment of step S99 (FIG. 35; step S99a), and the batch control terminal 91 waits for the process until the predetermined time elapses (the result of the judgment of step S99a is NO).

On the other hand, in the case where the predetermined time has elapsed (the result of judgment of step S99a is YES), the batch control terminal 91 integrates the results of the control operations {for example, Rb1 and Rb2 (program modules 7b1 and 7b2)} transmitted within the predetermined time with the program module 7 (refer to step S100), and the batch control terminal 91 shifts to the transportation process of the program module 7 of step S101.

Incidentally, in the case where the remaining result of the control operation Rb3 (program module 7b3) has returned after the transportation process of the program module 7, the program module 7b3 is directly transported to the supervision apparatus 4.

The above judgment process based on the elapse of the predetermined time (for example, 100 seconds) of step S99 is able to be implemented by rewriting, for example, the batch control script "goto (substation Ts3 apparatus 2b1 apparatus 2b2 apparatus 2b3)" of the third line in FIG. 33 as follows:

"goto (substation Ts3 apparatus 2b1 apparatus 2b2 apparatus 2b3) wait 100".

This script expresses that [the batch control terminal waits for 100 seconds, and when the time of 100 seconds has elapsed, the next script "goto substation Ts4" is executed to migrate the program module 7 even if all of the respective program modules 7b1 to 7b3 (results of the control operations Rb1 to Rb3) transported to all apparatuses 2b1 to 2b3 have not yet returned].

In this modification, since it is able to deal with a special requirement in that, for example, when the results of the control operations are desired immediately in addition to the effects of the above twelfth embodiment, it is possible to provide an electric power system protective control system in which the respective digital protective control apparatuses can more efficiently be controlled.

Incidentally, in the present embodiment, the batch control terminal 91 is provided in the substation Ts1 which performs the batch control, so as to perform the batch control for the respective digital protective control apparatuses 2b1 to 2b3, but the present invention is not limited to this structure. For example, it is also possible to perform the above batch control for all apparatuses 2b1 to 2b3 including the own apparatus, by performing the processes shown in the above FIG. 34 by using one apparatus among the plurality of digital protective control apparatuses 2b1 to 2b3 as the batch control terminal. Furthermore, it is also possible to perform the batch control for a plurality of digital protective control apparatuses of another substation, by performing the processes shown in the above FIG. 34 by using the digital protective control apparatus of another substation as the batch control terminal.

(Thirteenth Embodiment)

In the first embodiment to twelfth embodiment, the remote control of the respective digital protective control apparatuses is performed while cyclically migrating the mobile program module around the respective digital protective control apparatuses, and for example, in the case where the results of the control operations of another digital protective control apparatus (second apparatus) are necessary in a certain digital protective control apparatus (first apparatus), it is sufficient to describe a script expressing "the route of migration in the second apparatus→the first apparatus".

However, for example, in the case where it is desired to set the control operation related to the specified object of control in a certain digital protective control apparatus by the real time process on the basis of the conditional changes of objects of control, which is related to the above specified object of control, of a plurality of other digital protective control apparatuses and the quantities of state during the conditional changes, it is difficult to deal with the situation by an electric power system protective control system which simply cyclically migrates the program module.

Therefore, in the present embodiment, the program module is made resident in advance for a specified digital protective control apparatus in which it is desired to detect the conditional changes, and in the case where the conditional changes have been detected in this specified digital protective control apparatus, a new program module is prepared from the resident program module so as to migrate to another protective control apparatus in which it is desired to perform the control operation, whereby an electric power system protective control system is realized, wherein it is possible to perform the control operation adaptable to the above real time conditional changes (hereafter, also referred to as an adaptive control operation).

Figure 36:
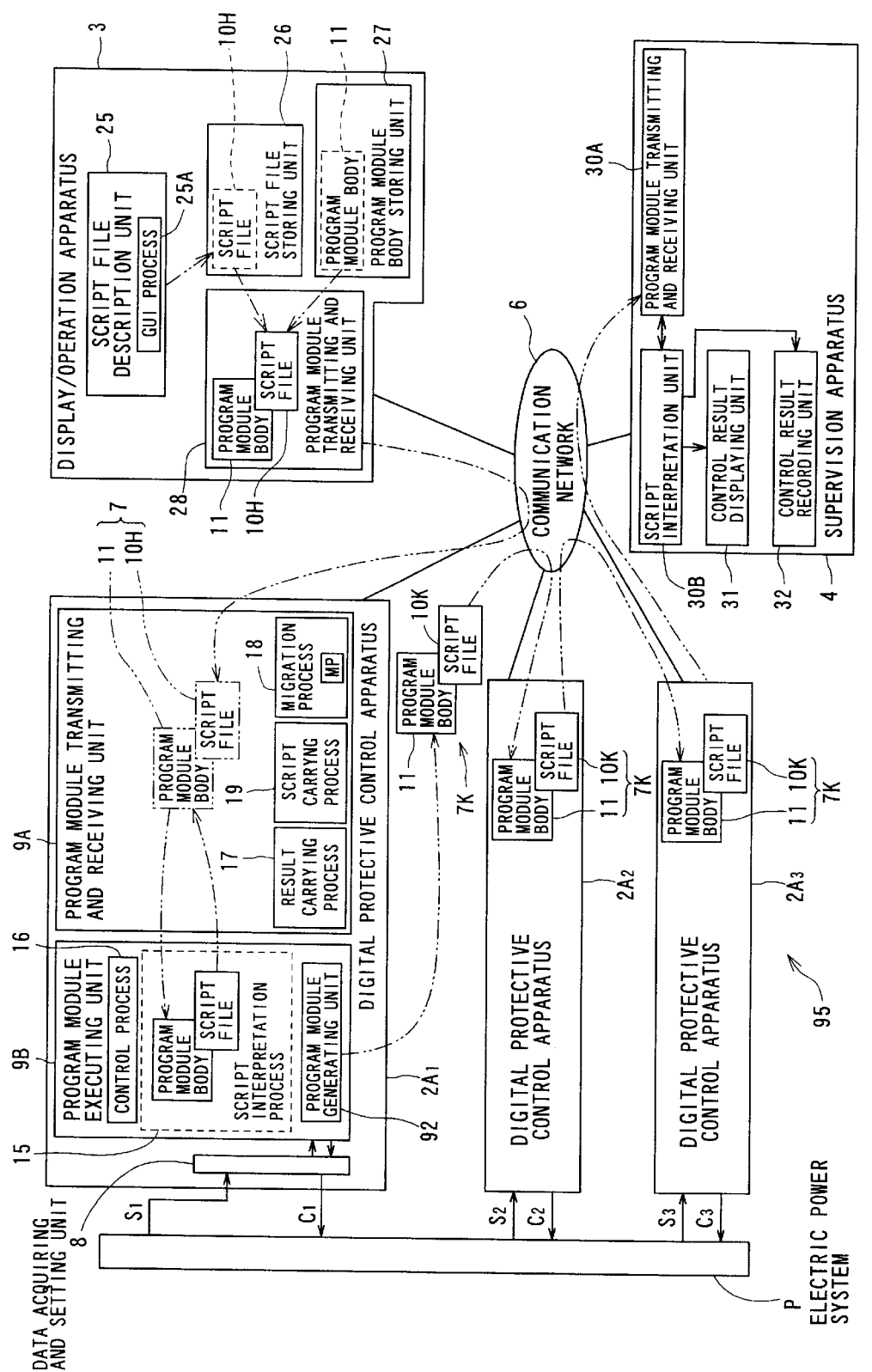
FIG. 36 is a diagram showing components of functional blocks of an electric power system protective control system according to a thirteenth embodiment of the present invention.

The components of the functional blocks of an electric power system protective control system 95 in which the above adaptive control operation can be performed according to the thirteenth embodiment of the present invention will be shown in FIG. 36.

As shown in FIG. 36, each of the digital protective control apparatuses 2a1 to 2a3 comprises a program module generating unit 96 in addition to the respective functional blocks in the digital protective control apparatus 2a1 shown in the above FIG. 2.

The program module generating unit 96 is operative to generate a new mobile program module 7K capable of being transported to another digital protective control apparatus from the resident program module 7 on the basis of the control procedure gotten by interpreting the script file to be described later in the resident program module 7 by using the script interpretation process 15.

By the way, since the components of other functional blocks in the electric power system protective control system 95 shown in FIG. 36 and the components of the hardware for concretely implementing the processes of these respective functional blocks are substantially equal to those in FIG. 2 and FIG. 5 of the first embodiment, the description thereof will be omitted.

That is, the remote operator in the electric power system protective control system 95 of the present embodiment operates the input device 51b of the GUI unit 51 to describe and prepare a control procedure (script file 10H) shown in FIG. 37 onto the screen of the monitor 51a.

As shown in FIG. 37, the script file 10H has the procedure in that [first, the program module 7 is transported to the substation Ts1 (apparatus 2a1) ("goto substation Ts1"), and in the apparatus 2a1, the quantity (status) values x, y (data values of electric quantities) of, for example, two equipment devices X, Y in the object of protective control of the apparatus 2a1 are monitored while the program module 7 is resident, and whether or not the status value x has exceeded the status value y is judged ("monitor (x>y)")]. Incidentally, this statement "monitor" expresses the resident mode. Furthermore, the above status value y may be a previously set threshold value.

Next, the script file 10H has the procedure in that [in the case where the status value x has exceeded the status value y as a result of the above monitoring process, for example, the present setting value z1 of the own apparatus 2a1 is gotten ("get z1"), and since the program module 7 is in the resident mode, a new program module 7K is prepared from this resident program module 7 so as to be transported to the substation Ts2 (apparatus 2a2) ("goto substation Ts2"), thereby getting, for example, the present setting value z2 of the apparatus 2a2 ("get z2"), so that the program module 7 is transported to the substation Ts3 (apparatus 2a3) ("goto substation Ts3"), thereby getting, for example, the present setting value z3 of the apparatus 2a3 ("get z3")].

Then, the script file 10H has the procedure in that [by using the present setting values z1 to z3 of the respective apparatuses 2a1 to 2a3 gotten by the resident program module 7 and the newly generated program module 7K, an averaging calculation is performed to determine the control value (zval of the setting value of the apparatus 2a3 of the substation Ts3 ("zval=(z1+z2+z3)/3")], and further, the script file 10K has the procedure of setting the present setting value of the apparatus 2a3 at the above control value zval ("set z3 zval").

Figure 38:
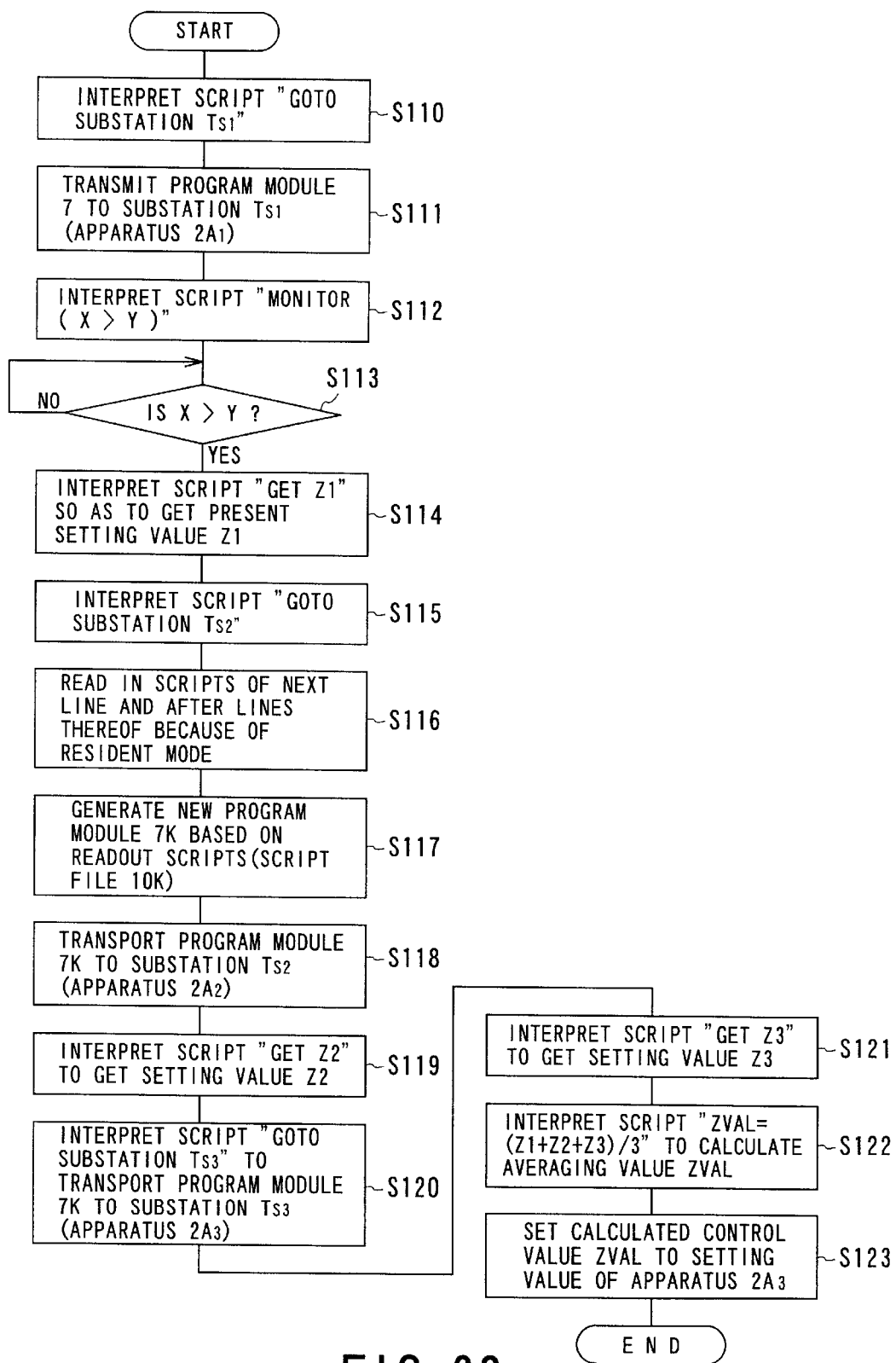
FIG. 38 is a schematically flow chart showing an example of processes of an electric power system protective control system of the thirteenth embodiment.

At this moment, the CPU 53 of the display/operation apparatus 3 executes the script interpretation program 11a in the program module 7 to interpret the first line ("goto substation Ts1") of the control procedure of the script file 10H (FIG. 38; step S110), and the CPU 53 sends out the prepared program module 7 to the substation Ts1 (digital protective control apparatus 2a1) by the transportation process based on the migration process program MP (step S111).

The CPU 46a of the digital protective control apparatus 2a1 receives the program module 7 transported to the digital protective control apparatus 2a1 and stores the program module 7 in the RAM 46b, and the CPU 46a executes the script interpretation program 11a in this program module 7 to interpret the second line ("monitor (x>y)") of the control procedure of the script file 10H (step S112).

According to the interpretation in step S112, the CPU 46a monitors the status values x, y of the equipment devices X, Y gotten through the data acquiring unit 8 of the own apparatus 2a1 at all times, and the CPU 46a judges whether or not the status value x has exceeded the status value y (step S113). Incidentally, this processes of detecting the changes of the status value x and the status value y can be performed by using the sleep method of Java.

Then, in the case where the status value x has exceeded the status value y, the CPU 46a executes the script interpretation program 11a to interpret the third line ("get z1") of the control procedure of the script file 10H so as to get the present setting value z1 from the EEPROM 46d, and the CPU 46a stores the result of the control operation (setting value z1) in the program module 7K (step S114).

Next, the CPU 46a interprets the next control procedure ("goto substation Ts2" of the fourth line) (step S115).

As a result of the above interpretation, the CPU 46a recognizes that it is the control procedure to transport the program module 7 to the substation Ts2, but at present, the program module 7 is in the resident mode of "monitor mode" so as not to be transported, and therefore, the CPU 46a reads in the control procedure (script; "get z2"~"set z3 zval") of the next line (fourth line) and after lines thereof in the script file 10H (step S116).

After the process of step S116, the CPU 46a makes these scripts be the script file 10K, and generates a new program module 7K from the script file 10K and the above result of the control operation (setting value z1) contained in the program module body 11 of the originally resident program module 7 (step S117).

Next, the CPU 46a transports the newly generated program module 7K to the digital protective control apparatus 2a2 of the substation Ts2 by the migration process based on the migration process program MP (step S118).

The CPU 46a of the digital protective control apparatus 2a2 executes the script interpretation program 11a in the transported program module 7K, and interprets the contents of control ("get z2") of the script file 10K so as to get the present setting value z2 from the EEPROM 46d. After the getting process, the CPU 46a stores the result of the control operation (setting value z2) in the program module 7K (step S119). Then, the CPU 46a interprets the next contents of control ("goto substation Ts3") of the script file 10K, and transports the program module 7K to the substation Ts3 (apparatus 2a3) (step S120).

The CPU 46a of the control apparatus 2a3 executes the script interpretation program 11a in the transported program module 7K, and interprets the contents of control ("get z3") of the script file 10K so as to get the present setting value z3 from the EEPROM 46d, thereby storing the result of the control operation (setting value z3) in the program module 7K (step S121).

The CPU 46a of the apparatus 2a3 executes the script interpretation program 11a in the program module 7K, and interprets the next control procedure ("zval=(z1+z2+z3)/3") of the script file 10K so as to calculate the averaging value zval of the respective results of the control operations (setting values z1 to z3) stored in the program module 7K as the control value (step S122).

Then, the CPU 46a stores the calculated control value zval in the EEPROM 46d so as to set the above control value zval to the setting value of the apparatus 2a3 (step S123), and the CPU 46a ends the process.

As a result, for example, the setting value of the digital protective control apparatus 2a3 can be set, for example, at the averaging value of the setting values z1 to z3 of the respective apparatuses 2a1 to 2a3, adaptable for the conditional change (x>y) of the status values x, y of the equipment devices X, Y related to the above setting value in the digital protective control apparatus 2a1.

Accordingly, in the present embodiment, the control operation (for example, setting value setting control operation) for the respective digital protective control apparatuses 2a1 to 2a3 is not performed by setting a previously determined value or the like, but the change (conditional change of the electric power system) of the status value or the like detected by another apparatus on the basis of the previously resident program module is detected, so as to perform the control of the apparatuses according to the control value calculated corresponding to the detected results, thereby performing a very high order of monitoring control for the respective digital protective control apparatuses 2a1 to 2a3.

Especially, in the present embodiment, since the above adaptable control (adaptive control) can be performed by the description of the script, a program module mobile type of electric power system protective control system corresponding to the adaptable control is able to be constructed more easily than that of the prior art.

(Fourteenth Embodiment)

In the thirteenth embodiment, the resident program module 7 for monitoring the conditional change of the object of the protective control of the digital protective control apparatus 2a1 is continuously resident after the generation of a new program module 7K. The reason thereof is that, in the case where for example, the conditional change of the above specified equipment device is based on an accident which has occurred in the range of protective control of the digital protective control apparatus 2a1, it is necessary to perform the monitoring of the object of protective control of the apparatus 2a1 after the occurrence of the accident.

As one method for canceling the resident state of the above program module 7, it is considered that the conditions for the canceling are in advance described as a script. In this case, for example, if the script "monitor (x>y)" expressing the resident mode shown in FIG. 37 is re-described as the script ("monitor (x>y) for 100 min") expressing the contents in that [the monitoring of x>y and the resident state are ended after the elapse of 100 minutes], the CPU 46a of the apparatus 2a1 ends the conditional change monitoring process based on the resident program module 7 after the elapse of 100 minutes.

However, since the time for actually canceling the resident state is different depending on the caused accident, the scale of the electric power system or the like, it is preferable to perform the above resident canceling process by an indication of the human system. This resident canceling process by the human system corresponds to the canceling work performed by an administrator who is sent to the site where the apparatus 2a1 is actually provided and who judges when the monitoring should be ended. That is, the judgment of whether or not the monitoring process can be ended has been performed by the administrator actually sent to the site.

In the present embodiment, it is possible to perform the resident canceling conventionally performed by the administrator sent to the site, by the supervision apparatus or the display/operation apparatus provided in the manned electric station.

Figure 39:
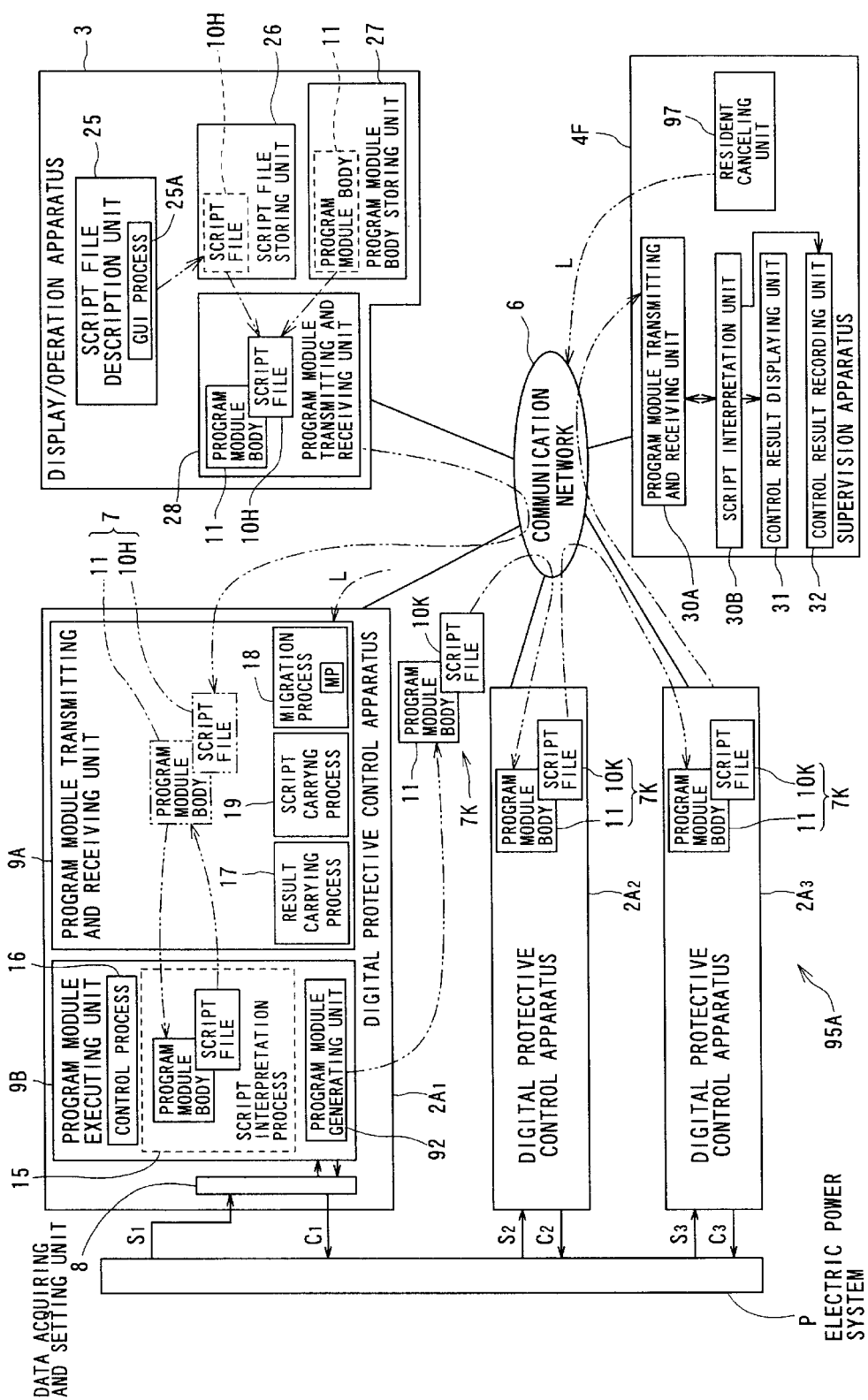
FIG. 39 is a diagram showing components of functional blocks of an electric power system protective control system according to a fourteenth embodiment of the present invention.

FIG. 39 is a diagram showing the components of the functional blocks of an electric power system protective control system 95A in which the resident canceling process is able to be performed on the supervision apparatus 4F.

According to FIG. 39, the supervision apparatus 4F comprises a resident canceling unit 97 for operating the input device 56b of the console 56 so as to output a resident canceling command through the screen of the monitor 56a to the apparatus 2a1 of the substation Ts1 where the program module 7 is resident. Incidentally, since the components other than the components of the supervision apparatus 4F is substantially equal to the components of the functional blocks of the electric power system protective control system 95 shown in the above FIG. 36, the description thereof will be omitted. Furthermore, since the components of the hardware for concretely implementing the processes of the respective functional blocks of the electric power system protective control system 95A is substantially equal to that in FIG. 2 and FIG. 5 of the first embodiment, the description thereof will be omitted.

Figure 40:
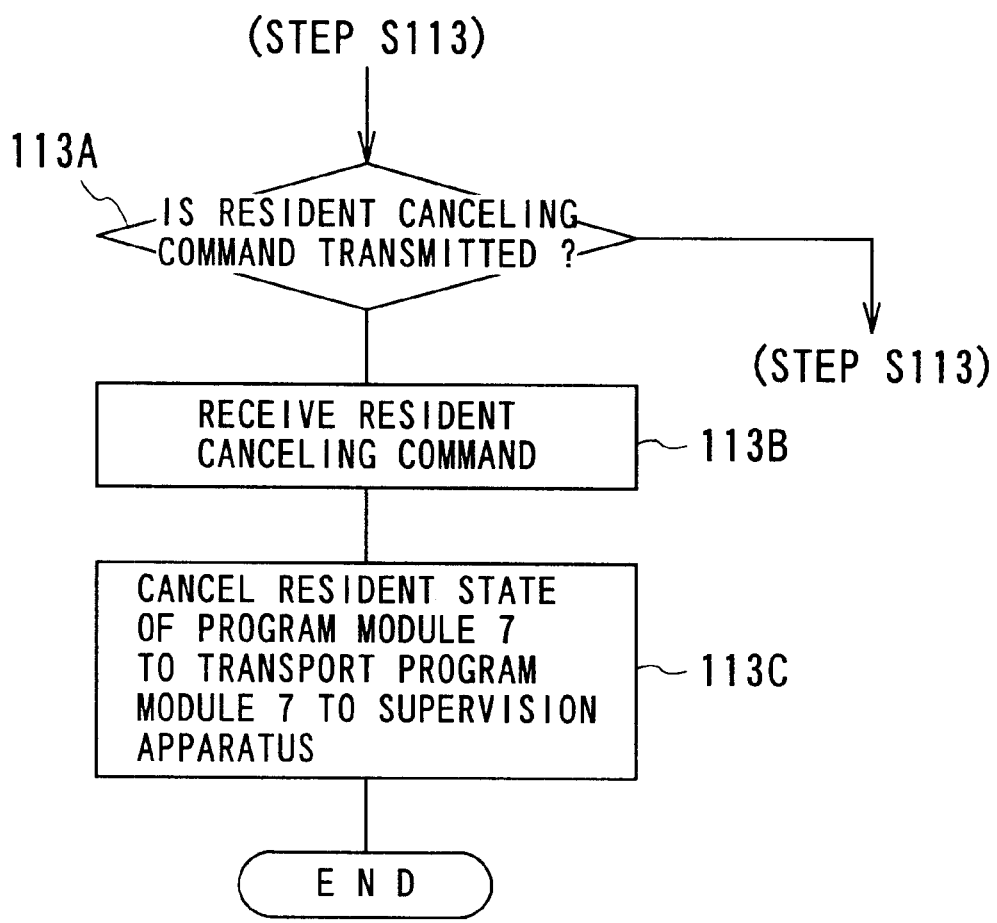
FIG. 40 is a schematically flow chart showing an example of processes of an electric power system protective control system of the fourteenth embodiment.
Figure 41:
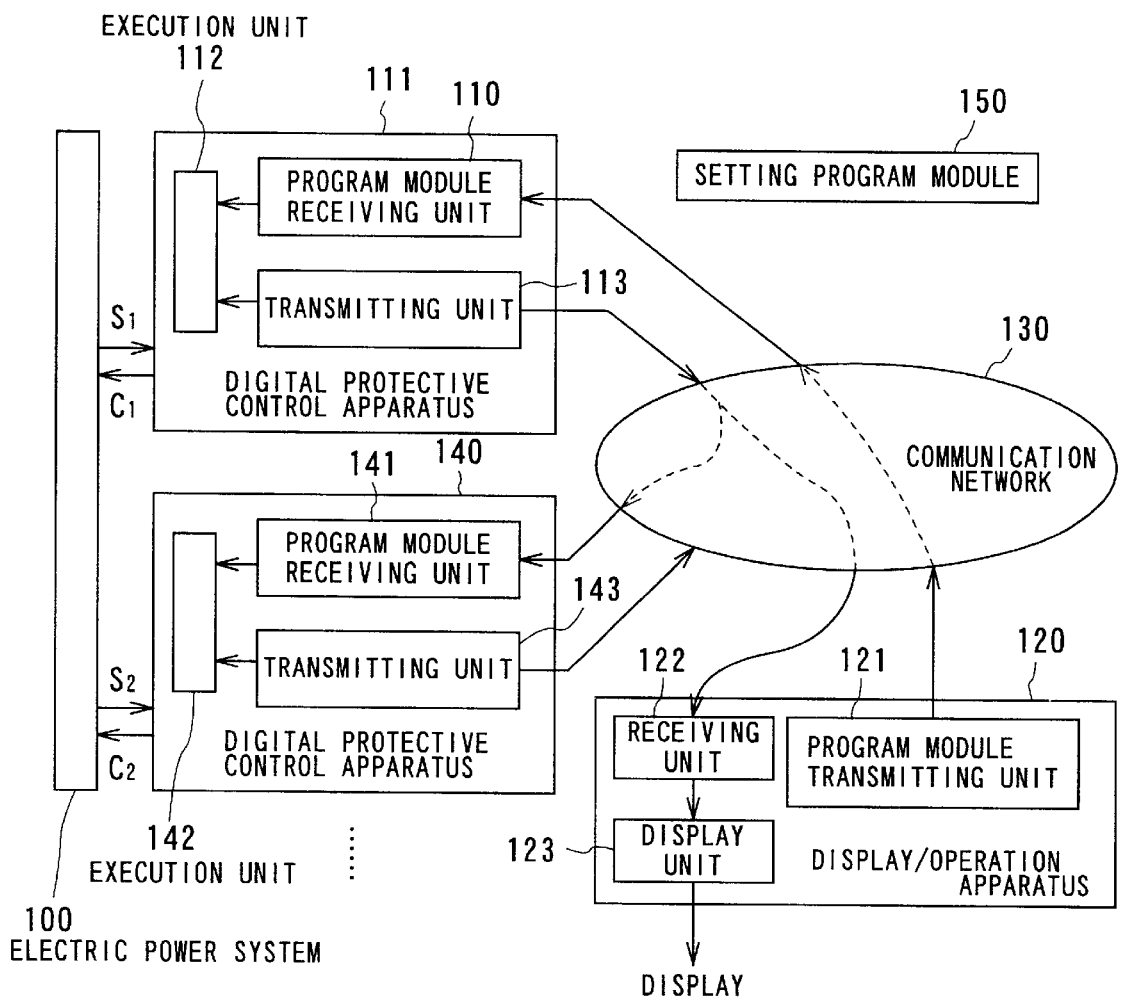
FIG. 41 is a diagram showing a functional block diagram of a conventional electric power system protective control system.

That is, according to the present embodiment, while performing the monitoring processing (referred to FIG. 13) based on the resident program module 7 of the digital protective control apparatus 2a1, the CPU 46a judges whether or not a resident canceling command L is transmitted from the supervision apparatus 4F, in parallel (for example, in the time sharing mode) with this process of step S13 (FIG. 40; step S113a), and as a result of this judgment, when the resident canceling command L is not transmitted (step S113a→NO), the CPU 46a repeatedly performs the monitoring process of step S113.

At this moment, if the administrator operates the input device 56b of the console 56 of the supervision apparatus 4F to transmit a resident canceling command L through the screen of the monitor 56a to the apparatus 2a1, the result of the judgment of step S113a gets to be YES so that the CPU 46a of the apparatus 2a1 receives the resident canceling command L on the basis of the sleep method of the above migration process program MP (Java) and the rmi method (step S113b). Next, the CPU 46a cancels the resident state of the program module 7 according to the received resident canceling command L so as to transport the program module 7 to, for example, the supervision apparatus 4F (step S113c), thereby ending the process.

That is, according to the present embodiment, in the case where the resident canceling may be performed, it is unnecessary for the administrator to actually go to the site where the apparatus 2a1 is provided to perform the canceling process, and it is possible to perform the canceling process of the program module 7 by transmitting a resident canceling command to the apparatus 2a1 where the program module 7 is resident from the supervision apparatus 4F.

Therefore, it is possible to avoid the resident state of an unnecessary program module by a more efficient method, making it possible to utilize an efficiently of RAM by reducing the coefficient of use of the RAM of the apparatus where the program module is resident.

Incidentally, in the present embodiment, the resident canceling unit 97 is provided in the supervision apparatus 4F, but the present invention is not limited to the structure. That is, the resident canceling unit 97 may be provided in the display/operation apparatus.

While there has been described what is at present considered to be the preferred embodiments and modifications of the present invention. It will be understood that various modifications which are not described yet may be made therein, and it is intended to cover in the appended claims all such modifications as fall within the true spirit and scope of the invention.

What is claimed is:

1. An electric power system protective control system comprising:
 a plurality of protective control apparatuses each having a protective control function to an electric power system, said protective control apparatuses being distributed; and
 a communication network through which the protective control apparatuses are connected to each other so that data communication is permitted among the respective protective control apparatuses, each of said protective control apparatuses executing a control operation related to the protective control function of the own protective control apparatus according to a program module, said program module migrating through the communication network along a predetermined route of migration;
 wherein said program module comprises a script file having a control procedure and an interpretation program for interpreting the script file so as to read the control procedure, said control procedure including at least a content of the control operation and the route of migration of the program module, said script file being prepared in a text format, said script file prepared in advance of migrating said program module to any protective control apparatus; and
 wherein each of said protective control apparatuses comprises:
  interpretation means for executing the interpretation program of the program module so as to interpret the control procedure of the script file, said program module migrating through the communication network to each of the protective control apparatus;
  control means for executing a control operation related to the protective control function of the own protective control apparatus according to the content of the control operation of the control procedure interpreted by the interpretation means; and
  migration means for migrating the program module along the route of migration of the control procedure interpreted by the interpretation means.

2. An electric power system protective control system according to claim 1, wherein each of said protective control apparatuses further comprises carry means for integrating a result of the control operation executed by the control means with the program module so as to carry the integrated result of the control operation and the program module.

3. An electric power system protective control system according to claim 1, further comprising a display/operation apparatus connected to the communication network and having a GUI unit, said display/operation apparatus being adapted to monitor and control an operating condition of each of the protective control apparatuses,
 wherein said display/operation apparatus comprises:
  means for describing the control procedure in the document format by using the GUI unit;
  means for storing therein the described control procedure in the document format as a script file;
  means for previously storing therein a program module body including the interpretation program and a migration process program;
  means for integrating the program module body with the script file to prepare the program module, thereby executing the interpretation program in the integrated program module so as to interpret the control procedure of the script file; and
  means for transmitting the program module to a predetermined destination of migration through the communication network according to the route of migration of the interpreted control procedure.

4. An electric power system protective control system according to claim 3, wherein said migration means has, in a case where the program module is not migrated to another protective control apparatus of a next destination of migration determined as the route of migration of the program module, means for making the program module skip the next destination protective control apparatus so as to migrate the program module to a predetermined protective control apparatus, said predetermined protective control apparatus being selected from other protective control apparatuses except for the next destination protective control apparatus.

5. An electric power system protective control system according to claim 3, further comprising a supervision apparatus connected to the communication network and adapted to supervise the protective control apparatuses, wherein said control procedure of the script file includes, in a case where the program module is not migrated to another protective control apparatus of a next destination of migration determined as the route of migration of the program module, a changing procedure for changing a next destination of migration of the program module from the own protective control apparatus to one of other predetermined protective control apparatuses except for the next destination protective control apparatus or the supervision apparatus, and wherein said migration means comprises, when the program module is not migrated to the next destination protective control apparatus determined as the route of migration, means for changing the next destination of migration of the program module according to the changing procedure to one of other predetermined protective control apparatuses or the supervision apparatus.

6. An electric power system protective control system according to claim 5, wherein said control procedure of the script file includes, in the case where the program module is not migrated to another protective control apparatus of a next destination of migration determined as the route of migration of the program module, a changing procedure for changing an order of the migration of the program module to the next destination protective control apparatus according to a cause of a non-migration of the program module so as to migrate, after one of other protective control apparatuses except for the next destination protective control apparatus, the program module to the next destination protective control apparatus, and wherein said migration means comprises: when the program module is not migrated to the next destination protective control apparatus determined as the route of migration, means for detecting the cause of the non-migration of the program module; and after the program module is migrated to the one of other protective control apparatuses except for the next destination protective control apparatus so that the control operation is executed, means for migrating the program module after the migration of the one of other protective control apparatuses to the next destination protective control apparatus according to the changing procedure.

7. An electric power system protective control system according to claim 5, wherein said control procedure of the script file includes a retry procedure for retrying, before changing the next destination of migration of the program module to the supervision apparatus, the program module to the next destination protective control apparatus, and wherein said migration means comprises: when the program module is not migrated to the next destination protective control apparatus determined as the route of migration, means for detecting the cause of the non-migration of the program module; and before changing the next destination of migration of the program module to the supervision apparatus according to the changing procedure, means for retrying the program module to the next destination protective control apparatus according to the retry procedure.

8. An electric power system protective control system according to claim 3, further comprising a supervision apparatus connected to the communication network and adapted to supervise the protective control apparatuses, said supervision apparatus having means for storing therein an activation information expressing whether or not each of the protective control apparatuses is activated, and wherein said description means comprises:

means for referring the stored activation information so as to extract at least one of the protective control apparatuses, said at least one of extracted protective control apparatuses being activated; and means for selecting apparatuses from at least one of the extracted protective control apparatuses and the supervision apparatus so as to describe the selected respective apparatuses as respective destinations of migration of the program module constituting the route of migration in the control procedure.

9. An electric power system protective control system according to claim 2, further comprising a supervision apparatus connected to the communication network and adapted to supervise the protective control apparatuses, wherein said script file has a transmission procedure for, in a case where, during the control operation to the own protective control apparatus, a control abnormality is occurred in relation to the control operation, stopping the control operation so as to transmit the program module to the supervision apparatus and wherein said migration means comprises, when the control abnormality is occurred, means for, according to the transmission procedure, stopping the control operation so as to forcibly transmit the program module to the supervision apparatus.

10. An electric power system protective control system according to claim 9, wherein said script file has an abnormality data transmission procedure for transmitting a data expressing the control abnormality, and wherein said migration means comprises means for transmitting the data expressing the control abnormality to the supervision apparatus according to the abnormality data transmission procedure.

11. An electric power system protective control system according to claim 2, further comprising a supervision apparatus connected to the communication network and adapted to supervise the protective control apparatuses, wherein said migration means comprises means for storing therein an upper limit value capable of being integrated with the program module by the carrying means, and means for, in a case where a size of data expressing the result of the control operation integrated with the program module exceeds the upper limit value, transmitting the result of the control operation integrated with the program module to the supervision apparatus.

12. An electric power system protective control system according to claim 3, wherein said protective control apparatuses are distributed among any plurality of substations, further comprising a supervision apparatus connected to the communication network and adapted to supervise the protective control apparatuses, said supervision apparatus having means for storing therein a table in which names of the respective substations and communication network addresses thereof on the communication network are memorized, said names of the respective substations and addresses thereof on the communication network being associated with each other, wherein said transmitting means is adapted to refer the table stored in the storing means so as to recognize the communication network addresses of destinations of the route of migration of the control procedure interpreted by the interpretation means, thereby migrating the program module according to the communication network addresses.

13. An electric power system protective control system according to claim 3, wherein said protective control apparatuses are distributed among any plurality of substations, further comprising a supervision apparatus connected to the communication network and adapted to supervise the protective control apparatuses, said supervision apparatus having means for storing therein a control database in which names of the respective substations, names of the protective control apparatuses corresponding thereto and data expressing the control operation determined to each protective control apparatus are memorized, said names of the respective substations, said names of the protective control apparatuses and said data expressing the control operation being associated with each other, wherein said description means has means for preparing a default script according to the control database stored in the storing means so as to describe the script on the basis of the prepared default script, said default script including each of the names of the protective control apparatuses and the data of the control operation executed by each protective control apparatus.

14. An electric power system protective control system according to claim 13, wherein said supervision apparatus has means for storing therein an activation information expressing whether or not each of the protective control apparatuses is activated, and wherein said default script preparing means is adapted to prepare the default script with respect to at least one of the protective control apparatuses according to the activation information, said at least one of the protective control apparatuses activating at present.

15. An electric power system protective control system according to claim 3, wherein said protective control apparatuses are distributed among any plurality of substations, further comprising a supervision apparatus connected to the communication network and adapted to supervise the protective control apparatuses, said supervision apparatus having means for storing therein a control database in which names of the respective substations and names of the protective control apparatuses corresponding thereto are memorized, said names of the respective substations and said names of the protective control apparatuses being associated with each other, wherein said control procedure of the script file has a recording procedure for setting a final migration-destination of the route of migration of the program module to the supervision apparatus so as to store the result of the control operation integrated with the program module, and wherein said supervision apparatus is adapted to receive the program module migrating thereto along the route of migration, thereby interpreting the recording procedure in the script file of the program module so as to read out the control result of the control operation integrated with the program module whereby to record the readout control result in the control database.

16. An electric power system protective control system according to claim 10, wherein said supervision apparatus is plural, said plural supervision apparatuses being connected to the communication network so as to be multiplexed, said script file has a selective migration procedure for, in a case where the program module is not migrated to a predetermined supervision apparatus in the multiplexed supervision apparatuses, said predetermined supervision apparatus being determined to the route of migration of the program module, selecting one of other multiplexed supervision apparatuses except for the predetermined supervision apparatus of the non-migration, said one of other multiplexed supervision apparatuses enabling the program module to migrate, so as to migrate the program module to the selected one supervision apparatus, said abnormality data transmission procedure is a procedure for, when the data expressing the control abnormality is not transmitted to the predetermined supervision apparatus, selecting one of other multiplexed supervision apparatuses except for the predetermined supervision apparatus of the non-transmission, said one of other multiplexed supervision apparatuses enabling the data expressing the control abnormality to transmit, so as to transmit the data expressing the control abnormality to the selected one supervision apparatus, said migration means, in the case where the program module is not migrated to the predetermined supervision apparatus, for selecting the one of other multiplexed supervision apparatuses so as to migrate the program module to the selected one supervision apparatus according to the selective migration procedure, and wherein said abnormal data transmitting means is adapted to, when the data expressing the control abnormality is not transmitted to the predetermined supervision apparatus, select the one of other multiplexed supervision apparatuses so as to transmit the data expressing the control abnormality to the selected one supervision apparatus according to the abnormality data transmission procedure.

17. An electric power system protective control system according to claim 3, wherein said control procedure of the script file has a collective control procedure including some of the protective control apparatuses (collective control objects of protective control apparatuses) to which collectively control operations are desired and the contents of the control operations of the collective control objects of protective control apparatuses, further comprising means for generating a plurality of program module elements from the program module according to the collective control procedure interpreted by the script interpretation means, each of said program module elements including each of the contents of the control operations of each of the collective control objects of protective control apparatuses and a interpretation program for interpreting each of the contents of the control operations, and means for transmitting the generated program module elements to the collective control objects of protective control apparatuses, respectively, each of said collective control objects of protective control apparatuses comprises means for executing the interpretation program in each of the program module elements so as to interpret each of the contents of the control operations of the script file, means for executing the control operation of the own protective control apparatus according to the content of the control operation thereof, and means for transmitting the executed result of the control operation to the program module element generating means, and wherein said program module element generating means comprises means for integrating each of the transmitted control results of each of the collective control objects of protective control apparatuses with the program module, and means for migrating the program module integrated with each of the control results to a destination of migration next to each of the collective control objects of protective control apparatuses.

18. An electric power system protective control system according to claim 17, wherein said integrating means comprises means for judging whether or not each of the control results is transmitted from each of the collective control objects of protective control apparatuses within a predetermined time, in a case where the predetermined time has elapsed by the judgement means, said integrating means integrating only a control result with the program module, said control result being transmitted within the predetermined time.

19. An electric power system protective control system according to claim 3, wherein said control procedure of the script file has a resident control procedure, said resident control procedure including a monitoring procedure of monitoring a change of condition of one predetermined apparatus in the protective control apparatuses while the program module is resident in the predetermined protective control apparatus, a route of migration including at least one of other protective control apparatuses as a next destination of migration, said at least one of other protective control apparatuses being controlled according to the monitored result, and a procedure of executing the control operation related to the protective control function with respect to the at least one of other protective control apparatuses, said predetermined protective control apparatus with the resident program module comprises resident means for making the transmitted program module through the communication network resident to the predetermined protective control apparatus so as to monitor the change of condition thereof with respect to the object of protective control according to the monitoring procedure of the resident control procedure in the script file, said script file being interpreted by the script interpretation means, means for generating a program module element from the program module according to the monitored result of the resident means, said program module element including the content of the control operation of the at least one of other protective control apparatuses and a interpretation program for interpreting the content of the control operation thereof, and means for migrating the generated program module element along the route of migration to the at least one of other protective control apparatuses, and wherein said at least one of other protective control apparatuses comprises means for executing the interpretation program in the program module element so as to interpret the content of the control operation of the own protective control apparatus and means for executing the control operation related to the protective control function thereof.

20. An electric power system protective control system according to claim 19, further comprising a supervision apparatus connected to the communication network and adapted to supervise the protective control apparatuses, and means provided at least one of the display/operation apparatus and the supervision apparatus and adapted to transmit a command for canceling the resident of the program module to the predetermined protective control apparatus, wherein said resident means of the protective control apparatus is adapted to stop a monitoring process of the program module by the resident means according to the transmitted canceling command so as to migrate the program module to the supervision apparatus.

21. A method of controlling an electric power system protective control system including a plurality of protective control apparatuses each having a protective control function of an electric power system, in which the protective control apparatuses are distributed and connected through a communication network to each other so that data communication is permitted among the respective protective control apparatuses, each of said protective control apparatuses executing a control operation related to the protective control function of the own protective control apparatus according to a program module, said program module migrating through the communication network along a predetermined route of migration, said method comprising the steps of:

preparing a script file including a control procedure, said control procedure including at least a content of the control operation and the route of migration of the program module, said control procedure being prepared in a text format;

preparing a program module including an interpretation program for interpreting the script file so as to read out the control procedure;

integrating the script file with the program module;

migrating the integrated program module to a predetermined destination protective control apparatus based on the route of migration through the communication network, said preparing a script file being performed prior to migrating the integrated program module to any protective control apparatus;

causing the predetermined protective control apparatus to execute the interpretation program of the transmitted program module so as to interpret the control procedure of the script file;

causing the predetermined protective control apparatus to execute the control operation related to the protective control function of the own apparatus according to the content of the control operation in the interpreted control procedure; and migrating the program module from the predetermined protective control apparatus to a next destination protective control apparatus along the route of migration in the interpreted control procedure.

22. A storage medium storing a program module readable by a plurality of protective control terminals of an electric power system protective control system, each of said protective control terminals having a protective control function to an electric power system, in which the protective control terminals are distributed and connected through a communication network to each other so that data communication is permitted among the respective protective control terminals, each of said protective control terminals executing a control operation related to the protective control function of the own protective control terminal according to the program module, said program module migrating through the communication network along a predetermined route of migration, said program module comprising:

a script file including a control procedure, said control procedure including at least a content of the control operation and the route of migration of the program module and being prepared in a text format, said script file prepared in advance of migrating said program module to any protective control apparatus; and an interpretation program for causing each of the protective control terminals to interpret the script file so as to read out the control procedure.

* * * * *